US010057430B2

(12) United States Patent
Tsuda

(10) Patent No.: US 10,057,430 B2
(45) Date of Patent: Aug. 21, 2018

(54) APPARATUS, SYSTEM, AND METHOD FOR CHARGING PROCESSING BASED ON COMMUNICATION QUALITY

(75) Inventor: Shinichiro Tsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/235,826

(22) PCT Filed: Aug. 8, 2012

(86) PCT No.: PCT/JP2012/070181
§ 371 (c)(1),
(2), (4) Date: Jan. 29, 2014

(87) PCT Pub. No.: WO2013/031498
PCT Pub. Date: Mar. 7, 2013

(65) Prior Publication Data
US 2014/0194093 A1    Jul. 10, 2014

(30) Foreign Application Priority Data
Aug. 26, 2011  (JP) ................... 2011-184554

(51) Int. Cl.
*H04B 1/38*     (2015.01)
*H04W 24/00*    (2009.01)
(Continued)

(52) U.S. Cl.
CPC ........ *H04M 15/59* (2013.01); *H04L 12/1485* (2013.01); *H04M 15/8016* (2013.01); *H04L 12/1489* (2013.01); *H04M 15/8027* (2013.01)

(58) Field of Classification Search
CPC ........................................ H04M 15/00–15/93
(Continued)

(56) References Cited

U.S. PATENT DOCUMENTS 5,915,214 A * 6/1999 Reece et al. ................. 455/406
6,463,274 B1 * 10/2002 Robertson ................... 455/406
(Continued)

FOREIGN PATENT DOCUMENTS

CN    1431842 A      7/2003
JP    2000-278735    10/2000
(Continued)

OTHER PUBLICATIONS

Official USPTO English translation of Sharp Kabushiki Kaisha (WIPO Patent Application Publication No. WO 2009/139262), Oct. 2016.*

(Continued)

*Primary Examiner* — Rafael Pérez-Gutiérrez
*Assistant Examiner* — Mark G Pannell
(74) *Attorney, Agent, or Firm* — Chip Law Group

(57) ABSTRACT

There is provided an information processing apparatus, an information processing method and a program for causing a computer to execute the method, the information processing apparatus including an acquisition unit configured to acquire communication quality at a time of communication between a base station and a wireless communication apparatus that connects to a predetermined network via the base station and performs the communication, and a charging processing unit configured to perform charging processing related to the communication based on the acquired communication quality.

21 Claims, 39 Drawing Sheets

(51) Int. Cl.
*G06F 15/16* (2006.01)
*H04M 15/00* (2006.01)
*H04L 12/14* (2006.01)

(58) Field of Classification Search
USPC .................................................. 455/406–408
See application file for complete search history.

(56) References Cited

U.S. PATENT DOCUMENTS

| | | | |
|---|---|---|---|
| 6,556,817 B1* | 4/2003 | Souissi et al. ................ 455/406 |
| 6,690,929 B1* | 2/2004 | Yeh ................................ 455/406 |
| 6,934,527 B1* | 8/2005 | Hamada ........................ 455/405 |
| 7,006,831 B2* | 2/2006 | Matz et al. ................... 455/453 |
| 7,426,471 B1* | 9/2008 | Briscoe et al. ................ 705/1.1 |
| 7,860,806 B2* | 12/2010 | Grundstrom et al. ........ 705/400 |
| 8,165,599 B1* | 4/2012 | Dronamraju .......... H04W 64/00 455/456.1 |
| 8,331,866 B2* | 12/2012 | Huoviala ................... 455/67.11 |
| 2001/0009855 A1* | 7/2001 | I'Anson ........................ 455/445 |
| 2002/0022471 A1* | 2/2002 | Watler et al. ................. 455/405 |
| 2002/0072333 A1* | 6/2002 | Gnesda et al. ............... 455/67.1 |
| 2002/0160748 A1* | 10/2002 | Rahman et al. .............. 455/406 |
| 2002/0160764 A1* | 10/2002 | Gorsuch ........................ 455/419 |
| 2003/0003894 A1* | 1/2003 | Kumar .......................... 455/406 |
| 2003/0083041 A1* | 5/2003 | Kumar et al. ................ 455/406 |
| 2003/0097461 A1* | 5/2003 | Barham ................... H04L 29/06 709/235 |
| 2004/0028055 A1* | 2/2004 | Madour et al. .......... 370/395.21 |
| 2004/0072565 A1* | 4/2004 | Nobukiyo ............. H04W 36/22 455/436 |
| 2005/0026592 A1* | 2/2005 | Walter et al. ................. 455/406 |
| 2005/0089020 A1* | 4/2005 | Ahlback et al. .............. 370/352 |
| 2006/0094468 A1* | 5/2006 | Hoshino .............. H04B 7/0604 455/561 |
| 2009/0088130 A1* | 4/2009 | Zellner et al. ................ 455/406 |
| 2011/0111729 A1* | 5/2011 | Poltorak et al. .............. 455/406 |
| 2011/0137772 A1* | 6/2011 | Davis et al. .................... 705/34 |

FOREIGN PATENT DOCUMENTS

| | | |
|---|---|---|
| JP | 2000-278735 A | 10/2000 |
| JP | 2002-078020 | 3/2002 |
| JP | 2003-189012 | 7/2003 |
| JP | 2003-189012 A | 7/2003 |
| JP | 2004-048289 A | 2/2004 |
| JP | 2004-146888 | 5/2004 |
| JP | 2004-146888 A | 5/2004 |
| JP | 2005-269247 | 9/2005 |
| JP | 2005-269247 A | 9/2005 |
| JP | 2006-180038 | 7/2006 |
| JP | 2006-180038 A | 7/2006 |
| JP | 2010-074345 | 4/2010 |
| JP | 2010-074345 A | 4/2010 |
| JP | 2011-078101 | 4/2011 |
| JP | 2011-078101 A | 4/2011 |
| WO | 2009/139262 A | 11/2009 |
| WO | WO 2009/139262 | 11/2009 |

OTHER PUBLICATIONS

Office Action received for Japanese Patent application No. 2011-184554, dated Jun. 28, 2016, 5 pages of office action including 3 pages of English translation.

Office Action for JP Patent Application No. 2011-184554, dated Nov. 15, 2016, 10 pages of Office Action and 11 pages of English Translation.

* cited by examiner

FIG. 3

COMMUNICATION HISTORY
INFORMATION STORAGE UNIT
230

| DATE INFORMATION 231 | JUNE 1, 2011 | | | | | | | ⋮ |
|---|---|---|---|---|---|---|---|---|
| TERMINAL IDENTIFICATION INFORMATION 232 | 090-1234-5678 | | | 090-5678-1234 | | | ⋮ | ⋮ |
| | 234 | 235 | 236 | 234 | 235 | 236 | | |
| COMMUNI-CATION HISTORY INFORMATION 233 | TIME | PACKET COUNT | PILOT SIGNAL LEVEL | TIME | PACKET COUNT | PILOT SIGNAL LEVEL | ⋮ | ⋮ |
| | 08:10 | 3122 | −70 | 09:35 | 1576 | −105 | ⋮ | ⋮ |
| | 10:30 | 2245 | −100 | 11:35 | 2987 | −75 | ⋮ | ⋮ |
| | 17:35 | 2467 | −95 | 12:55 | 1539 | −75 | ⋮ | ⋮ |
| | 22:22 | 3788 | −85 | 18:33 | 2670 | −80 | ⋮ | ⋮ |
| | — | — | — | 21:23 | 3654 | −95 | ⋮ | ⋮ |

FIG. 4
COMMUNICATION UNIT PRICE
INFORMATION STORAGE UNIT
240
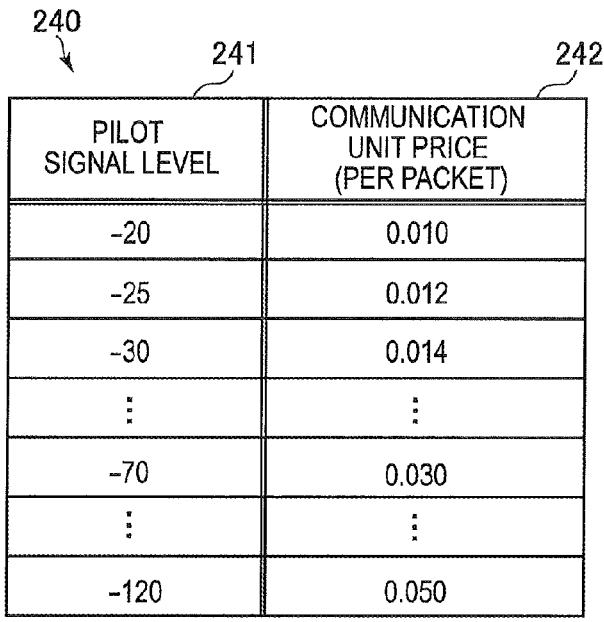
| PILOT SIGNAL LEVEL | COMMUNICATION UNIT PRICE (PER PACKET) |
|---|---|
| −20 | 0.010 |
| −25 | 0.012 |
| −30 | 0.014 |
| ⋮ | ⋮ |
| −70 | 0.030 |
| ⋮ | ⋮ |
| −120 | 0.050 |
(a)
CHARGING INFORMATION
STORAGE UNIT
260
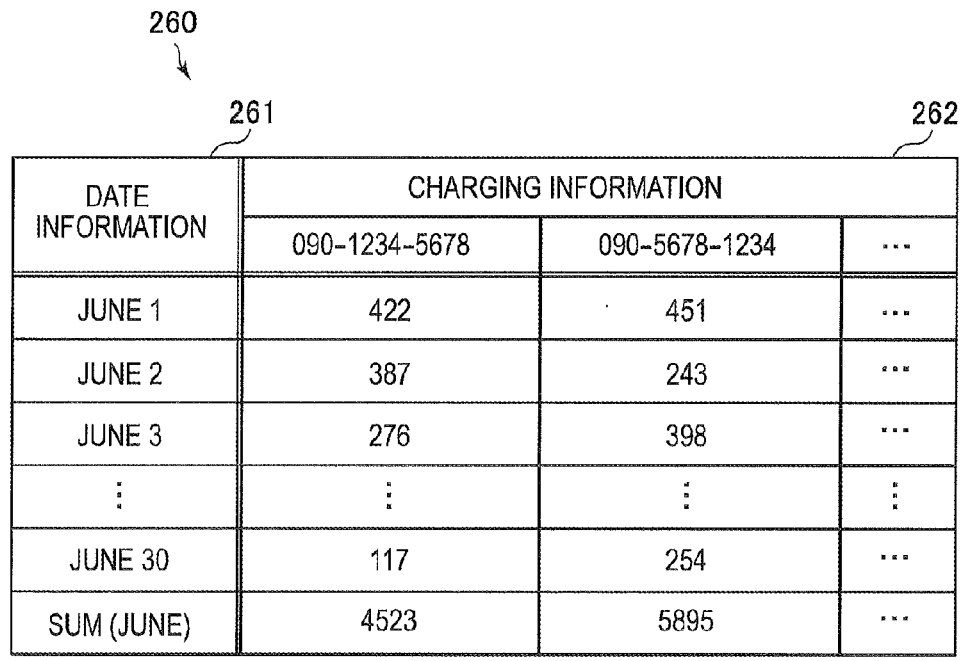
| DATE INFORMATION | CHARGING INFORMATION | | |
|---|---|---|---|
| | 090-1234-5678 | 090-5678-1234 | ... |
| JUNE 1 | 422 | 451 | ... |
| JUNE 2 | 387 | 243 | ... |
| JUNE 3 | 276 | 398 | ... |
| ⋮ | ⋮ | ⋮ | ⋮ |
| JUNE 30 | 117 | 254 | ... |
| SUM (JUNE) | 4523 | 5895 | ... |
(b)

FIG. 6

COMMUNICATION HISTORY INFORMATION STORAGE UNIT 270

| DATE INFORMATION 231 | JUNE 1, 2011 | | | | | | |
|---|---|---|---|---|---|---|---|
| TERMINAL IDENTIFICATION INFORMATION 232 | 090-1234-5678 234 | | | 090-5678-1234 234 | | | |
| COMMUNI-CATION HISTORY INFORMATION 271 | TIME | PACKET COUNT 235 | CQI 236 | TIME 234 | PACKET COUNT 235 | CQI 272 | |
| | 08:10 | 3122 | 14 | 09:35 | 1576 | 1 | ... |
| | 10:30 | 2245 | 5 | 11:35 | 2987 | 17 | ... |
| | 17:35 | 2467 | 17 | 12:55 | 1539 | 16 | ... |
| | 22:22 | 3788 | 20 | 18:33 | 2670 | 13 | ... |
| | — | — | — | 21:23 | 3654 | 11 | ... |
| | ... | ... | ... | ... | ... | ... | ... |

COMMUNICATION UNIT PRICE
INFORMATION STORAGE UNIT
273

274  242

| CQI | COMMUNICATION UNIT PRICE (PER PACKET) |
|---|---|
| 1 | 0.050 |
| 2 | 0.050 |
| ⋮ | ⋮ |
| 10 | 0.040 |
| 11 | 0.040 |
| ⋮ | ⋮ |
| 30 | 0.010 |

FIG. 10

COMMUNICATION UNIT PRICE
INFORMATION STORAGE UNIT
280

| PILOT SIGNAL LEVEL | COMMUNICATION UNIT PRICE (PER PACKET) | |
| --- | --- | --- |
| | 01:00~09:00 | 09:00~01:00 |
| -20 | 0.008 | 0.010 |
| -25 | 0.010 | 0.012 |
| -30 | 0.011 | 0.014 |
| ⋮ | ⋮ | ⋮ |
| -110 | 0.037 | 0.046 |
| -115 | 0.038 | 0.048 |
| -120 | 0.040 | 0.050 |

FIG. 12

COMMUNICATION HISTORY INFORMATION STORAGE UNIT 290

| DATE INFORMATION | \multicolumn{9}{c}{JUNE 1, 2011} |
|---|---|---|---|---|---|---|---|---|
| TERMINAL IDENTIFICATION INFORMATION | \multicolumn{4}{c}{090-1234-5678} | \multicolumn{4}{c}{090-5678-1234} | |
| | TIME 234 | PACKET COUNT 235 | DISTANCE 292 | | TIME 234 | PACKET COUNT 235 | DISTANCE 292 | ... |
| COMMUNICATION HISTORY INFORMATION | 08:10 | 3122 | 300 | | 09:35 | 1576 | 900 | ... |
| | 10:30 | 2245 | 900 | | 11:35 | 2987 | 700 | ... |
| | 17:35 | 2467 | 600 | | 12:55 | 1539 | 300 | ... |
| | 22:22 | 3788 | 700 | | 18:33 | 2670 | 600 | ... |
| | — | — | — | | 21:23 | 3654 | 800 | ... |

FIG. 13

COMMUNICATION UNIT PRICE
INFORMATION STORAGE UNIT
295

| DISTANCE 296 | COMMUNICATION UNIT PRICE (PER PACKET) 242 |
|---|---|
| 100 | 0.010 |
| 200 | 0.015 |
| 300 | 0.020 |
| ⋮ | ⋮ |
| 800 | 0.045 |
| 900 | 0.050 |
| ⋮ | ⋮ |

FIG. 15

COMMUNICATION HISTORY INFORMATION STORAGE UNIT 320

| DATE INFORMATION 231 | TERMINAL IDENTIFICATION INFORMATION 232 | COMMUNICATION HISTORY INFORMATION 321 | | | | | | | |
|---|---|---|---|---|---|---|---|---|---|
| JUNE 1, 2011 | 090-1234-5678 234 | TIME | PACKET COUNT 322 | | CQI 272 | TIME | PACKET COUNT 322 | | CQI 272 |
| | | | HSPA | LTE | | | HSPA | LTE | |
| | | 08:10 | 3122 | — | 14 | 09:35 | 1576 | — | 1 |
| | | 10:30 | — | 2245 | 5 | 11:35 | 2987 | — | 17 |
| | | 17:35 | 2467 | — | 7 | 12:55 | — | 1539 | 16 |
| | | 22:22 | 3788 | — | 20 | 18:33 | 2670 | — | 13 |
| | | — | — | — | — | 21:23 | 3654 | — | 11 |
| ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ |

COMMUNICATION UNIT PRICE
INFORMATION STORAGE UNIT
325

| CQI | COMMUNICATION UNIT PRICE (PER PACKET) | |
|---|---|---|
| | HSPA | LTE |
| 1 | 0.050 | 0.060 |
| 2 | 0.050 | 0.060 |
| ⋮ | ⋮ | ⋮ |
| 10 | 0.040 | 0.025 |
| 11 | 0.040 | 0.024 |
| ⋮ | ⋮ | ⋮ |
| 30 | 0.010 | — |

FIG. 18

COMMUNICATION HISTORY INFORMATION STORAGE UNIT 350

| DATE INFORMATION 231 | | JUNE 1, 2011 | | | | | | | | ... |
|---|---|---|---|---|---|---|---|---|---|---|
| TERMINAL IDENTIFICATION INFORMATION 232 | | 090-1234-5678 | | | | 090-5678-1234 | | | | ... |
| | | 234 | 235 | 236 | 352 | 234 | 235 | 236 | 352 | |
| COMMUNI-CATION HISTORY INFORMATION 351 | | TIME | PACKET COUNT | PILOT SIGNAL LEVEL | CONGES-TION DEGREE | TIME | PACKET COUNT | PILOT SIGNAL LEVEL | CONGES-TION DEGREE | ... |
| | | 08:10 | 3122 | -70 | 0.01 | 09:35 | 1576 | -105 | 0.45 | ... |
| | | 10:30 | 2245 | -100 | 0.21 | 11:35 | 2987 | -75 | 0.63 | ... |
| | | 17:35 | 2467 | -95 | 0.31 | 12:55 | 1539 | -75 | 0.37 | ... |
| | | 22:22 | 3788 | -85 | 0.41 | 18:33 | 2670 | -80 | 0.25 | ... |
| | | — | — | — | — | 21:23 | 3654 | -95 | 0.71 | ... |

FIG. 19

DISCOUNT UNIT PRICE
INFORMATION STORAGE UNIT
360

| PILOT SIGNAL LEVEL | DISCOUNT UNIT PRICE (PER PACKET) |
|---|---|
| -20 | 0.040 |
| -25 | 0.038 |
| -30 | 0.036 |
| ⋮ | ⋮ |
| -110 | 0.004 |
| -115 | 0.002 |
| -120 | 0.000 |

(a)

EXTRA UNIT PRICE
INFORMATION STORAGE UNIT
370

| CONGESTION DEGREE | EXTRA UNIT PRICE (PER PACKET) |
|---|---|
| LESS THAN 0.1 | 0.000 |
| 0.1～0.2 | 0.010 |
| ⋮ | ⋮ |
| 0.4～0.6 | 0.020 |
| 0.6 OR MORE | 0.035 |

CHARGING INFORMATION STORAGE UNIT
380

| DATE INFORMATION | CHARGING INFORMATION | | | | | | |
|---|---|---|---|---|---|---|---|
| | 090-1234-5678 | | | 090-5678-1234 | | | ... |
| | FIXED AMOUNT | DISCOUNT AMOUNT | PREMIUM AMOUNT | FIXED AMOUNT | DISCOUNT AMOUNT | PREMIUM AMOUNT | |
| JUNE 1 | 581 | 158 | 57 | 621 | 170 | 33 | ... |
| JUNE 2 | 463 | 75 | 112 | 243 | 87 | 101 | ... |
| JUNE 3 | 387 | 127 | 23 | 398 | 125 | 72 | ... |
| ... | ... | ... | ... | ... | ... | ... | ... |
| JUNE 30 | 231 | 55 | 76 | 254 | 76 | 48 | ... |
| SUM (JUNE) | 5558 | 1234 | 983 | 6893 | 983 | 752 | ... |

IT IS CURRENTLY CONGESTED.
PREMIUM FEE (10%) IS GENERATED
IN THIS COMMUNICATION SERVICE.

391

| CONFIR-
MATION |

(a)

395

IT IS CURRENTLY CONGESTED.
PREMIUM FEE (10%) IS GENERATED IN THIS
COMMUNICATION SERVICE.
DO YOU CONTINUOUSLY EXECUTE IT ?
CURRENT COMMUNICATION IS STOPPED
IF YOU SELECT "NO."

396      397

| YES |    | NO |

(b)

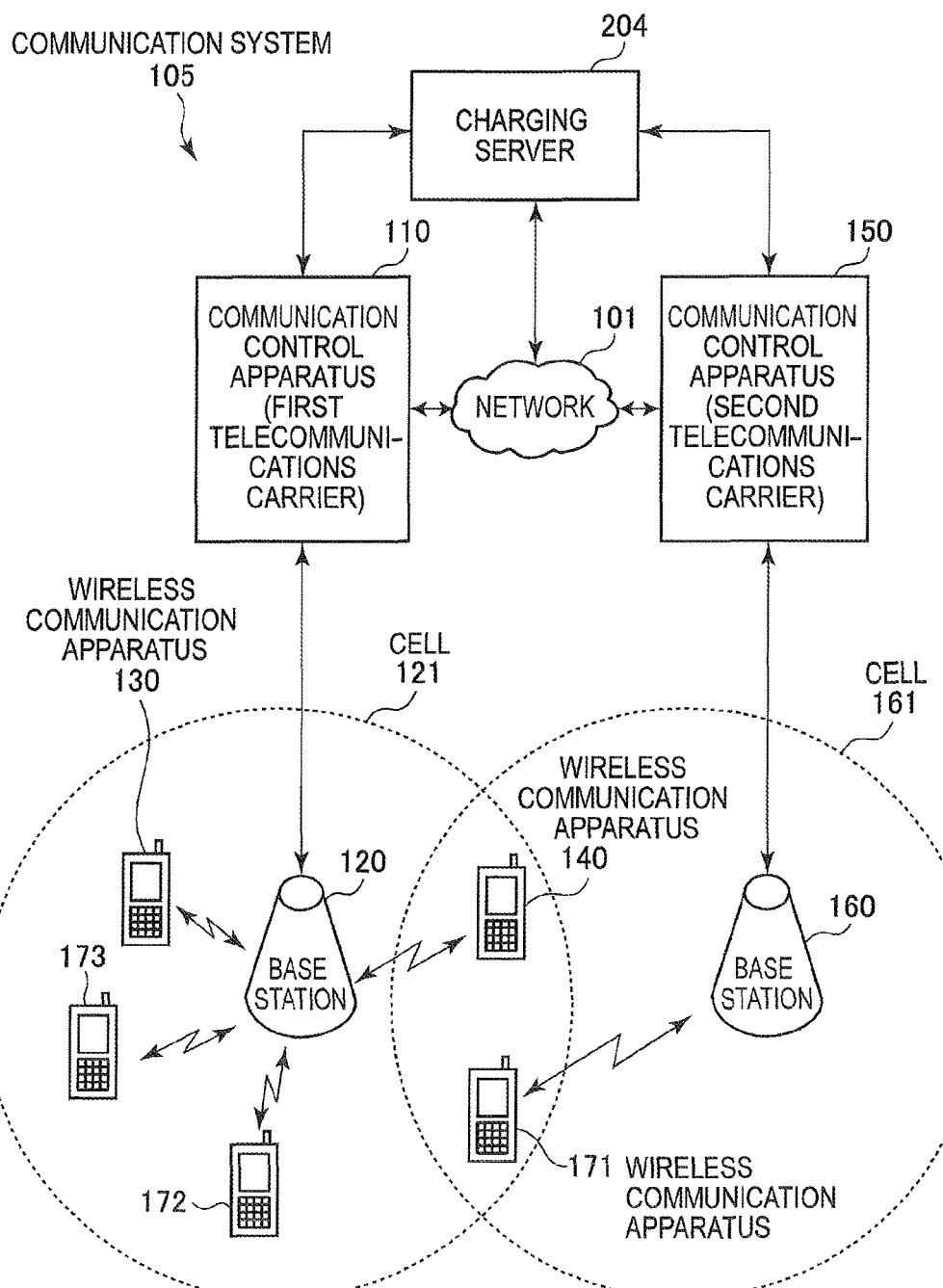

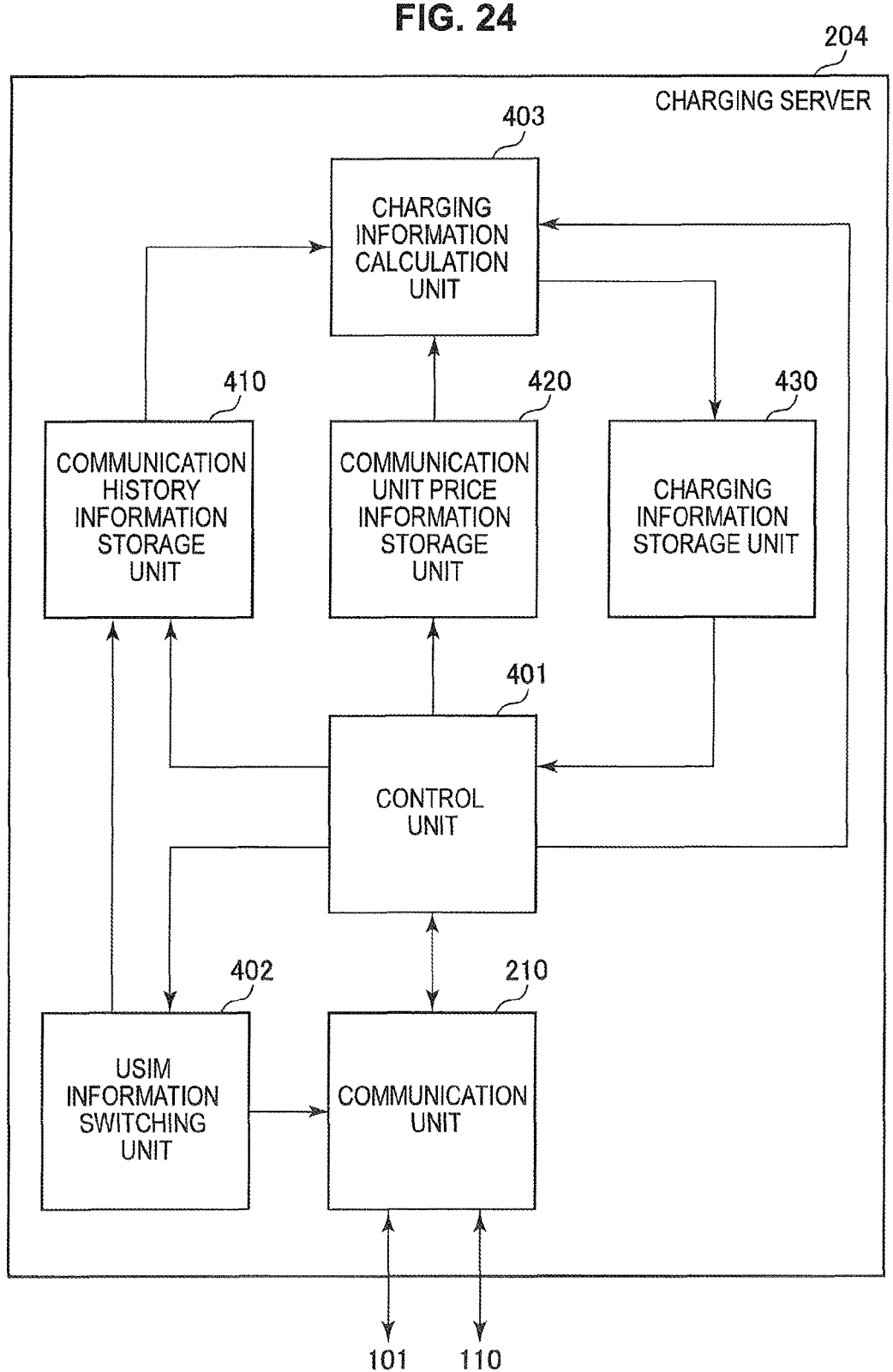

FIG. 25

COMMUNICATION HISTORY
INFORMATION STORAGE UNIT
410

| DATE INFORMATION | JUNE 1, 2011 | | | | | | | |
|---|---|---|---|---|---|---|---|---|
| TERMINAL IDENTIFICATION INFORMATION | 090-1234-5678 | | | | 090-5678-1234 | | | ... |
| COMMUNICATION HISTORY INFORMATION | TIME | PACKET COUNT | | PILOT SIGNAL LEVEL | TIME | PACKET COUNT | | PILOT SIGNAL LEVEL |
| | | FIRST TELE-COMMUNI-CATIONS CARRIER | SECOND TELE-COMMUNI-CATIONS CARRIER | | | FIRST TELE-COMMUNI-CATIONS CARRIER | SECOND TELE-COMMUNI-CATIONS CARRIER | |
| | 08:10 | 3122 | — | −70 | 09:35 | 1576 | — | −105 |
| | 10:30 | 2245 | — | −100 | 11:35 | — | 2987 | −75 |
| | 17:35 | — | 2467 | −95 | 12:55 | 1539 | — | −75 |
| | 22:22 | 3788 | — | −85 | 18:33 | 2670 | — | −80 |
| | — | — | — | — | 21:23 | 3654 | — | −95 |
| | ... | ... | ... | ... | ... | ... | ... | ... |

FIG. 26

COMMUNICATION UNIT PRICE INFORMATION STORAGE UNIT 420

| PILOT SIGNAL LEVEL (241) | COMMUNICATION UNIT PRICE (PER PACKET) (421) | |
| --- | --- | --- |
| | FIRST TELECOMMUNICATIONS CARRIER | SECOND TELECOMMUNICATIONS CARRIER |
| −20 | 0.010 | 0.008 |
| −25 | 0.012 | 0.010 |
| −30 | 0.014 | 0.012 |
| ⋮ | ⋮ | ⋮ |
| −110 | 0.046 | 0.050 |
| −115 | 0.048 | 0.052 |
| −120 | 0.050 | 0.055 |

(a)

CHARGING INFORMATION STORAGE UNIT 430

| DATE INFORMATION (261) | CHARGING INFORMATION (431) | | | | |
| --- | --- | --- | --- | --- | --- |
| | 090-1234-5678 | | 090-5678-1234 | | ... |
| | FIRST TELE-COMMUNICATIONS CARRIER | SECOND TELE-COMMUNICATIONS CARRIER | FIRST TELE-COMMUNICATIONS CARRIER | SECOND TELE-COMMUNICATIONS CARRIER | ... |
| JUNE 1 | 324 | 103 | 355 | 113 | ... |
| JUNE 2 | 298 | 173 | 228 | 89 | ... |
| JUNE 3 | 225 | 56 | 318 | 127 | ... |
| ⋮ | ⋮ | ⋮ | ⋮ | ⋮ | ⋮ |
| JUNE 30 | 97 | 23 | 222 | 159 | ... |
| SUM (JUNE) | 3120 | 2510 | 3620 | 1752 | ... |

SPECIFIC FEE DISTRICT INFORMATION STORAGE UNIT 460

| TERMINAL IDENTIFICATION INFORMATION (461) | 090-1234-5678 (463) | | (464) (465) | 090-5678-1234 | | | ... |
|---|---|---|---|---|---|---|---|
| SPECIFIC FEE DISTRICT INFORMATION (462) | ITEM | ADDRESS | CELL ID | ITEM | ADDRESS | CELL ID | ... |
| | HOME | KITASHINAGAWA SHINAGAWA-KU TOKYO ○-○-○ | 0017 | ... | ... | ... | ... |
| | OFFICE | KONAN MINATO-KU TOKYO ○-○-○ | 0021 | ... | ... | ... | ... |
| | SCHOOL | OSAKI SHINAGAWA-KU TOKYO ○-○-○ | 0085 | ... | ... | ... | ... |

(a)

COMMUNICATION HISTORY INFORMATION STORAGE UNIT 466

| DATE INFORMATION (231) | JUNE 1, 2011 | | | | | | | | ... |
|---|---|---|---|---|---|---|---|---|---|
| TERMINAL IDENTIFICATION INFORMATION (232) | 090-1234-5678 (234) (235) (236) (464) | | | | 090-5678-1234 (234) (235) (236) (468) | | | | ... |
| COMMUNICATION HISTORY INFORMATION (467) | TIME | PACKET COUNT | PILOT SIGNAL LEVEL | CELL ID | TIME | PACKET COUNT | PILOT SIGNAL LEVEL | CELL ID | ... |
| | 08:10 | 3122 | -70 | 0018 | 09:35 | 1576 | -105 | 0402 | ... |
| | 10:30 | 2245 | -100 | 0025 | 11:35 | 2987 | -75 | 0502 | ... |
| | 17:35 | 2467 | -95 | 0085 | 12:55 | 1539 | -75 | 0517 | ... |
| | 22:22 | 3788 | -85 | 0809 | 18:33 | 2670 | -80 | 0050 | ... |
| | — | — | — | — | 21:23 | 3654 | -95 | 0520 | ... |

SETTING MENU OF SPECIFIC FEE DISTRICT

ONE ADDRESS CAN BE SET AS SPECIFIC FEE DISTRICT EVERY FOLLOWING ITEM.

- ⦿ HOME  ← 471
- ○ OFFICE
- ○ SCHOOL

[NEXT] 472  [BACK] 473

(a)

480

SETTING MENU OF SPECIFIC FEE DISTRICT

PLEASE INPUT ADDRESS OF HOME SET AS SPECIFIC FEE DISTRICT.
FURTHER, IT IS POSSIBLE TO AUTOMATICALLY INPUT ADDRESS BY INPUTTING ZIP CODE AND PRESSING "FIND."

482  481  483

ZIP CODE [1][4][1]—[0][0][0][1] [FIND]

KITASHINAGAWA SHINAGAWA-KU TOKYO

484

[REGISTER] 485  [BACK] 486

(b)

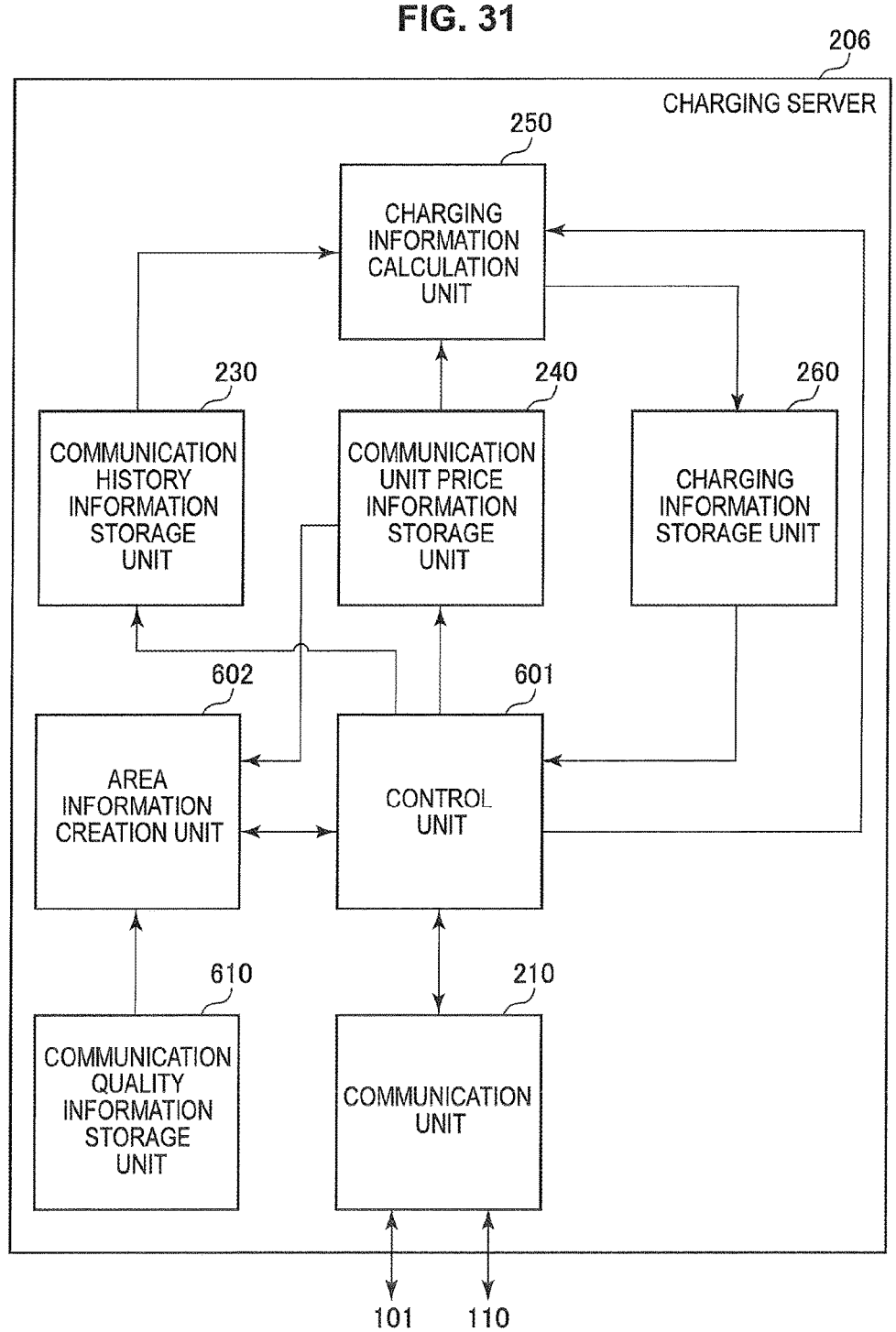

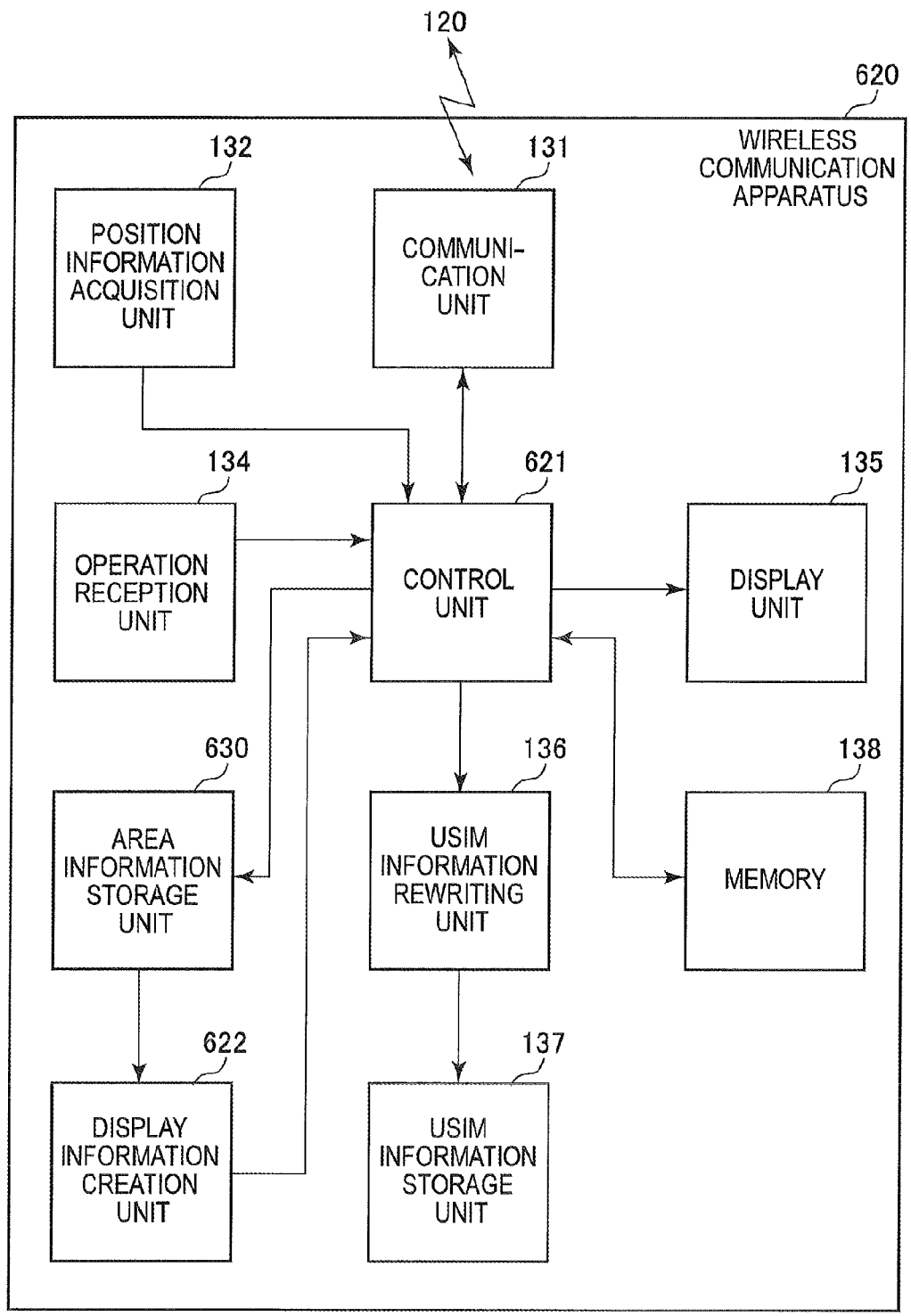

FIG. 33

COMMUNICATION QUALITY
INFORMATION STORAGE UNIT
610

| LATITUDE (611) | LONGITUDE (612) | PILOT SIGNAL LEVEL (613) |
|---|---|---|
| 34.6250 | 135.0400 | −70 |
| 34.6250 | 135.0405 | −73 |
| ⋮ | ⋮ | ⋮ |
| 34.6255 | 135.0400 | −80 |
| 34.6255 | 135.0405 | −85 |
| ⋮ | ⋮ | ⋮ |

(a)

AREA INFORMATION
STORAGE UNIT
630

| LATITUDE (631) | LONGITUDE (632) | COMMUNICATION UNIT PRICE (PER PACKET) (633) |
|---|---|---|
| 34.6250 | 135.0400 | 0.030 |
| 34.6250 | 135.0405 | 0.032 |
| ⋮ | ⋮ | ⋮ |
| 34.6255 | 135.0400 | 0.034 |
| 34.6255 | 135.0405 | 0.036 |
| ⋮ | ⋮ | ⋮ |

(b)

FIG. 34
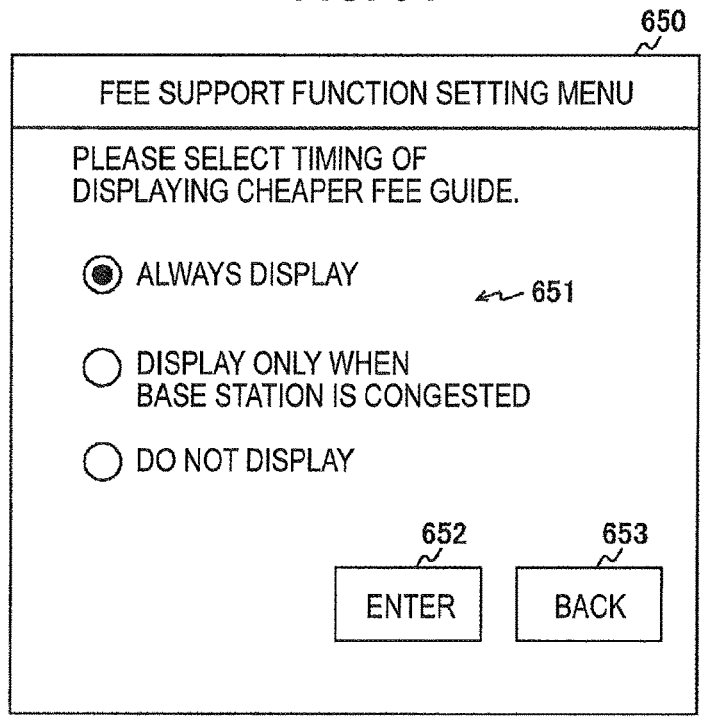
(a)
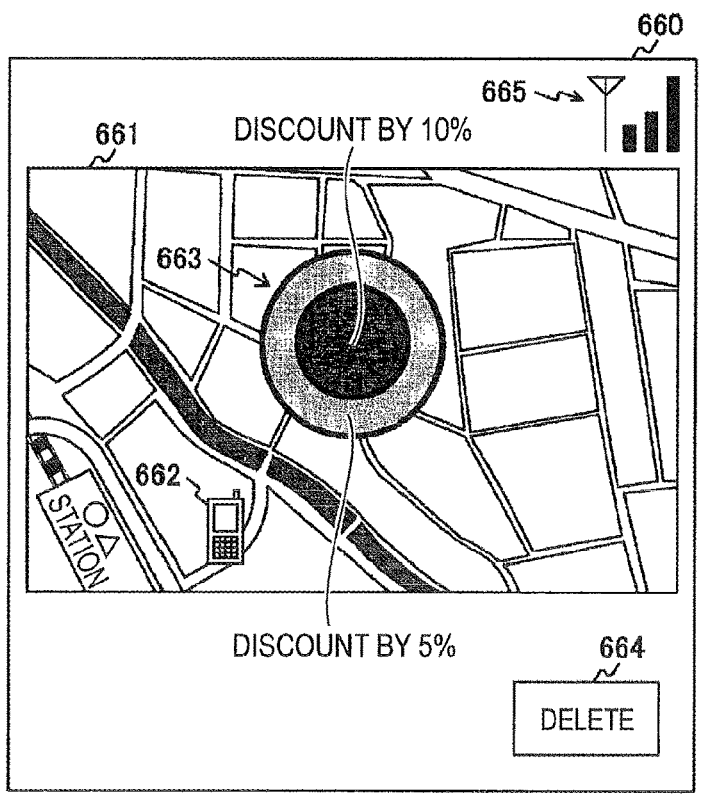
(b)

COMMUNICATION UNIT PRICE INFORMATION STORAGE UNIT 720

FIG. 37

| TIME | PILOT SIGNAL LEVEL | COMMUNICATION UNIT PRICE (PER PACKET) | | | | | | |
|---|---|---|---|---|---|---|---|---|
| | | LAC:0001 | | | ... | LAC:FFFF | | |
| | | CID:0001 | ... | CID:FFFF | ... | CID:0001 | ... | CID:FFFF |
| IN 30 SECONDS | -20 | 0.050 | ... | 0.030 | ... | 0.020 | ... | 0.030 |
| | -25 | 0.050 | ... | 0.030 | | 0.020 | ... | 0.030 |
| | ⋮ | ⋮ | ... | ⋮ | | ⋮ | ... | ⋮ |
| | -120 | 0.060 | ... | 0.050 | | 0.040 | ... | 0.050 |
| IN 1 MINUTE | -20 | 0.050 | ... | 0.030 | ... | 0.020 | ... | 0.030 |
| | -25 | 0.050 | ... | 0.030 | | 0.020 | ... | 0.030 |
| | ⋮ | ⋮ | ... | ⋮ | | ⋮ | ... | ⋮ |
| | -120 | 0.060 | ... | 0.050 | | 0.040 | ... | 0.050 |
| ⋮ | ⋮ | ⋮ | ⋮ | ⋮ | ⋮ | ⋮ | ⋮ | ⋮ |
| IN 10 MINUTES | -20 | 0.040 | ... | 0.030 | ... | 0.030 | ... | 0.040 |
| | -25 | 0.040 | ... | 0.030 | | 0.030 | ... | 0.040 |
| | ⋮ | ⋮ | ... | ⋮ | | ⋮ | ... | ⋮ |
| | -120 | 0.060 | ... | 0.050 | | 0.050 | ... | 0.060 |
| IN 20 MINUTES | -20 | 0.030 | ... | 0.040 | ... | 0.030 | ... | 0.050 |
| | -25 | 0.030 | ... | 0.040 | | 0.030 | ... | 0.050 |
| | ⋮ | ⋮ | ... | ⋮ | | ⋮ | ... | ⋮ |
| | -120 | 0.050 | ... | 0.060 | | 0.050 | ... | 0.060 |
| ⋮ | ⋮ | ⋮ | ⋮ | ⋮ | ⋮ | ⋮ | ⋮ | ⋮ |

APPARATUS, SYSTEM, AND METHOD FOR CHARGING PROCESSING BASED ON COMMUNICATION QUALITY

TECHNICAL FIELD

The present technology relates to an information processing apparatus. To be more specific, it relates to an information processing apparatus that performs charging processing to wireless communication, and a communication system and information processing method including this.

BACKGROUND ART

In the past, a wireless communication apparatus that is connected to a network such as a public wireless network has spread widely. A mobile phone service of a 3G (3rd Generation) method (in Japan, referred to as the third-generation mobile phone service) has started in 2002. As the mobile phone service, initially, applications mainly uses packets having a small capacity size such as a sound and an e-mail are mainly used. However, use aspects of users change to downloading of packets having a relatively large capacity size such as download of a music file or viewing of a moving image, by introducing HSDPA (High Speed Downlink Packet Access) or the like.

For example, as a technique to distribute contents, there is suggested a distribution system in which a content distribution request is made from a wireless communication apparatus, whether to distribute contents is decided according to the reception environment in the wireless communication apparatus and the content distribution is performed (for example, see Patent Literature 1).

CITATION LIST

Patent Literature

Patent Literature 1: JP 2002-78020A

SUMMARY OF INVENTION

Technical Problem

In the above-mentioned related art, it is possible to distribute contents to a wireless communication apparatus at the timing the reception environment in the wireless communication apparatus becomes excellent.

Here, as described above, packets of a relatively large size are downloaded in recent years. To cope with such a demand, a function of AMC (Adaptive Modulation and Coding) is implemented after HSDPA, and the capacity of a base station has been improved.

Thus, since the function of AMC is implemented after HSDPA, for example, the base station can transmit data to a wireless communication apparatus of a good communication state in a multivalued modulation method of a high coding rate. Therefore, to efficiently use wireless communication resources, it is important to perform appropriate charging processing based on the load of the base station.

The present technology is made in view of such a situation, and it is an object to perform appropriate charging processing based on the load of a base station.

Solution to Problem

The present technology is provided in order to solve the above mentioned issues. According to a first embodiment of the present technology, there is provided an information processing apparatus, an information processing method and a program for causing a computer to execute the method, the information processing apparatus including an acquisition unit configured to acquire communication quality at a time of communication between a base station and a wireless communication apparatus that connects to a predetermined network via the base station and performs the communication, and a charging processing unit configured to perform charging processing related to the communication based on the acquired communication quality. This causes operation of performing charging processing related to communication on the basis of the communication quality at the time of communication.

According to the first embodiment of the present technology, a communication unit price that varies according to the communication quality may be set. The charging processing unit may use the communication unit price corresponding to the acquired communication quality and calculates a communication fee with respect to a communication volume at the time of the communication. This causes operation of calculating a communication fee to the communication volume at the time of communication by the use of a communication unit price based on the communication quality at the time of the communication.

According to the first embodiment of the present technology, the charging processing unit may calculate the communication fee using a signal parameter, as the communication quality, acquired from the base station or the wireless communication apparatus. This causes operation of calculating a communication fee by the use of a signal parameter acquired from a base station or a wireless communication apparatus.

According to the first embodiment of the present technology, the signal parameter may be an index calculated from one or combination of a channel quality indicator (CQI), a modulation scheme, an information bit count per one symbol, a coding rate and an information bit count excluding a redundancy bit. This causes operation of calculating a communication fee by the use of these values.

According to the first embodiment of the present technology, the charging processing unit may calculate the communication fee using, as the communication quality, information specified by a relationship between a position of the wireless communication apparatus and a position of the base station. This causes operation of calculating a communication fee by the use of information specified from the relationship between the position of a wireless communication apparatus and the position of a base station.

According to the first embodiment of the present technology, the information specified by the relationship between the position of the wireless communication apparatus and the position of the base station may be a distance between the wireless communication apparatus and the base station. This causes operation of calculating a communication fee by the use of the distance between a wireless communication apparatus and a base station.

According to the first embodiment of the present technology, a value that varies according to each time slot may be set to the communication unit price. The charging processing unit may calculate the communication fee using the communication unit price corresponding to a time slot at the time of the communication. This causes operation of calculating a communication fee by the use of a communication unit price based on the time slot at the time of communication.

According to the first embodiment of the present technology, a value that varies according to each communication scheme may be set to the communication unit price. The charging processing unit may calculate the communication fee using the communication unit price corresponding to a communication scheme at the time of the communication. This causes operation of calculating a communication fee by the use of a communication unit price based on a communication scheme at the time of communication.

According to the first embodiment of the present technology, the charging processing unit may calculate a first communication fee with respect to a communication volume at the time of the communication using a fixed communication unit price, calculates a discounted fee with respect to the first communication fee for the communication volume at the time of the communication in a case where the acquired communication quality satisfies a predetermined condition, and calculates the communication fee with respect to the communication volume at the time of the communication based on the first communication fee and the discounted fee. This causes operation of calculating a first communication fee by the use of a fixed communication unit price, calculating a discounted fee for the communication volume at the time of communication in a case where the communication quality at the time of communication meets a predetermined condition, and calculating a communication fee based on the first communication fee and the discounted fee.

According to the first embodiment of the present technology, a discount unit price that varies according to the communication quality may be set. The charging processing unit may calculate the discounted fee using the discount unit price corresponding to the acquired communication quality, for the communication volume at the time of the communication in a case where the acquired communication quality satisfies the predetermined condition. This causes operation of calculating a discounted fee by the use of a discount unit price based on communication quality, as for the communication volume at the time of communication in a case where the communication quality at the time of communication meets a predetermined condition.

According to the first embodiment of the present technology, a value that varies according to a time slot may be set to the discount unit price. The charging processing unit may calculate the discounted fee using the discount unit price corresponding to a time slot at the time of the communication. This causes operation of calculating a discounted fee by the use of a discount unit price based on the time slot at the time of communication.

According to the first embodiment of the present technology, the charging processing unit may calculate an extra fee with respect to the communication fee for a communication volume at the time of the communication in a case where a congestion degree of the base station satisfies a predetermined condition, and calculates the communication fee by adding the extra fee to the communication fee. This causes operation of calculating an extra fee as for the communication volume at the time of communication in a case where the congestion degree of a base station meets a predetermined condition, and adding the extra fee to a communication fee.

According to the first embodiment of the present technology, the information processing apparatus may further include a notification unit configured to notify the wireless communication apparatus of a generation of the extra fee to in a case where the congestion degree of the base station satisfies the predetermined condition. This causes operation of notifying a generation effect of an extra fee to a wireless communication apparatus in a case where the congestion degree of a base station meets a predetermined condition.

According to the first embodiment of the present technology, the communication unit price may be set for each telecommunications carrier. The information processing apparatus further includes a setting unit configured to perform control to set a connection right to connect with one of base stations of a plurality of telecommunications carriers to the wireless communication apparatus. The charging processing unit may calculate the communication fee using the communication unit price corresponding to the set telecommunications carrier. This causes operation of calculating a communication fee by the use of a communication unit price based on a set telecommunications carrier.

According to the first embodiment of the present technology, the communication unit price in a storage unit configured to store the communication unit price set for each telecommunications carrier may be periodically or irregularly acquired from each of a plurality of telecommunications carriers and sequentially updated. This causes operation that a communication unit price in a storage unit is periodically or irregularly acquired from each of multiple telecommunications carriers and sequentially updated.

According to the first embodiment of the present technology, the communication quality at the time of the communication between the wireless communication apparatus and the base station may be an index calculated from one or combination of a CQI, an SIR (Signal to Interference Ratio), average power of a pilot signal, average power of a reference signal, a relationship between reception power and total reception power of a pilot signal from the base station, a relationship between reception power and total reception power of a reference signal from the base station, a relationship between the reception power of the pilot signal from the base station and a total sum of reception power of pilot signals from surrounding base stations existing around the base station, and a relationship between the average power of the reference signal from the base station and a total sum of reception power of reference signals from the surrounding base stations. This causes operation of performing charging processing on the basis of these values.

According to the first embodiment of the present technology, the charging processing unit may perform the charging processing without using the acquired communication quality in a case where the wireless communication apparatus is connected to a base station in a specific area. This causes operation of performing charging processing without using the communication quality at the time of communication in a case where a wireless communication apparatus is connected to a base station in a specific area.

According to the first embodiment of the present technology, the information processing apparatus may further include a control unit configured to transmit, to the wireless communication apparatus, information to cause the wireless communication apparatus to display a position in which the wireless communication apparatus exists, surrounding positions of the position and information on a communication fee corresponding to the communication quality of each of the positions in association with each other. This causes operation of transmitting information to be displayed on a wireless communication apparatus to the wireless communication apparatus, where the information associates a position in which the wireless communication apparatus exists and its peripheral positions with information related to the communication fee based on the communication quality related to each of these positions.

According to a second embodiment of the present technology, there is provided a communication system, a processing method thereof and a program for causing a computer to execute the method, the communication system including a wireless communication apparatus configured to connect to a predetermined network via a base station and perform communication, and an information processing apparatus configured to acquire communication quality at a time of the communication between the wireless communication apparatus and the base station and perform charging processing related to the communication based on the acquired communication quality. This causes operation of performing charging processing related to communication on the basis of the communication quality at the time of the communication.

Advantageous Effects of Invention

According to the present technology, it is possible to provide an excellent effect that it is possible to perform appropriate charging processing based on the load of a base station.

BRIEF DESCRIPTION OF DRAWINGS

FIG. 3 is a diagram schematically illustrating one example of the storage content of the communication history information storage unit 230 in the first embodiment of the present technology.

FIG. 4 is a diagram schematically illustrating one example of the storage content of the communication unit price information storage unit 240 and the charging information storage unit 260 in the first embodiment of the present technology.

FIG. 6 is a diagram schematically illustrating one example of the storage content of the communication history information storage unit 270 in the first embodiment of the present technology.

FIG. 10 is a diagram schematically illustrating one example of the storage content of a communication unit price information storage unit 280 in the first embodiment of the present technology.

FIG. 12 is a diagram schematically illustrating one example of the storage content of the communication history information storage unit 290 in the second embodiment of the present technology.

FIG. 13 is a diagram schematically illustrating one example of the storage content of the communication unit price information storage unit 295 in the second embodiment of the present technology.

FIG. 15 is a diagram schematically illustrating one example of the storage content of the communication history information storage unit 320 in the third embodiment of the present technology.

FIG. 16 is a diagram schematically illustrating one example of the storage content of the communication unit price information storage unit 325 in the third embodiment of the present technology.

FIG. 18 is a diagram schematically illustrating one example of the storage content of the communication history information storage unit 350 in the fourth embodiment of the present technology.

FIG. 19 is a diagram schematically illustrating one example of the storage content of the discount unit price information storage unit 360 and the extra unit price information storage unit 370 in the fourth embodiment of the present technology.

FIG. 20 is a diagram schematically illustrating one example of the storage content of the charging information storage unit 380 in the fourth embodiment of the present technology.

FIG. 21 is a diagram illustrating a display screen example displayed on the display unit 135 of the wireless communication apparatus 130 in the fourth embodiment of the present technology.

FIG. 23 is a block diagram illustrating a system configuration example of a communication system 105 in the fifth embodiment of the present technology.

FIG. 24 is a block diagram illustrating a functional configuration example of the charging server 204 in the fifth embodiment of the present technology.

FIG. 25 is a diagram schematically illustrating one example of the storage content of the communication history information storage unit 410 in the fifth embodiment of the present technology.

FIG. 26 is a diagram schematically illustrating one example of the storage content of the communication unit price information storage unit 420 and the charging information storage unit 430 in the fifth embodiment of the present technology.

FIG. 29 is a diagram schematically illustrating one example of the storage content of the specific fee district information storage unit 460 and the communication history information storage unit 466 in the sixth embodiment of the present technology.

FIG. 30 is a diagram illustrating a display screen example displayed on the display unit 135 of the wireless communication apparatus 130 in the sixth embodiment of the present technology.

FIG. 31 is a block diagram illustrating a functional configuration example of a charging server 206 in the seventh embodiment of the present technology.

FIG. 32 is a block diagram illustrating a functional configuration example of the wireless communication apparatus 620 in the seventh embodiment of the present technology.

FIG. 33 is a diagram schematically illustrating one example of the storage content of the communication quality information storage unit 610 and the area information storage unit 630 in the seventh embodiment of the present technology.

FIG. 34 is a diagram illustrating a display screen example displayed on the display unit 135 of the wireless communication apparatus 620 in the seventh embodiment of the present technology.

FIG. 37 is a diagram schematically illustrating one example of the storage content of the communication unit price information storage unit 720 in the eighth embodiment of the present technology.

DESCRIPTION OF EMBODIMENTS

In the following, modes to implement the present technology (hereafter referred to as "embodiments") are described. The explanation is given in the following order.
1. First Embodiment (charging control: example of calculating charging information on the basis of communication quality such as pilot signal level and CQI)
2. Second Embodiment (charging control: example of calculating charging information on the basis of distance between wireless communication apparatus and base station)
3. Third Embodiment (charging control: example of calculating communication fee on the basis of communication quality and communication scheme)
4. Fourth Embodiment (charging control: example of calculating discounted fee and extra fee according to communication environment of wireless communication apparatus and calculating final communication fee)
5. Fifth Embodiment (charging control: example of setting appropriate telecommunications carrier responding to communication environment of wireless communication apparatus and calculating communication fee according to this set telecommunications carrier)
6. Sixth Embodiment (charging control: example of calculating communication fee in predetermined area (for example, home))
7. Seventh Embodiment (display control: example of displaying guide (communication quality on map) related to communication fee)
8. Eighth Embodiment (radio resource setting control: example of setting radio resources on the basis of information from telecommunications carrier)

1. First Embodiment

Configuration Example of Communication System

Figure 1:
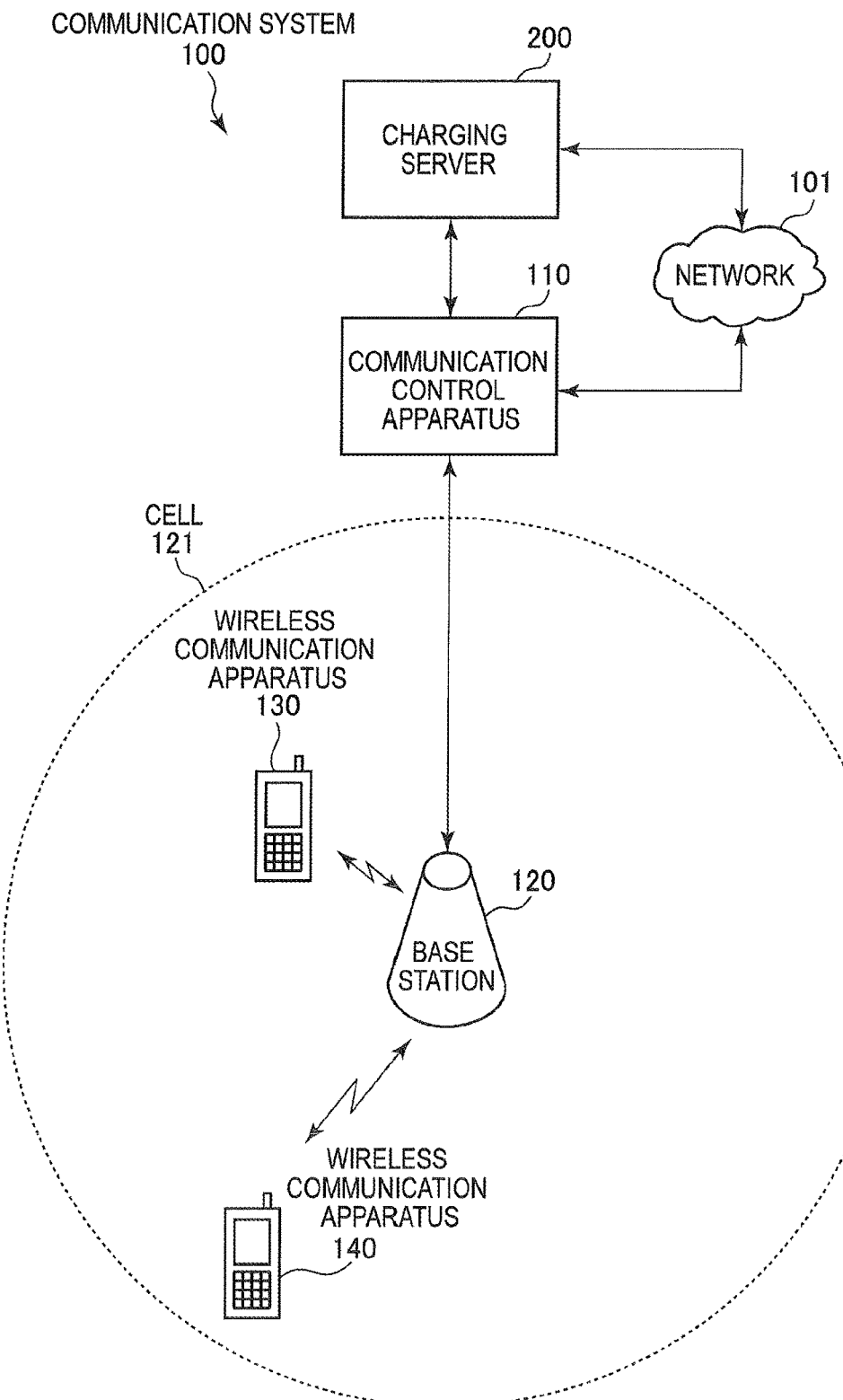
FIG. 1 is a block diagram illustrating a system configuration example of a communication system 100 in the first embodiment of the present technology.

FIG. 1 is a block diagram illustrating a system configuration example of a communication system 100 in the first embodiment of the present technology.

The communication system 100 includes a network 101, a communication control apparatus 110, a base station 120, wireless communication apparatuses 130 and 140 and a charging server 200.

The network 101 is a communication network (for example, public line network) such as a telephone network and the Internet. Moreover, the network 101 and the communication control apparatus 110 are connected via, for example, a gateway (not illustrated).

The charging server 200 is an information processing apparatus that is connected to the communication control apparatus 110 and performs charging processing related to the wireless communication apparatuses 130 and 140 connected to the network 101 via the base station 120 and the communication control apparatus 110. Moreover, the charging server 200 may be connected to the communication control apparatus 110 via the network 101. Here, although FIG. 1 illustrates an example of providing the charging server 200 outside the communication control apparatus 110, a charging processing unit corresponding to the charging server 200 may be provided in the communication control apparatus 110.

Moreover, for example, it is assumed that the charging server 200 is managed by a telecommunications carrier, MVNO (Mobile Virtual Network Operator) or the like who provides wireless connection services. Here, the MVNO means a carrier of a business form, called a "virtual telecommunications carrier."

The communication control apparatus 110 is a communication control apparatus managed by a telecommunications carrier (the first telecommunications carrier) who provides wireless connection services, and controls the base station 120 and performs authentication control of the wireless communication apparatuses 130 and 140 connected via the base station 120. Subsequently, the communication control apparatus 110 connects an authenticated wireless communication apparatus to the network 101. Also, the telecommunications carrier is, for example, a mobile telecommunications carrier who provides wireless connection services.

Here, the communication control apparatus 110 authenticates only a wireless communication apparatus that holds valid contract authentication information among the wireless communication apparatuses connected via the base station 120, except in a specific case. Here, the specific case is, for example, a case of calling for emergency use (for example, a case of calling the police and the fire station, and so on).

Here, the contract authentication information is, for example, USIM (Universal Subscriber Identity Module)

information. Moreover, the contract authentication information is information including telephone subscriber information and authentication key information. In the first embodiment of the present technology, it is assumed that the user who owns the wireless communication apparatus 130 has a contract of wireless connection services with the first telecommunications carrier. Moreover, this contract can be also interpreted as a contract that the user who owns the wireless communication apparatus 130 uses the base station 120 operated by the first telecommunications carrier. Moreover, it is assumed that the same applies to the user who owns the wireless communication apparatus 140.

Moreover, the communication control apparatus 110 transmits various kinds of information transmitted from the wireless communication apparatuses 130 and 140 via the base station 120 and various kinds of information related to communication with the wireless communication apparatuses 130 and 140, to the charging server 200. Moreover, the communication control apparatus 110 transmits various kinds of information output from the charging server 200, to the wireless communication apparatuses 130 and 140 via the base station 120.

The base station 120 is base station which is operated by the first telecommunications carrier and which is a mobile communication base station (NodeB) that connects the wireless communication apparatuses 130 and 140 and the communication control apparatus 110 via a radio link, where the wireless communication apparatuses 130 and 140 hold valid USIM information of the first telecommunications carrier. Moreover, FIG. 1 typically illustrates a range in which radio waves of the base station 120 are available (a range in which wireless communication is possible) as cell 121.

Also, in the embodiment of the present technology, it is assumed that the base station contains the sense of both the base station itself and the cell specified by the base station. For example, in the embodiment of the present technology, it is assumed that a contract to use the base station contains the sense of a contract to use the cell specified by the base station.

The wireless communication apparatuses 130 and 140 denote, for example, a mobile phone apparatus (for example, a mobile phone apparatus or smartphone including a telephone call function and a data communication function) or a data communication apparatus (for example, personal computer) including a wireless communication function, and so on. Here, since there are many common parts between the wireless communication apparatuses 130 and 140, the wireless communication apparatus 130 is chiefly described below and part of explanation of the wireless communication apparatus 140 is omitted.

In the wireless communication apparatus 130, it is assumed that the initial setting of parameters requested to connect to a wireless communication network managed and operated by the first telecommunications carrier is performed on the basis of a contract with the first telecommunications carrier who manages the communication control apparatus 110. For example, this parameter setting is performed by rewriting USIM information requested for connection with the wireless communication network managed by the first telecommunications carrier.

Moreover, for example, the wireless communication apparatus 130 is connected to the base station 120 via a radio link and connected to the communication control apparatus 110 via the base station 120.

Moreover, although only one telecommunications carrier (the first telecommunications carrier) is illustrated in FIG. 1 for ease of explanation, it is similarly applicable in a case where there are two or more telecommunications carriers. Moreover, although only the base station 120 is illustrated as a base station operated by the first telecommunications carrier in FIG. 1 for ease of explanation, it is similarly applicable in a case where there are two or more base stations operated by each telecommunications carrier.

Here, as described above, by installation of HSDPA or the like, the use's use action is changing to the download of music files or the download of packets of a relatively large size the size such as a moving image, and so on. To cope with this demand, a function of AMC (Adaptive Modulation and Coding) called "link adaptation" is implemented after the installation of HSDPA, and the capacity of the base station is improved. Therefore, the base station can transmit data to a wireless communication apparatus of a good communication state in a multivalued modulation method of a high coding rate. That is, communication with the wireless communication apparatus of the good communication state is communication with a relatively low load given to the base station. By contrast with this, communication with a wireless communication apparatus of a poor communication state is communication with a relatively high load given to the base station. Thus, even in a case where the same data is transmitted, the load to the base station varies depending on whether the reception quality of a wireless communication apparatus is good or the reception quality of a wireless communication apparatus is poor.

For example, a case is assumed where each user of the wireless communication apparatuses 130 and 140 that can be connected to the base station 120 uses the identical communication service (for example, download of the same moving image) by the use of the wireless communication apparatuses 130 and 140. In the example illustrated in FIG. 1, it is assumed that the communication state is relatively good in the wireless communication apparatus 130 that exists in place a relatively close to the base station 120. By contrast, it is assumed that the communication state is relatively poor in the wireless communication apparatus 140 that exists in a place relatively far from the base station 120.

In this case, for example, when charging processing is performed by a charging method (a pay-as-you-go method) of performing charging according to the total communication volume (for example, the total value of packets), the substantially same communication fee is calculated for the wireless communication apparatuses 130 and 140 that uses the same communication service. However, as described above, while the load given to the base station 120 is relatively low in a case where the communication state of the wireless communication apparatus 130 is relatively good, the load given to the base station 120 is relatively high in a case where the communication state of the wireless communication apparatus 140 is relatively poor. In this case, instead of applying the substantially same communication fee to the wireless communication apparatuses 130 and 140 that use the same communication service, it is considered to be preferable to apply a communication fee corresponding to the load level of the base station.

By performing charging processing in this way, for example, it leads to a high possibility that the user who uses the wireless communication apparatus 140 tries to decrease the load of the base station 120. Moreover, it is assumed that the charging processing to discount a communication fee according to the decrease of the load of the base station 120 becomes incentive and the user tries communication with a low load. In this case, further improvement of the capacity is expected, and it is considered that it is possible to use radio resources more efficiently. Moreover, in recent years, the traffic is increasing with the popularization of smart phones or the like, and this traffic increase is becoming a trigger to shift a packet fee from the flat-rate system to the pay-as-you-go system. Therefore, it is important to set an appropriate communication unit price based on the load level of a base station.

Then, the first embodiment of the present technology shows an example of calculating charging information on the basis of communication quality such as a pilot signal level and a CQI.

Also, although the first embodiment of the present technology shows an example of calculating charging information with respect to two wireless communication apparatuses 130 and 140, it is similarly applicable to the case of calculating charging information with respect to one or three or more wireless communication apparatuses.

[Configuration Example of Charging Server]

Figure 2:
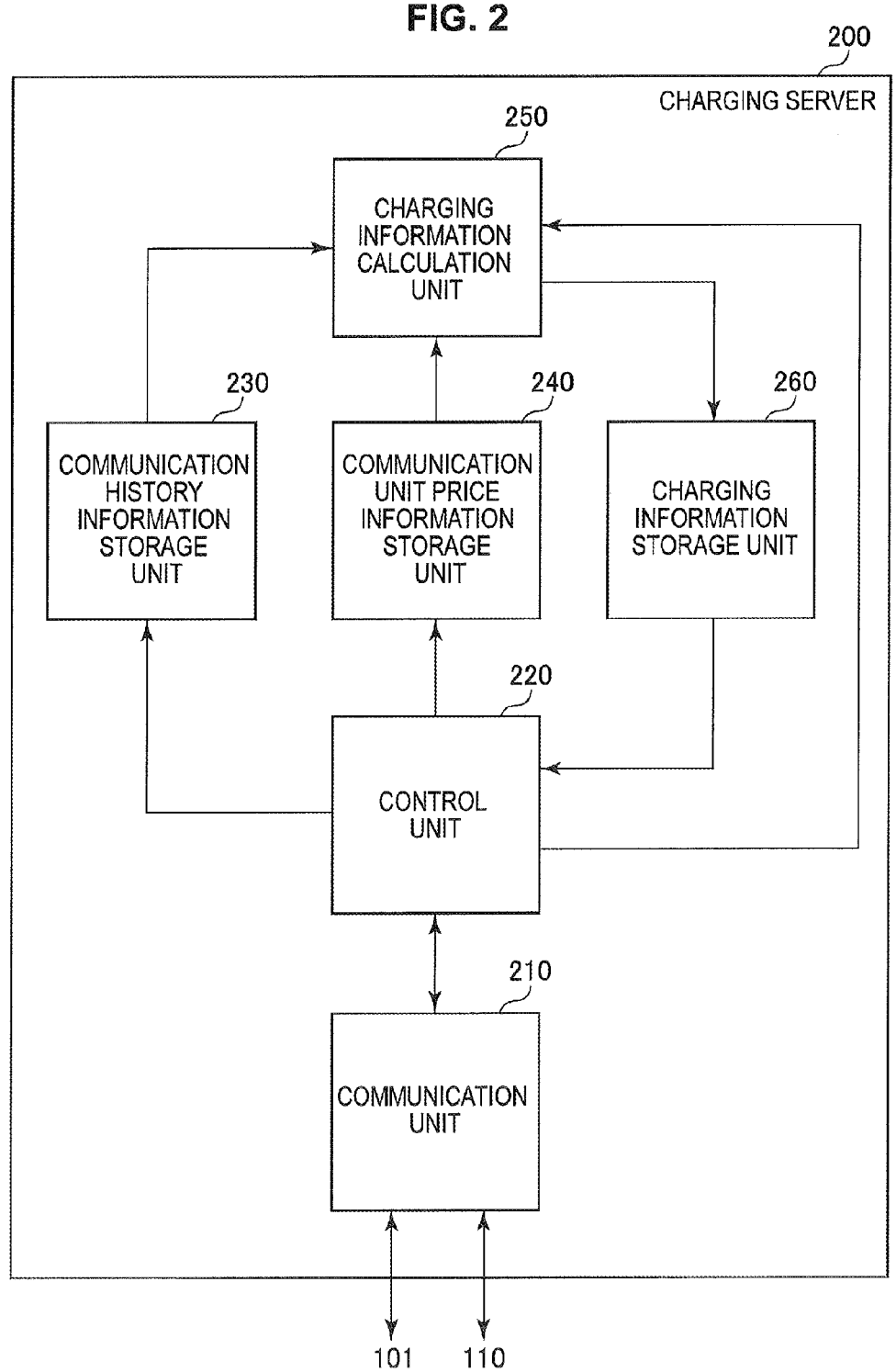
FIG. 2 is a block diagram illustrating a functional configuration example of the charging server 200 in the first embodiment of the present technology.

FIG. 2 is a block diagram illustrating a functional configuration example of the charging server 200 in the first embodiment of the present technology.

The charging server 200 includes a communication unit 210, a control unit 220, a communication history information storage unit 230, a communication unit price information storage unit 240, a charging information calculation unit 250 and a charging information storage unit 260. Here, the charging server 200 is an example of an information processing apparatus described in the claims.

The communication unit 210 performs various kinds of communication with the communication control apparatus 110 on the basis of control of the control unit 220. For example, the communication unit 210 receives each information (for example, the pilot signal level of the base station 120 and the packet count at the time of communication of the wireless communication apparatus) transmitted from the communication control apparatus 110 and outputs this received information to the control unit 220.

Moreover, the communication unit 210 acquires communication unit price information (illustrated in FIG. 4(*a*)) from the communication control apparatus 110 and outputs this acquired communication unit price information to the control unit 220. Moreover, the communication unit 210 outputs charging information stored in the charging information storage unit 260. For example, when a predetermined period expires (for example, end of month), the communication unit 210 outputs the communication expense to the communication control apparatus 110.

The control unit 220 performs various kinds of control on the basis of a control program stored in a memory (not illustrated). For example, the control unit 220 is formed with a microprocessor. For example, the control unit 220 is connected to the communication unit 210 and performs transmission and reception of various kinds of data with the communication control apparatus 110. Moreover, for example, the control unit 220 acquires the communication quality (for example, pilot signal level) at the time of communication of the base station 120 and the wireless communication apparatus 130 which is connected to the network 101 via the base station 120 and which performs communication. For example, this communication quality is included in information from the communication control apparatus 110. For example, the wireless communication apparatus 130 acquires a pilot signal transmitted from the base station 120, and a charging server 203 can acquire information on this pilot signal from the wireless communication apparatus 130 via the communication control apparatus 110. Here, the control unit 220 is an example of an acquisition unit described in the claims.

The communication history information storage unit 230 stores communication history information used at the time of the charging processing by the charging information calculation unit 250, and supplies the stored communication history information to the charging information calculation unit 250. Moreover, each information (for example, the pilot signal level of the base station 120 and the packet count at the time of communication of the wireless communication apparatus) on communication with the wireless communication apparatuses 130 and 140, which is transmitted from the communication control apparatus 110, is recorded in the communication history information storage unit 230 by the control unit 220. Also, the communication history information storage unit 230 is described in detail with reference to FIG. 3.

The communication unit price information storage unit 240 stores communication unit price information used at the time of the charging processing by the charging information calculation unit 250, and supplies the stored communication unit price information to the charging information calculation unit 250. Also, the communication unit price information storage unit 240 is described in detail with reference to FIG. 4(*a*).

The charging information calculation unit 250 performs charging processing of calculating the costs at the time of communication performed by the wireless communication apparatuses 130 and 140, on the basis of the control of the control unit 220. Subsequently, the charging information calculation unit 250 stores charging information calculated by the charging processing in the charging information storage unit 260. That is, the charging information calculation unit 250 performs the charging processing at the time of communication on the basis of, for example, the communication quality at the time of communication between the wireless communication apparatus 130 and the base station 120. For example, the charging information calculation unit 250 calculates the communication fee with respect to the communication volume at the time of communication by the use of a communication unit price corresponding to the communication quality at the time of communication.

The charging information storage unit 260 stores charging information related to communication processing by the wireless communication apparatuses 130 and 140 every wireless communication apparatus, and supplies the stored charging information to the control unit 220. Also, the charging information storage unit 260 is described in detail with reference to FIG. 4(*b*).

As illustrated in FIG. 2, the charging server 200 can be formed with components of a communication history information storage unit 230, the communication unit price information storage unit 240, the charging information calculation unit 250 and the charging information storage unit 260. However, it may be formed with other components that can calculate the identical charging information.

Moreover, FIG. 2 illustrates an example where the communication history information storage unit 230, the communication unit price information storage unit 240, the charging information calculation unit 250 and the charging information storage unit 260 are provided in one information processing apparatus (the charging server 200). However, these units may be separately provided in a plurality of information processing apparatuses (for example, charging servers) and formed. For example, the communication unit price information storage unit 240 may be provided in a charging server managed by the first telecommunications carrier, and the communication history information storage unit 230, the charging information calculation unit 250 and the charging information storage unit 260 may be provided in a charging server managed by other telecommunications carriers who provide communication services.

[Content Example of Communication History Information Storage Unit]

FIG. 3 is a diagram schematically illustrating one example of the storage content of the communication history information storage unit 230 in the first embodiment of the present technology.

The communication history information storage unit 230 is a storage unit to store information (communication history information) on the communication history of each wireless communication apparatus (the wireless communication apparatuses 130 and 140). To be more specific, the communication history information storage unit 230 stores date information 231, terminal identification information 232 and communication history information 233 in association with each other.

The date information 231 denotes information (date) on the date on which communication was performed by a wireless communication apparatus of the charging target.

The terminal identification information 232 denotes identification information to identify a wireless communication apparatus of the charging target. In FIG. 3, for ease of explanation, the telephone number assigned to each wireless communication apparatus is illustrated as the terminal identification information 232. Here, in the first embodiment of the present technology, an explanation is given with an assumption that the telephone number of the wireless communication apparatus 130 is "090-1234-5678" and the telephone number of the wireless communication apparatus 140 is "090-5678-1234." Moreover, other information may be used as the terminal identification information 232. For example, IMEI (International Mobile Equipment Identity) may be used as the terminal identification information 232. Moreover, IMSI (International Mobile Subscriber Identity) may be used. Moreover, the personal ID (identifier) assigned to each carrier for the purpose of specifying the individual may be used as the terminal identification information 232.

The communication history information 233 denotes information on the history of communication performed by a wireless communication apparatus of the charging target. As the communication history information 233, time 234, a packet count 235 and a pilot signal level 236 are recorded in association with each other.

The time 234 denotes information on the time at which communication was performed by a wireless communication apparatus of the charging target, and, for example, the start time and the finish time are recorded. Moreover, the packet count 235 denotes information on the packet count at the time of the communication. Moreover, the pilot signal level 236 denotes information on the communication quality at the time of the communication. These items of information are sequentially recorded in the control unit 220 on the basis of information from the communication control apparatus 110.

Here, in a case where the communication time is relatively long, for example, it is assumed that the pilot signal level changes during the communication by movement of the wireless communication apparatus or the change in the communication environment, and so on. Therefore, in a case where the communication time is relatively long, for example, the pilot signal level during the communication may be sequentially recorded and the average value of this recorded pilot signal level may be recorded as the pilot signal level 236. Moreover, in a case where the communication time is relatively long, for example, the pilot signal level at every certain interval in the communication may be sequentially recorded, and the time 234, the packet count 235 and the pilot signal level 236 may be sequentially recorded every certain interval.

[Content Example of Communication Unit Price Information Storage Unit and Charging Information Storage Unit]

FIG. 4 is a diagram schematically illustrating one example of the storage content of the communication unit price information storage unit 240 and the charging information storage unit 260 in the first embodiment of the present technology.

FIG. 4(a) illustrates the storage content of the communication unit price information storage unit 240. The communication unit price information storage unit 240 denotes a storage unit that stores information (communication unit price information) on the communication unit price corresponding to the communication quality at the time of communication by each wireless communication apparatus. To be more specific, the communication unit price information storage unit 240 stores a pilot signal level 241 and communication unit price information 242 in association with each other.

The pilot signal level 241 denotes information on the communication quality in a case where a wireless communication apparatus performs communication.

The communication unit price information 242 denotes information on the communication unit price applied per one packet in a case where the wireless communication apparatus performs communication.

FIG. 4(b) illustrates the storage content of the charging information storage unit 260. The charging information storage unit 260 denotes a storage unit that stores information (charging information) on a communication fee calculated by the charging information calculation unit 250 when each wireless communication apparatus performs communication. To be more specific, the charging information storage unit 260 stores date information 261 and charging information 262 in association with each other.

The date information 261 denotes information (date) on the date on which a wireless communication apparatus of the charging target performs communication.

The charging information 262 denotes the communication fee of each wireless communication apparatus calculated every date.

That is, the charging information storage unit 260 stores charging information (that is, the charging information of each contractor of a telecommunications carrier) calculated by the charging information calculation unit 250, by the use of each information stored in the communication history information storage unit 230 and the communication unit price information storage unit 240.

Here, regarding a calculation method of the charging information, an example of calculating the charging information of the wireless communication apparatus 130 is described.

As illustrated in FIG. 3, it is recorded that the wireless communication apparatus 130 (telephone number: 090-1234-5678) performs communication of 3122 packets (the packet count 235) at 8:10 on Jun. 1, 2011 (the time 234). Moreover, it is recorded that the communication is performed with communication quality (the pilot signal level 236) of −70 dBm at the time of communication. In this case, the charging information calculation unit 250 acquires these items of information from the communication history information storage unit 230 and acquires the communication unit price information 242 associated with this acquired communication quality (the pilot signal level 236 "−70 dBm") from the communication unit price information storage unit 240. That is, a communication unit price of "0.030 (yen)" associated with communication quality (the pilot signal level 236) of "−70 dBm" is acquired.

Next, the charging information calculation unit 250 calculates a communication fee at the time of communication at 8:10 on Jun. 1, 2011, by the use of the acquired communication unit price of "0.030 (yen)." Specifically, the packet count of "3122 (packets)" at the time of communication at 8:10 on Jun. 1, 2011, and the communication unit price of "0.030 (yen)" associated with the communication quality (pilot signal level) at the time of the communication are multiplied. That is, 93.66 (yen) (=3122 (packet)×0.030 (yen)) is calculated. Similarly, a communication fee is calculated for communication in other time slots (for example, 10:30, 17:35 and 22:22 on June 1). Subsequently, a total communication fee of "422 (yen)" related to the wireless communication apparatus 130 (telephone number: 090-1234-5678) on June 1 is calculated. The charging information calculation unit 250 records the communication fee of "422 (yen)" calculated in this way, in the charging information 262 of "090-1234-5678" corresponding to the date information 261 of "June 1" of the charging information storage unit 260. Similarly, the charging information calculation unit 250 calculates charging information on other dates and other wireless communication apparatuses, and sequentially records each calculated charging information in the charging information storage unit 260. Here, for example, the timing at which the charging information is calculated can be set to a predetermined time (for example, 24 o'clock) of a day, and so on.

Moreover, the charging information calculation unit 250 calculates the total value of the communication fee within a certain period of time (for example, the total value in June) at predetermined timing (for example, 24 o'clock on the end of the month). Subsequently, the communication fee calculated in this way is recorded in the charging information 262 corresponding to the date information 261 of "total (June)" of the charging information storage unit 260.

[Configuration Example of Wireless Communication Apparatus]

Figure 5:
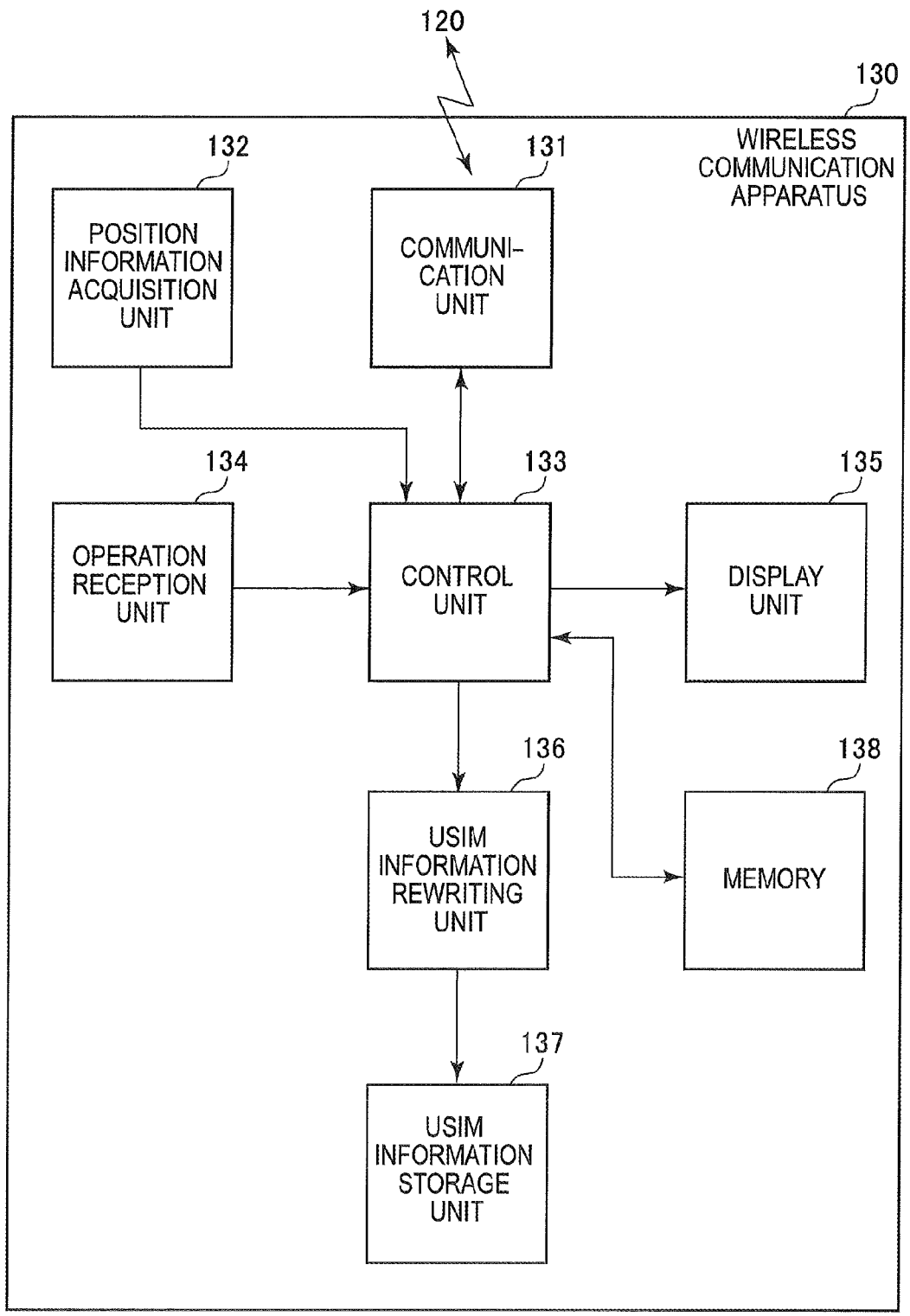
FIG. 5 is a block diagram illustrating a functional configuration example of the wireless communication apparatus 130 in the first embodiment of the present technology.

FIG. 5 is a block diagram illustrating a functional configuration example of the wireless communication apparatus 130 in the first embodiment of the present technology.

The wireless communication apparatus 130 includes a communication unit 131, the position information acquisition unit 132, a control unit 133, an operation reception unit 134, a display unit 135, a USIM information rewriting unit 136, a USIM information storage unit 137 and a memory 138. For example, the wireless communication apparatus 130 is realized by a mobile phone apparatus that can make a call and perform data communication. Also, illustration and explanation of a microphone and a speaker, and so on, are omitted.

The communication unit 131 denotes a communication unit supporting a plurality of wireless communication services, which include a reception unit that receives a radio signal transmitted from each base station and a transmission unit that transmits a radio signal to each base station. For example, the communication unit 131 can perform communication according to CDMA (Code Division Multiple Access) and OFDMA (Orthogonal Frequency Division Multiple Access). Here, CDMA stands for code division multiple access and OFDMA stands for orthogonal frequency division multiple access.

The position information acquisition unit 132 acquires position information showing the position in which the wireless communication apparatus 130 exists, and outputs this acquired position information to the control unit 133. For example, the position information acquisition unit 132 can be realized by a GPS unit that calculates position information on the basis of a GPS signal received by a GPS (Global Positioning System) signal reception antenna. This calculated position information includes each data related to the position such as the latitude, the longitude and the attitude at the time of reception of the GPS signal. Moreover, a position information acquisition apparatus that acquires position information by other position information acquisition methods may be used. For example, it may be possible to use a position information acquisition apparatus that derives position information by the use of access point information by a circumjacent wireless LAN (Local Area Network) and acquires this position information.

The control unit 133 performs various kinds of control on the basis of a control program stored in the memory 138. For example, the control unit 133 is formed with a microprocessor. For example, the control unit 133 is connected to the communication unit 131 and performs transmission and reception of various kinds of data with the communication control apparatus 110 via the base station 120.

The operation reception unit 134 denotes an operation reception unit that receives an operation input operated by the user, and outputs a signal corresponding to the received operation input to the control unit 133. For example, the operation reception unit 134 includes various keys such as numeric keys and alphabetic keys.

The display unit 135 denotes a display unit that displays various kinds of information (such as character information and time information) on the basis of the control of the control unit 133. For example, the display unit 135 displays each information (for example, a display screen illustrated in FIG. 21) to make a connection request. Here, as the display unit 135, for example, it is possible to use display panels such as an organic EL (Electro Luminescence) panel and an LCD (Liquid Crystal Display) panel. Here, the operation reception unit 134 and the display unit 135 can be integrally formed using a touch panel by which the user can perform an operation input by making the user's finger touch or approach a display surface.

The USIM information rewriting unit 136 performs switching processing of USIM information (contract authentication information) held in the USIM information storage unit 137, on the basis of the control of the control unit 133. Here, the state to hold USIM information according to the first telecommunications carrier can be understood as a state to have a connection right to connect to the base station 120 according to the first telecommunications carrier. For example, it is possible to transfer the connection right by validation processing and invalidation processing of the USIM information. Moreover, it is possible to transfer the connection right by the forwarding processing of the USIM information itself. Moreover, the state to hold the USIM information according to the first telecommunications carrier can be understood as a state where parameters requested for connection with the base station 120 according to the first telecommunications carrier are set.

The USIM information storage unit 137 denotes a memory that holds USIM information (contract authentication information). As the USIM information storage unit 137, for example, a UICC (Universal Integrated Circuit) card may be used or a dedicated memory to keep the USIM information secure may be used. Here, in a case where a UICC card is used as the USIM information storage unit 137, USIM information is not fixedly written and the one that can perform validation processing and invalidation processing of the USIM information is used. That is, the USIM information rewriting unit 136 that can perform validation processing and invalidation processing of USIM information is used. Moreover, the one that can perform switching processing of USIM information is used. Here, regarding the validation processing and invalidation processing of USIM information, validation processing and invalidation processing defined in 3GPP (Third Generation Partnership Project) can be performed. For example, these items of processing are performed in a sale shop of mobile phone apparatuses. Here, it may be possible to ensure a secure area in a partial area of the memory 138 and use this area as a storage area of USIM information.

The memory 138 denotes a memory that stores a control program, transmission data and reception data, and so on, to perform various kinds of control by the control unit 133. For example, the memory 138 is formed with a ROM (Read Only Memory) or a RAM (Random Access Memory). Moreover, the memory 138 can store each information (for example, terminal identification information) or the like to specify the wireless communication apparatus 130.

[Example of Using Another Communication Quality]

The example of using the pilot signal level as communication quality has been shown above. Here, an example of using a CQI (Channel Quality Index) as another communication quality is shown. Here, since a communication system illustrated in this example is substantially the same as the communication system 100 illustrated in FIG. 1, the same names are assigned to the common parts with the communication system 100, their explanation is omitted and different points from the communication system 100 are chiefly described.

For example, the communication control apparatus 110 transmits a CQI reported from the wireless communication apparatus 130 or the wireless communication apparatus 140, to the charging server 200. Subsequently, the control unit 220 of the charging server 200 records the CQI transmitted from the communication control apparatus 110 in a CQI 272 (illustrated in FIG. 6) of a communication history information storage unit 270.

Moreover, for example, the communication control apparatus 110 decides signal parameters such as a modulation scheme, a coding rate and the redundancy bit count for error correction, on the basis of the CQI reported from the wireless communication apparatus 130 or the wireless communication apparatus 140. Subsequently, the communication control apparatus 110 controls the base station 120 to transmit information transmitted to the wireless communication apparatus 130 or the wireless communication apparatus 140 on the basis of the decided signal parameters.

[Content Example of Communication History Information Storage Unit]

FIG. 6 is a diagram schematically illustrating one example of the storage content of the communication history information storage unit 270 in the first embodiment of the present technology. Here, since the communication history information storage unit 270 is made by transforming part of the communication history information storage unit 230 illustrated in FIG. 3, the same reference numerals are assigned to the common parts with the communication history information storage unit 230 and their explanation is partially omitted.

The communication history information storage unit 270 stores the date information 231, the terminal identification information 232 and communication history information 271 in association with each other. Moreover, the time 234, the packet count 235 and the CQI 272 are recorded in association with each other, as the communication history information 271.

The CQI 272 denotes information (CQI) on the communication quality at the time of communication performed by a wireless communication apparatus of the charging target.

[Content Example of Communication Unit Price Information Storage Unit]

Figure 7:
FIG. 7 is a diagram schematically illustrating one example of the storage content of a communication unit price information storage unit 273 in the first embodiment of the present technology.

FIG. 7 is a diagram schematically illustrating one example of the storage content of a communication unit price information storage unit 273 in the first embodiment of the present technology. Here, since the communication history information storage unit 273 is made by transforming part of the communication unit price information storage unit 240 illustrated in FIG. 4(*a*), the same reference numerals are assigned to the common parts with the communication unit price information storage unit 240 and their explanation is partially omitted.

The communication unit price information storage unit 273 stores a CQI 274 and the communication unit price information 242 in association with each other.

The CQI 274 denotes information (CQI) on the communication quality at the time of communication performed by a wireless communication apparatus of the charging target.

Moreover, a charging information calculation method is substantially the same as the above-mentioned calculation method (that is, the calculation method using the pilot signal level as communication quality) except for that information used as communication quality is different, and therefore explanation is omitted.

Here, in this example, although an example using a CQI as communication quality between the wireless communication apparatus 130 and the base station 120 is illustrated, another communication quality may be used. For example, one of the SIR (Signal to Interference Ratio), the average power of the pilot signal and the average power of the reference signal can be used as communication quality. Moreover, the relationship between the reception power of the pilot signal from the base station 120 and the total reception power (RSSI (Received Signal Strength Index)) in the same band can be used as communication quality. This relationship is, for example, the value of the ratio between the reception power of the pilot signal from the base station 120 and the total reception power (RSSI) in the same band. Moreover, the relationship between the reception power of the reference signal from the base station 120 and total reception power (RSSI) in the same band can be used as communication quality. This relationship is, for example, the value of the ratio between the reception power of the reference signal from the base station 120 and the total reception power (RSSI) in the same band. Moreover, the relationship between the reception power of the pilot signal from the base station 120 and the total reception power of pilot signals from surrounding base stations existing in the surroundings of the base station 120 can be used as communication quality. For example, this relationship is the value of the ratio between the total reception power of the pilot signals from the surrounding base stations existing in the surroundings of the base station 120 and the reception power of the pilot signal from the base station 120. Moreover, the relationship between the average power of the reference signal from the base station 120 and the total reception power of reference signals from surrounding base stations can be used as communication quality. For example, this relationship is the value of the ratio between the total reception power of the reference signals from the surrounding base stations and the average power of the reference signal from the base station 120. Moreover, an index calculating these in a composite manner can be used as communication quality. For example, this index calculated in a composite manner can be found by performing a predetermined computation (such as addition and multiplication) on a plurality of values. Here, for example, as described above, each value used as this communication quality can be acquired from the wireless communication apparatus 130 via the communication control apparatus 110. For example, the charging server 200 acquires information which the communication control apparatus 110 receives from the wireless communication apparatus 130 (for example, information on the pilot signal or reference signal which the wireless communication apparatus 130 receives from the base station 120). Moreover, regarding each of these values, the charging server 200 can acquire and use the value subjected to computation processing (for example, calculation of the ratio) in the wireless communication apparatus 130 or the communication control apparatus 110. Moreover, the charging server 200 may acquire the value of the computation target, the charging server 200 may perform computation processing and this computation result may be used.

Moreover, signal parameters acquired from the base station 120 or the wireless communication apparatuses 130 and 140 may be used as communication quality. For example, as a signal parameter, it is possible to use one or combination of the CQI, the modulation scheme, the information bit count per symbol, the coding rate and the information bit count excluding the redundancy bit. Moreover, for example, this index calculated in a composite manner can be found by performing a predetermined computation (such as addition and multiplication) on a plurality of values.

Here, in the first embodiment of the present technology, although an example has been shown where the communication control apparatus 110 and the charging server 200 have different configurations, the communication control apparatus 110 and the charging server 200 may be integrally formed. Moreover, a control unit to control a base station in the communication control apparatus 110 may be provided in the base station 120.

[Operation Example of Communication System]

Next, the operation of the communication system 100 in the first embodiment of the present technology is described with reference to the drawings.

[Operation Example of Charging Server]

Figure 8:
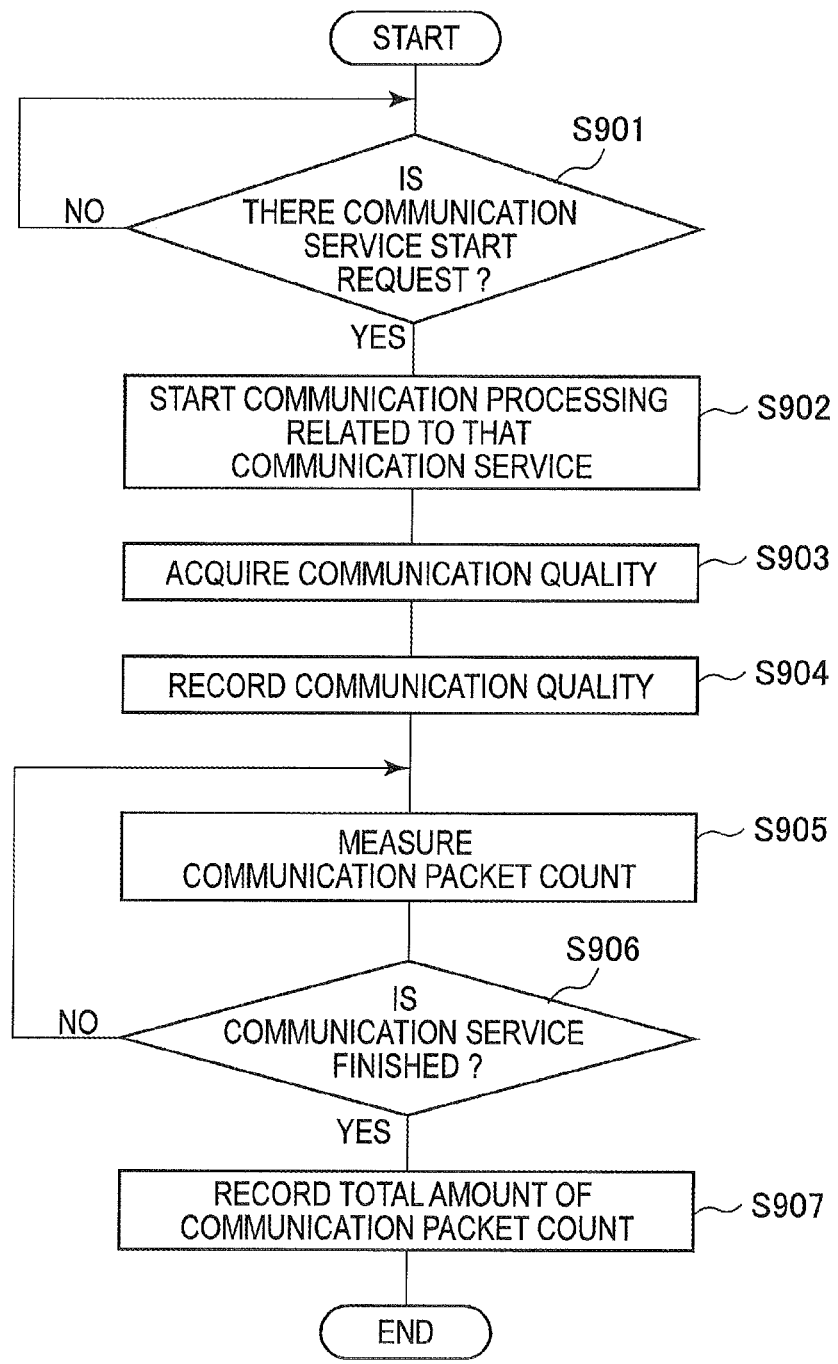
FIG. 8 is a flowchart illustrating one example of a processing procedure of communication history information record processing by the charging server 200 in the first embodiment of the present technology.

FIG. 8 is a flowchart illustrating one example of a processing procedure of communication history information record processing by the charging server 200 in the first embodiment of the present technology.

First, based on information from the communication control apparatus 110, the control unit 220 determines whether there is a communication service start request from a wireless communication apparatus (step S901), and, in a case where there is no communication service start request from the wireless communication apparatus, monitoring is continuously performed. On the other hand, in a case where there is a communication service start request from the wireless communication apparatus (step S901), communication processing related to the communication service starts (step S902). For example, the communication control apparatus 110 starts communication processing related to the communication service.

Subsequently, the control unit 220 acquires the communication quality (for example, pilot signal level) included in the information from the communication control apparatus 110 (step S903). Here, step S903 is an example of the acquisition procedure described in the claims.

Subsequently, the control unit 220 records the acquired communication quality (pilot signal level) in the pilot signal level 236 of the communication history information storage unit 230 (step S904). In this case, the start time of the communication processing related to the communication service is recorded in the time 234 of the communication history information storage unit 230.

Next, the control unit 220 measures the number of communication packets included in the information from the communication control apparatus 110 (step S905). Subsequently, based on the information from the communication control apparatus 110, the control unit 220 determines whether the communication processing related to the communication service is finished (step S906), and, in a case where the communication processing related to the communication service is not finished, it returns to step S905. On the other hand, in a case where the communication processing related to the communication service is finished (step S906), the control unit 220 records the total amount of measured communication packets (the total value of the packet count) in the packet count 235 of the communication history information storage unit 230 (step S907).

Here, in this example, although an example of acquiring the communication quality only at the start time of the communication service has been shown, the communication quality may be recorded at the start time and end time of the communication service or in a fixed or variable period.

Figure 9:
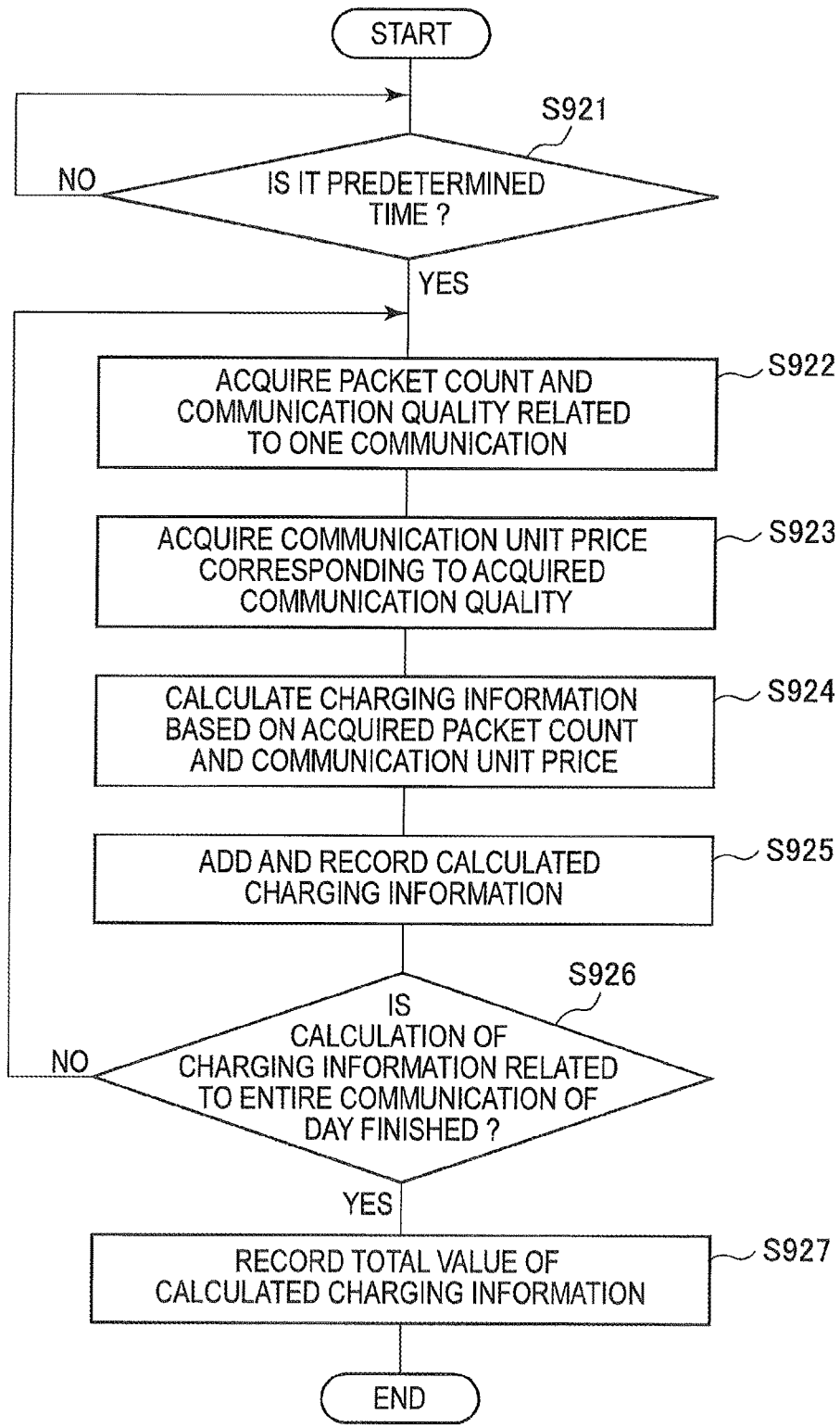
FIG. 9 is a flowchart illustrating one example of a processing procedure of the charging information calculation processing by the charging server 200 in the first embodiment of the present technology.

FIG. 9 is a flowchart illustrating one example of a processing procedure of the charging information calculation processing by the charging server 200 in the first embodiment of the present technology. In this example, an example of calculating charging information with respect to one wireless communication apparatus at a predetermined time of a day is shown.

First, the charging information calculation unit 250 determines whether it is a predetermined time (for example, 12 o'clock of midnight) (step S921), and, in a case where it is not the predetermined time, monitoring is continuously performed. On the other hand, in a case where it is the predetermined time (step S921), the charging information calculation unit 250 acquires the packet count and the communication quality (for example, pilot signal level) related to one communication, in the communication history information stored in the communication history information storage unit 230 (step S922).

Subsequently, the charging information calculation unit 250 acquires a communication unit price corresponding to the acquired communication quality (pilot signal level) from the communication unit price information storage unit 240 (step S923).

Next, the charging information calculation unit 250 calculates charging information on the basis of the acquired packet count and the acquired communication unit price (step S924). Subsequently, the charging information calculation unit 250 sequentially adds and records the calculated charging information (step S925). That is, the charging information for a day is added and recorded.

Subsequently, the charging information calculation unit 250 determines whether calculation of the charging information related to the entire communication of the day is finished (step S926), and, in a case where the calculation of the charging information related to the entire communication of the day is not finished, it returns to step S922. On the other hand, in a case where the calculation of the charging information related to the entire communication of the day is finished (step S926), the charging information calculation unit 250 records the total value of the calculated charging information (the value acquired by sequentially adding and recording the calculated charging information) in the charging information storage unit 260 (step S927). Here, steps S922 to S927 are one example of charging processing described in the claims.

Thus, according to the first embodiment of the present technology, in a case where a communication service is provided by radio, it is possible to apply a communication unit price that varies according to the load given to a base station. By this means, it is possible to perform appropriate charging processing based on the load of the base station.

[Example of Using Communication Unit Price that Varies According to Time Slot]

An example of calculating charging information on the basis of communication quality such as a pilot signal level and a CQI has been shown above. Here, it is generally assumed that the demand for communication services increases in the time slot of daytime while the demand for communication services decreases in the time slot of nighttime. Therefore, it is assumed that the load of a base station in the time slot of nighttime is less than the load of the base station in the time slot of daytime.

Therefore, an example of calculating the charging information by the use of a communication unit price that varies according to the time slot is shown below. Here, since a communication system illustrated in this example is substantially the same as the communication system 100 illustrated in FIG. 1, the same names are assigned to the common parts with the communication system 100, their explanation is omitted and different points from the communication system 100 are chiefly described.

[Content Example of Communication Unit Price Information Storage Unit]

FIG. 10 is a diagram schematically illustrating one example of the storage content of a communication unit price information storage unit 280 in the first embodiment of the present technology. Here, since the communication unit price information storage unit 280 is made by transforming part of the communication unit price information storage unit 240 illustrated in FIG. 4(a), the same reference numerals are assigned to the common parts with the communication unit price information storage unit 240 and their explanation is partially omitted.

The communication unit price information storage unit 280 denotes a storage unit that stores information (communication unit price information) on the communication unit price corresponding to the time slot and communication quality at the time of communication by each wireless communication apparatus. To be more specific, the communication unit price information storage unit 280 stores the pilot signal level 241 and communication unit price information 282 in association with each other.

In a case where the wireless communication apparatus performs communication, the communication unit price information 282 denotes information on the communication unit price applied per one packet. Moreover, in this example, a communication unit price that varies according to the time slot at the time of communication by the wireless communication apparatus is set as the communication unit price information 282. For example, as illustrated in FIG. 10, it is possible to set different communication unit prices in two time slots of the time slot from 01:00 to 09:00 (the time slot from midnight to morning) and the time slot from 09:00 to 01:00 (the time slot from morning to midnight), as the communication unit price information 282.

Moreover, a charging information calculation method is similar to the above-mentioned calculation method, except for that a communication unit price that varies according to the time slot at the time of communication by the wireless communication apparatus is used. That is, in this example, a value that varies every time slot is set as a communication unit price, and the charging information calculation unit 250 calculates a communication fee by the use of the communication unit price based on the time slot at the time of communication.

Thus, a communication unit price is changed according to the communication quality at the time of communication by the wireless communication apparatus, and furthermore, a communication unit price that varies according to the time slot at the time of communication by the wireless communication apparatus can be set. By this means, for example, in a time slot with a low demand (for example, midnight), it is possible to get a communication service with a cheaper communication unit price than a time slot with a high demand (for example, daytime). Thus, it is possible to provide a mechanism in which it is possible to reduce the demand peak as much as possible.

Here, in a time slot with a low demand (for example, midnight), t the communication unit price may be set without any relation to the communication quality. For example, in a time slot with a low demand (for example, midnight), it is possible to make the communication unit price constant regardless of the communication quality. Moreover, in this example, although an example has been shown where a time slot with a low demand is midnight, the time slot with a low demand can be adequately changed according to the position (for example, residential quarter or restaurant street) in which a base station exists.

2. Second Embodiment

In the first embodiment of the present technology, an example of calculating a communication fee on the basis of communication quality such as a pilot signal level and a CQI has been shown. Here, as another mode of the communication quality, it is possible to calculate the communication fee on the basis of the distance between a wireless communication apparatus and a base station.

Therefore, in the second embodiment of the present technology, an example of calculating a communication fee on the basis of the distance between a wireless communication apparatus and a base station is shown. Here, the configuration of a communication system in the second embodiment of the present technology is substantially the same as the example illustrated in FIG. 1, and so on. Therefore, regarding the common parts with the first embodiment of the present technology, the explanation is partially omitted.

[Configuration Example of Charging Server]

Figure 11:
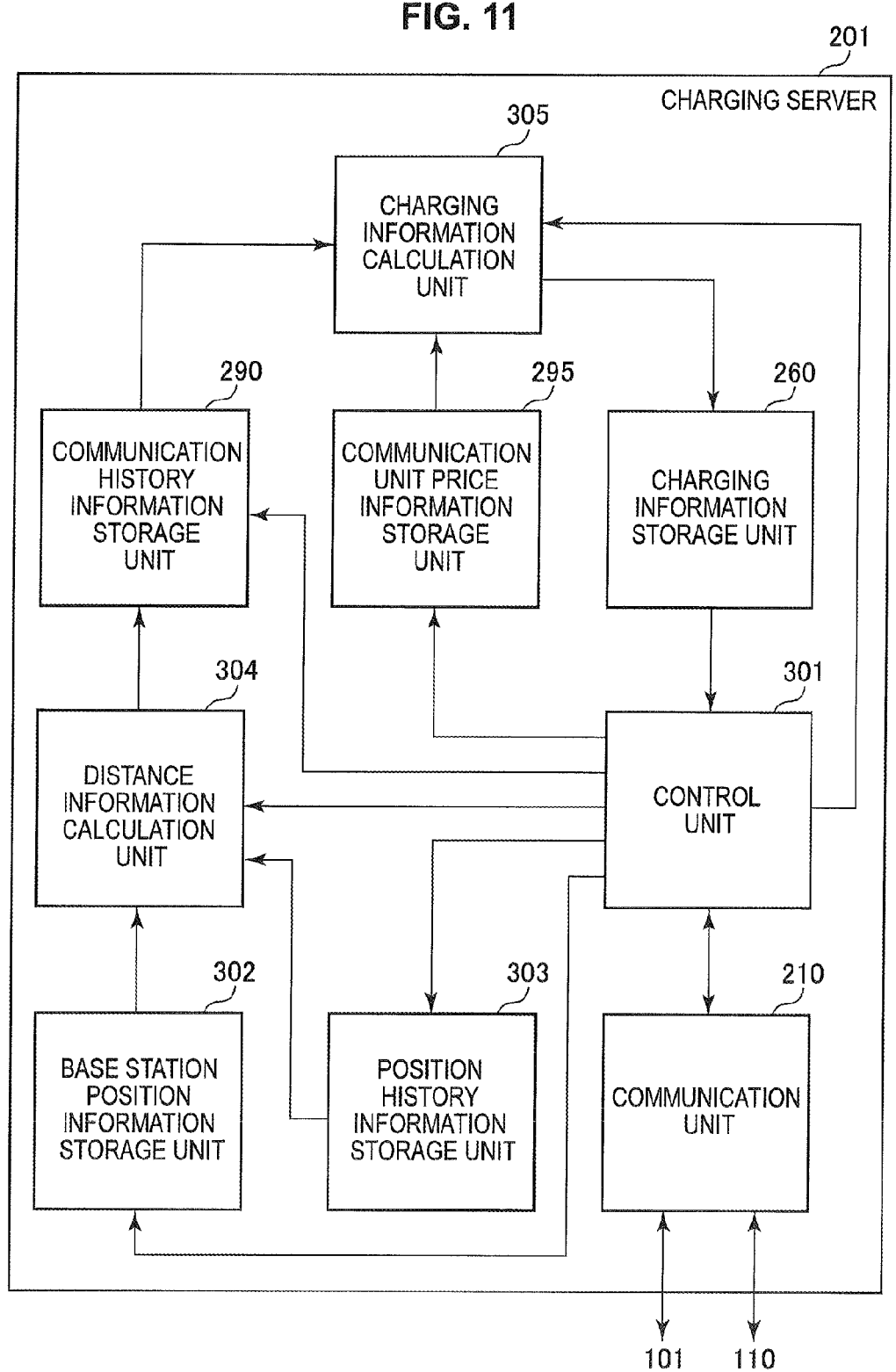
FIG. 11 is a block diagram illustrating a functional configuration example of a charging server 201 in the second embodiment of the present technology.

FIG. 11 is a block diagram illustrating a functional configuration example of a charging server 201 in the second embodiment of the present technology. Here, since the charging server 201 is made by transforming part of the charging server 200 illustrated in FIG. 2, the same reference numerals are assigned to the common parts with the charging server 200 and their explanation is partially omitted.

The charging server 201 includes a communication history information storage unit 290, a communication unit price information storage unit 295, a control unit 301, a base station position information storage unit 302, a position history information storage unit 303, a distance information calculation unit 304 and a charging information calculation unit 305.

The communication history information storage unit 290 stores communication history information used at the time of the charging processing by the charging information calculation unit 305 and supplies the stored communication history information to the charging information calculation unit 305. Also, the communication history information storage unit 290 is described in detail with reference to FIG. 12.

The communication unit price information storage unit 295 stores communication unit price information used at the time of the charging processing by the charging information calculation unit 305 and supplies the stored communication unit price information to the charging information calculation unit 305. Also, the communication unit price information storage unit 295 is described in detail with reference to FIG. 13.

The base station position information storage unit 302 stores information (base station position information) on the position of s base station (for example, the base station 120) and supplies the stored base station position information to the distance information calculation unit 304. For example, the base station position information storage unit 302 stores the cell ID of each base station and the position (for example, latitude and longitude) of each base station in association with each other every base station. Moreover, this base station position information is periodically or irregularly acquired by the control unit 301 and the acquired base station position information is recorded in the base station position information storage unit 302.

The position history information storage unit 303 stores position history information used at the time of distance information calculation by the distance information calculation unit 304 and supplies the stored position history information to the distance information calculation unit 304. To be more specific, the position history information storage unit 303 records information (position history information) associating information on the position in which a wireless communication apparatus exists at the time of communication (wireless communication apparatus position information) and the cell ID of a base station to which the wireless communication apparatus connects at the time of the communication. This position history information is transmitted from each wireless communication apparatus to the communication control apparatus 110 and transmitted from the communication control apparatus 110 to the charging server 201. Subsequently, the control unit 301 sequentially records the position history information transmitted from the communication control apparatus 110 in the position history information storage unit 303 every wireless communication apparatus.

The distance information calculation unit 304 calculates the distance between a wireless communication apparatus at the time of communication and a base station to which the wireless communication apparatus connects at the time of the communication, on the basis of the control of the control unit 301. Subsequently, the distance information calculation unit 304 records information on the calculated distance (distance information) in the communication history information storage unit 290. Specifically, the distance information calculation unit 304 calculates the distance between the wireless communication apparatus and the base station by the use of the base station position information stored in the base station position information storage unit 302 and the position history information stored in the position history information storage unit 303.

For example, the distance information calculation unit 304 acquires the position history information (the position in which the wireless communication apparatus exists, and the cell ID) stored in the position history information storage unit 303. Subsequently, the distance information calculation unit 304 acquires the position of a base station corresponding to the cell ID of the acquired position history information, from the base station position information storage unit 302. Subsequently, the distance information calculation unit 304 calculates the distance between the wireless communication apparatus and the base station on the basis of the position acquired from the position history information storage unit 303 (the position in which the wireless communication apparatus exists) and the base station position acquired from the base station position information storage unit 302. As this distance, for example, the Euclidean distance between two points can be calculated. This Euclidean distance denotes a distance specified by the position (latitude and longitude) of the wireless communication apparatus and the position (latitude and longitude) of the base station.

[Content Example of Communication History Information Storage Unit]

FIG. 12 is a diagram schematically illustrating one example of the storage content of the communication history information storage unit 290 in the second embodiment of the present technology. Here, since the communication history information storage unit 290 is made by transforming part of the communication history information storage unit 230 illustrated in FIG. 3, the same reference numerals are assigned to the common parts with the communication history information storage unit 230 and their explanation is partially omitted.

The communication history information storage unit 290 stores the date information 231, the terminal identification information 232 and communication history information 291 in association with each other. Moreover, the time 234, the packet count 235 and a distance 292 are recorded in association with each other, as the communication history information 291.

The distance 292 denotes a distance calculated by the distance information calculation unit 304. That is, the distance between the wireless communication apparatus at the time of communication and the base station is recorded in the distance 292.

[Content Example of Communication Unit Price Information Storage Unit]

FIG. 13 is a diagram schematically illustrating one example of the storage content of the communication unit price information storage unit 295 in the second embodiment of the present technology. Here, since the communication unit price information storage unit 295 is made by transforming part of the communication unit price information storage unit 240 illustrated in FIG. 4(*a*), the same reference numerals are assigned to the common parts with the communication unit price information storage unit 240 and their explanation is partially omitted.

The communication unit price information storage unit 295 denotes a storage unit that stores information (communication unit price information) on the communication unit price corresponding to the distance at the time of communication by each wireless communication apparatus (the distance between the wireless communication apparatus and a base station). Specifically, the communication unit price information storage unit 295 stores a distance 296 and the communication unit price information 242 in association with each other. The distance 296 denotes the distance between the wireless communication apparatus at the time of communication and the base station.

Moreover, a charging information calculation method by the charging information calculation unit 305 is similar to the above-mentioned calculation method, except for that the communication unit price according to the distance at the time of communication by the wireless communication apparatus is used. That is, in this example, the charging information calculation unit 305 calculates a communication fee by using information specified by the relationship between the position of the wireless communication apparatus and the position of the base station as communication quality. Here, the information specified by the relationship between the position of the wireless communication apparatus and the position of the base station denotes, for example, the distance between the wireless communication apparatus and the base station.

Thus, according to the second embodiment of the present technology, it is possible to calculate charging information by using a communication unit price according to the distance at the time of communication by a wireless communication apparatus as communication quality at the time of communication by the wireless communication apparatus. By this means, it is possible to perform appropriate charging processing according to the load of a base station.

3. Third Embodiment

In the first and second embodiments of the present technology, examples of calculating a communication fee on the basis of communication quality (including a distance) have been shown. Here, for example, it is assumed to use a communication service by a different communication scheme according to a wireless communication apparatus.

Therefore, in the third embodiment of the present technology, an example of calculating a communication fee on the basis of the communication quality and communication scheme is shown. Here, the configuration of a communication system in the third embodiment of the present technology is substantially the same as the example illustrated in FIG. 1. Therefore, regarding the common parts with the first embodiment of the present technology, the explanation is partially omitted.

[Configuration Example of Charging Server]

Figure 14:
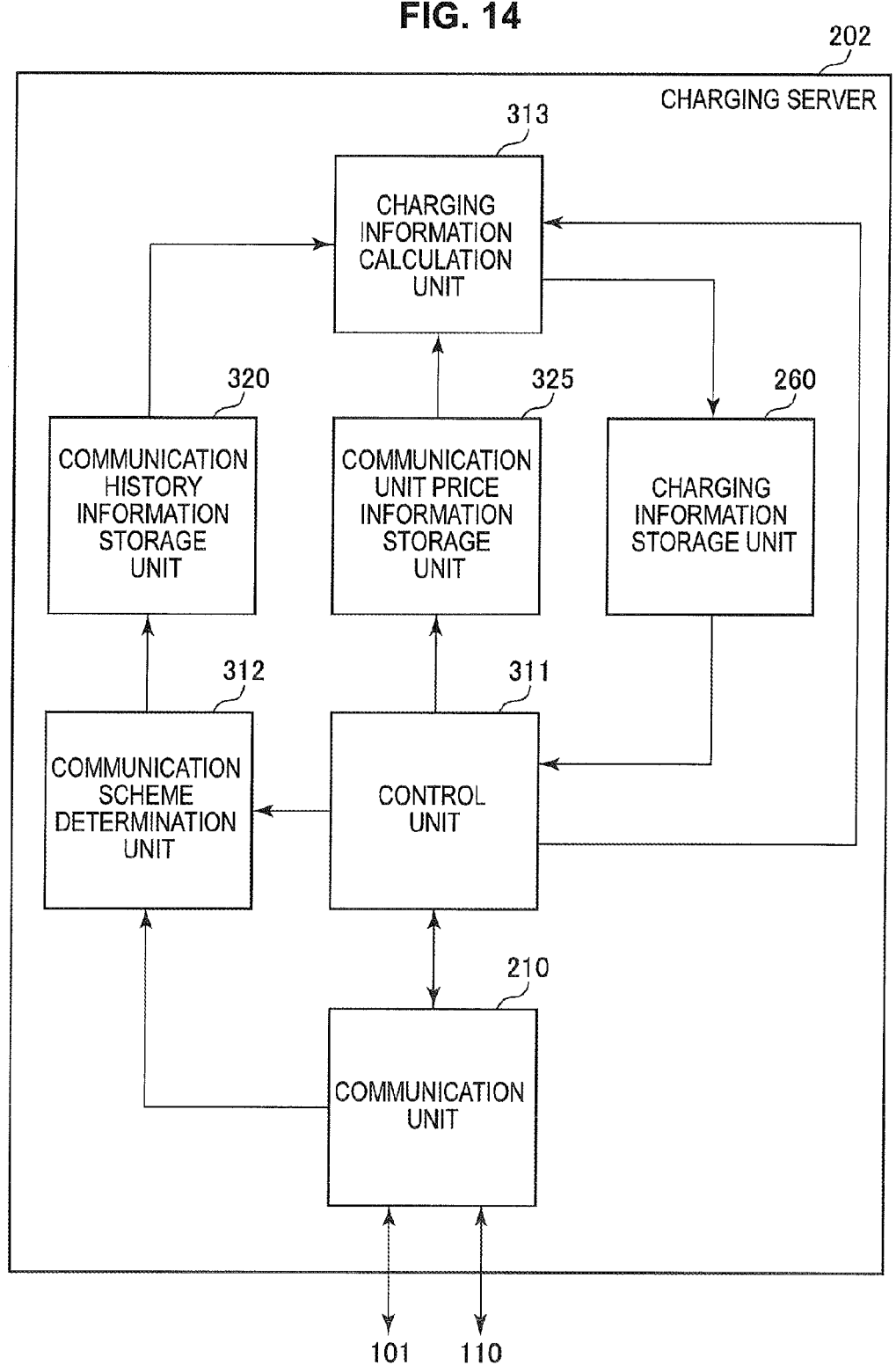
FIG. 14 is a block diagram illustrating a functional configuration example of a charging server 202 in the third embodiment of the present technology.

FIG. 14 is a block diagram illustrating a functional configuration example of a charging server 202 in the third embodiment of the present technology. Here, since the charging server 202 is made by transforming part of the charging server 200 illustrated in FIG. 2, the same reference numerals are assigned to the common parts with the charging server 200 and their explanation is partially omitted.

The charging server 202 includes a control unit 311, a communication scheme determination unit 312, a charging information calculation unit 313, a communication history information storage unit 320 and a communication unit price information storage unit 325.

Based on control of the control unit 311, the communication scheme determination unit 312 determines a communication scheme related to a communication service in a case where the wireless communication apparatus receives the communication service, and records the determination result (communication scheme) in the communication history information storage unit 320. Specifically, in a case where the wireless communication apparatus receives a communication service via the base station 120, the communication scheme determination unit 312 determines which communication scheme is used for communication related to the communication service, on the basis of information from the communication control apparatus 110 or the base station 120.

Here, as a communication scheme of the determination target in the determination processing by the communication scheme determination unit 312, it is possible to determine the code division multiplexing scheme and the orthogonal frequency division multiple access scheme. Moreover, besides this, it is possible to determine communication schemes of FDD (Frequency Division Duplex) and TDD (Time Division Duplex). Moreover, it is possible to determine the difference in a used bandwidth and the difference in protocols such as UDP (User Datagram Protocol) and TCP (Transmission Control Protocol). Moreover, it is possible to determine the difference in communication schemes such as CDMA (Code Division Multiple Access) 2000 and W-CDMA. Similarly, it is possible to determine the differences in communication schemes such as WiMAX (Worldwide Interoperability for Microwave Access), LTE (Long Term Evolution) and LTE-Advanced.

The communication history information storage unit 320 stores communication history information used at the time of the charging processing by the charging information calculation unit 313 and supplies the stored communication history information to the charging information calculation unit 313. Also, the communication history information storage unit 320 is described in detail with reference to FIG. 15.

The communication unit price information storage unit 325 stores communication unit price information used at the time of the charging processing by the charging information calculation unit 313 and supplies the stored communication unit price information to the charging information calculation unit 313. Also, the communication unit price information storage unit 325 is described in detail with reference to FIG. 16.

[Content Example of Communication History Information Storage Unit]

FIG. 15 is a diagram schematically illustrating one example of the storage content of the communication history information storage unit 320 in the third embodiment of the present technology. Here, since the communication history information storage unit 320 is made by transforming part of the communication history information storage unit 270 illustrated in FIG. 6, the same reference numerals are assigned to the common parts with the communication history information storage unit 270 and their explanation is partially omitted.

The communication history information storage unit 320 stores the date information 231, the terminal identification information 232 and communication history information 321 in association with each other. Moreover, the time 234, a packet count 322 and the CQI 272 are recorded in association with each other, as the communication history information 321.

The packet count 322 denotes information on the number of packets at the time of communication performed by a wireless communication apparatus of the charging target, and is classified every communication scheme determined by the communication scheme determination unit 312 and stored. Moreover, in the third embodiment of the present technology, an example of classifying and storing the number of packets of a communication service provided in HSPA (High Speed Packet Access) and the number of packets of a communication service provided in LTE is shown.

[Content Example of Communication Unit Price Information Storage Unit]

FIG. 16 is a diagram schematically illustrating one example of the storage content of the communication unit price information storage unit 325 in the third embodiment of the present technology. Here, since the communication unit price information storage unit 325 is made by transforming part of the communication unit price information storage unit 273 illustrated in FIG. 7, the same reference numerals are assigned to the common parts with the communication unit price information storage unit 273 and their explanation is partially omitted.

The communication unit price information storage unit 325 denotes a storage unit that classifies and stores information on the communication unit price corresponding to the CQI at the time of communication by each wireless communication apparatus (communication unit price information) every communication scheme. To be more specific, the communication unit price information storage unit 325 stores the CQI 274 and communication unit price information 327 in association with each other.

The communication unit price information 327 denotes information on the communication unit price applied per one packet in a case where the wireless communication apparatus performs communication, and a different communication unit price is set every communication scheme. For example, it is possible to set the communication unit price such that a communication service through LTE is a more expensive communication service than a communication service through HSPA.

Moreover, in a case where the charging information calculation unit 313 calculates charging information, a communication unit price corresponding to a communication scheme in which the number of packets is stored in the packet count 322 of the communication history information storage unit 320 is acquired from the communication unit price information 327 of the communication unit price information storage unit 325 and used. For example, regarding communication of the wireless communication apparatuses 130 (telephone number: 090-1234-5678) at 8:10 on Jun. 1, 2011 (the time 234), the number of packets is stored in the packet count 322 of "HSPA." Therefore, the communication unit price of the communication unit price information 327 of "HSPA" in the communication unit price information storage unit 325 is used. Meanwhile, regarding communication of the wireless communication apparatuses 130 (telephone number: 090-1234-5678) at 10:30 on Jun. 1, 2011 (the time 234), the number of packets is stored in the packet count 322 of "LTE." Therefore, the communication unit price of the communication unit price information 327 of "LTE" in the communication unit price information storage unit 325 is used. Here, since it is similar to the above-mentioned calculation method except for that the communication unit price corresponding to a communication scheme is used, the explanation is omitted. Here, in LTE, since operation in various frequency bandwidths (for example, 5 MHz and 10 MHz) is assumed, it may be possible to set a value that varies according to the bandwidth as a communication unit price in LTE. Similarly, since operation by multicarrier is assumed even in HSPA, it may be possible to set a value that varies according to the bandwidth as a communication unit price in HSPA.

Thus, in the third embodiment of the present technology, a value that varies every communication scheme is set as a communication unit price. Moreover, the charging information calculation unit 313 calculates a communication fee by the use of the communication unit price corresponding to a communication scheme at the time of communication.

Thus, according to the third embodiment of the present technology, it is possible to calculate charging information by the use of the communication unit price corresponding to a communication scheme at the time of communication. By this means, it is possible to perform appropriate charging according to the load of a base station.

4. Fourth Embodiment

In the first embodiment of the present technology, an example of calculating a communication fee on the basis of communication quality has been shown. That is, in the first embodiment of the present technology, an example of directly calculating a communication fee on the basis of communication quality has been shown. However, it may be possible to calculate a communication fee by the use of a fixed communication unit price, calculate a discounted fee on the basis of communication quality and calculate the final communication fee on the basis of the calculated communication fee and the calculated discounted fee.

Moreover, in a case where the congestion degree is comparatively high or the like, it may be possible to calculate an extra fee according to the communication environment and calculate the final communication fee on the basis of the calculated communication fee and the calculated extra fee.

Therefore, the fourth embodiment of the present technology shows an example of calculating a discounted fee and an extra fee to the communication environment of a wireless communication apparatus and calculating the final communication fee by the use of these discounted fees and extra fee. Here, a configuration of a communication system in the fourth embodiment of the present technology is substantially the same as the example illustrated in FIG. 3 or the like. Therefore, regarding the common parts with the first embodiment of the present technology, the explanation is partially omitted.

[Configuration Example of Charging Server]

Figure 17:
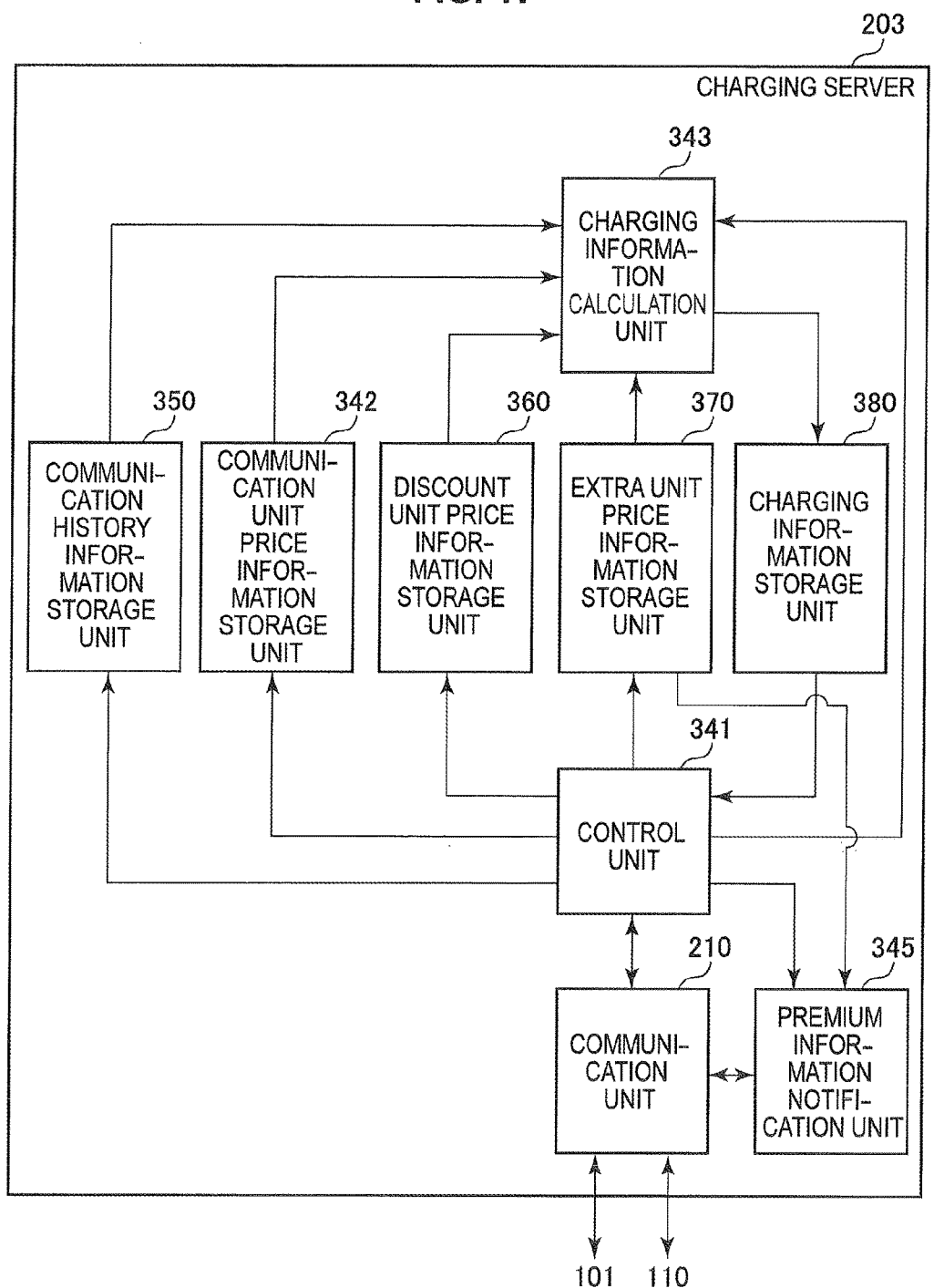
FIG. 17 is a block diagram illustrating a functional configuration example of the charging server 203 in the fourth embodiment of the present technology.

FIG. 17 is a block diagram illustrating a functional configuration example of the charging server 203 in the fourth embodiment of the present technology. Here, since the charging server 203 is made by transforming part of the charging server 200 illustrated in FIG. 2, the same reference numerals are assigned to the common parts with the charging server 200 and their explanation is partially omitted.

The charging server 203 includes a control unit 341, a communication unit price information storage unit 342, a charging information calculation unit 343, a premium information notification unit 345, a communication history information storage unit 350, a discount unit price information storage unit 360, an extra unit price information storage unit 370 and a charging information storage unit 380.

The communication unit price information storage unit 342 stores communication unit price information used at the time of the charging processing by the charging information calculation unit 343 (information on a fixed communication unit price) and supplies the stored communication unit price information to the charging information calculation unit 343. Here, unlike the first to third embodiments of the present technology, the communication unit price information storage unit 342 stores the information on the fixed communication unit price.

The premium information notification unit 345 notifies a generation effect of an extra fee (premium information) to a wireless communication apparatus in which an extra fee is generated, on the basis of the control of the control unit 341. That is, the premium information notification unit 345 acquires the congestion degree of a base station at the time of communication by a wireless communication apparatus that is performing communication. For example, the premium information notification unit 345 acquires the congestion degree of a base station at the time of communication, from a wireless communication apparatus that is performing the communication, a base station connected to the wireless communication apparatus that is performing the communication or a communication control apparatus that controls the base station, via the communication unit 210. Subsequently, in a case where extra unit price information stored in the extra unit price information storage unit 370 and the acquired congestion degree are compared and an extra fee is generated in the wireless communication apparatus that is performing the communication, the premium information notification unit 345 notifies a generation effect of an extra fee (premium information). In this case, for example, the premium information notification unit 345 transmits premium information (for example, information to display a display screen illustrated in FIG. 21) to the wireless communication apparatus in which the extra fee is generated, via the communication unit 210, the communication control apparatus 110 and the base station 120. The wireless communication apparatus having received this premium information displays the message on a display unit (for example, a display screen illustrated in FIG. 21).

Moreover, by making each wireless communication apparatus hold premium information to display the message and transmitting control information from the premium information notification unit 345 to the wireless communication apparatus, the wireless communication apparatus may be caused to display the message on the display unit. Thus, in a case where the congestion degree of the base station satisfies a predetermined condition (for example, in the case of being equal to or greater than a threshold), the premium information notification unit 345 notifies a generation effect of the extra fee to the wireless communication apparatus. Here, it may be possible to apply an extra fee that varies every threshold, by the use of a plurality of thresholds. Here, the premium information notification unit 345 is an example of a notification unit described in the claims.

The communication history information storage unit 350 stores communication history information used at the time of the charging processing by the charging information calculation unit 343 and supplies the stored communication history information to the charging information calculation unit 343. Also, the communication history information storage unit 350 is described in detail with reference to FIG. 18.

The discount unit price information storage unit 360 stores discount unit price information (information on a discount unit price with respect to a fixed communication unit price) used at the time of the charging processing by the charging information calculation unit 343 and supplies the stored discount unit price information to the charging information calculation unit 343. That is, the discount unit price information is set as a discount unit price with respect to the communication unit price information (fixed communication unit price) stored in the communication unit price information storage unit 342. Also, the discount unit price information storage unit 360 is described in detail with reference to FIG. 19(a).

The extra unit price information storage unit 370 stores extra unit price information (information on an extra unit price with respect to a fixed communication unit price) used at the time of the charging processing by the charging information calculation unit 343 and supplies the stored extra unit price information to the charging information calculation unit 343. Also, the extra unit price information storage unit 370 is described in detail with reference to FIG. 19(b).

The charging information storage unit 380 holds charging information related to communication processing by the wireless communication apparatuses 130 and 140, every wireless communication apparatus, and supplies the stored charging information to the control unit 341. Also, the charging information storage unit 380 is described in detail with reference to FIG. 20.

[Content Example of Communication History Information Storage Unit]

FIG. 18 is a diagram schematically illustrating one example of the storage content of the communication history information storage unit 350 in the fourth embodiment of the present technology. Here, since the communication history information storage unit 350 is made by transforming part of the communication history information storage unit 230 illustrated in FIG. 3, the same reference numerals are assigned to the common parts with the communication history information storage unit 230 and their explanation is partially omitted.

The communication history information storage unit 350 stores the date information 231, the terminal identification information 232 and communication history information 351 in association with each other. Moreover, the time 234, the packet count 235, the pilot signal level 236 and a congestion degree 352 are recorded in association with each other, as the communication history information 351.

The congestion degree 352 denotes information on the congestion degree of a base station at the time of communication by a wireless communication apparatus. Here, the congestion degree of the base station at the time of communication can be acquired from the wireless communication apparatus that is performing the communication, the base station connected to the wireless communication apparatus that is performing the wireless communication apparatus or a communication control apparatus that controls the base station. For example, a wireless communication apparatus that acquired the congestion degree of a base station that receives a communication service can transmit the acquired congestion degree to the charging server 203 via the communication control apparatus 110. Moreover, a wireless communication apparatus that receives a communication service can detect the congestion degree of a base station that receives the communication service, and transmit this detected congestion degree to the charging server 203 via the communication control apparatus 110. For example, as a method of detecting the congestion degree of a base station by a wireless communication apparatus, in the case of the W-CDMA scheme, it is possible to use a correlation detection value acquired by cell search and surrounding cell search performed at the standby time or by cell reselection processing. Moreover, in the case of OFDMA, by detecting information on the ratio of an actually assigned subcarrier count to the total subcarrier count of each frame, it is possible to detect the congestion degree of the base station.

[Content Example of Discount Unit Price Information Storage Unit and Extra Unit Price Information Storage Unit]

FIG. 19 is a diagram schematically illustrating one example of the storage content of the discount unit price information storage unit 360 and the extra unit price information storage unit 370 in the fourth embodiment of the present technology.

FIG. 19(a) illustrates the storage content of the discount unit price information storage unit 360. The discount unit price information storage unit 360 denotes a storage unit that stores information (discount unit price information) on a discount unit price corresponding to the pilot signal level at the time of communication by each wireless communication apparatus. To be more specific, the discount unit price information storage unit 360 stores a pilot signal level 361 and discount unit price information 362 in association with each other. Here, information on communication quality different from the pilot signal level (for example, information on a discount unit price corresponding to the abovementioned CQI or SIR (discount unit price information)) may be stored in the discount unit price information storage unit 360, and this information may be used.

The pilot signal level 361 denotes information on communication quality in a case where a wireless communication apparatus performs communication.

In a case where the wireless communication apparatus performs communication, the discount unit price information 362 denotes information on a discount unit price applied per one packet. This discount unit price is set as a discount unit price with respect to communication unit price information (fixed communication unit price) stored in the communication unit price information storage unit 342.

FIG. 19(b) illustrates the storage content of the extra unit price information storage unit 370. The extra unit price information storage unit 370 denotes a storage unit that stores information (extra unit price information) on an extra unit price corresponding to the congestion degree of a base station at the time of communication by each wireless communication apparatus. To be more specific, the extra unit price information storage unit 370 stores a congestion degree 371 and extra unit price information 372 in association with each other. Here, information different from the congestion degree of the base station (for example, information on an extra unit price corresponding to the number of wireless communication apparatuses connected to the base station (extra unit price information)) may be stored in the extra unit price information storage unit 370, and this information may be used.

The congestion degree 371 denotes the congestion degree of the base station at the time of communication by the wireless communication apparatus.

In a case where the wireless communication apparatus performs communication, the extra unit price information 372 denotes information on an extra unit price applied per one packet. This extra unit price is set as an extra unit price with respect to communication unit price information (fixed communication unit price) stored in the communication unit price information storage unit 342.

[Content Example of Charging Information Storage Unit]

FIG. 20 is a diagram schematically illustrating one example of the storage content of the charging information storage unit 380 in the fourth embodiment of the present technology. Here, since the charging information storage unit 380 is made by transforming part of the charging information storage unit 260 illustrated in FIG. 4(b), the same reference numerals are assigned to the common parts with the charging information storage unit 260 and their explanation is partially omitted.

The charging information storage unit 380 denotes a storage unit that stores information (charging information) on the communication fee calculated by the charging information calculation unit 343 when each wireless communication apparatus performs communication. To be more specific, the charging information storage unit 380 stores the date information 261 and charging information 381 in association with each other.

The charging information 381 denotes the communication fee of each wireless communication apparatus, which is calculated every date, and the fixed amount, the discount amount and the premium amount are classified and stored. That is, as for the fixed amount of the charging information 381, the fixed amount calculated by the charging information calculation unit 343 is stored by the use of communication unit price information stored in the communication unit price information storage unit 342. Moreover, as for the discount amount of the charging information 381, the discount amount calculated by the charging information calculation unit 343 is stored by the use of discount unit price information stored in the discount unit price information storage unit 360. Moreover, as for the premium amount of the charging information 381, the premium amount calculated by the charging information calculation unit 343 is stored by the use of extra unit price information stored in the extra unit price information storage unit 370.

Also, FIG. 20 illustrates an example of classifying and storing the fixed amount, the discount amount and the premium amount, as the charging information 381. However, the value acquired by subtracting the discount amount from the fixed amount and adding the premium amount may be stored in the charging information 381 as a final communication fee.

[Display Example of Premium Information Notification Screen]

FIG. 21 is a diagram illustrating a display screen example displayed on the display unit 135 of the wireless communication apparatus 130 in the fourth embodiment of the present technology. Here, although an explanation is given using the wireless communication apparatus 130 as an example in FIG. 21, the same applies to the wireless communication apparatus 140. Moreover, these display screens are displayed on the display unit 135 on the basis of information (premium information and control information) transmitted from the premium information notification unit 345.

FIG. 21(a) illustrates a premium information notification screen 390 to notify a generation effect of an extra fee to the user. A message concerning the generation effect of the extra fee and a confirmation button 391 are displayed on the premium information notification screen 390.

The confirmation button 391 denotes a button pressed after the user confirms the message (message concerning the generation effect of the extra fee) in the premium information notification screen 390. When the confirmation button 391 is pressed, other screens (for example, a display screen during communication) are displayed.

FIG. 21(b) illustrates premium information notification screen 395 to notify a generation effect of an extra fee to the user and make the user select whether to execute a communication service.

A message to select whether to execute the communication service that causes the extra fee, s YES button 396 and a NO button 397 are displayed on the premium information notification screen 395.

The YES button 396 denotes a button pressed in a case where the current communication service is executed even if the extra fee is generated. If the YES button 396 is pressed, other screens (for example, a display screen during communication) are displayed.

The No button 397 denotes a button pressed in a case where the current communication service is not executed. If the NO button 397 is pressed, a display screen concerning non-execution of the current communication service is displayed and processing to stop the current communication service is performed.

Here, in FIG. 21(b), an example has been illustrated where an operation input to select whether to execute a communication service is performed on a display screen of a touch panel system. However, for example, whether to execute the communication service may be assigned to specific operation members (for example, key buttons), and the necessity of execution of the communication service may be selected by the press operation of these operation members.

Figure 22:
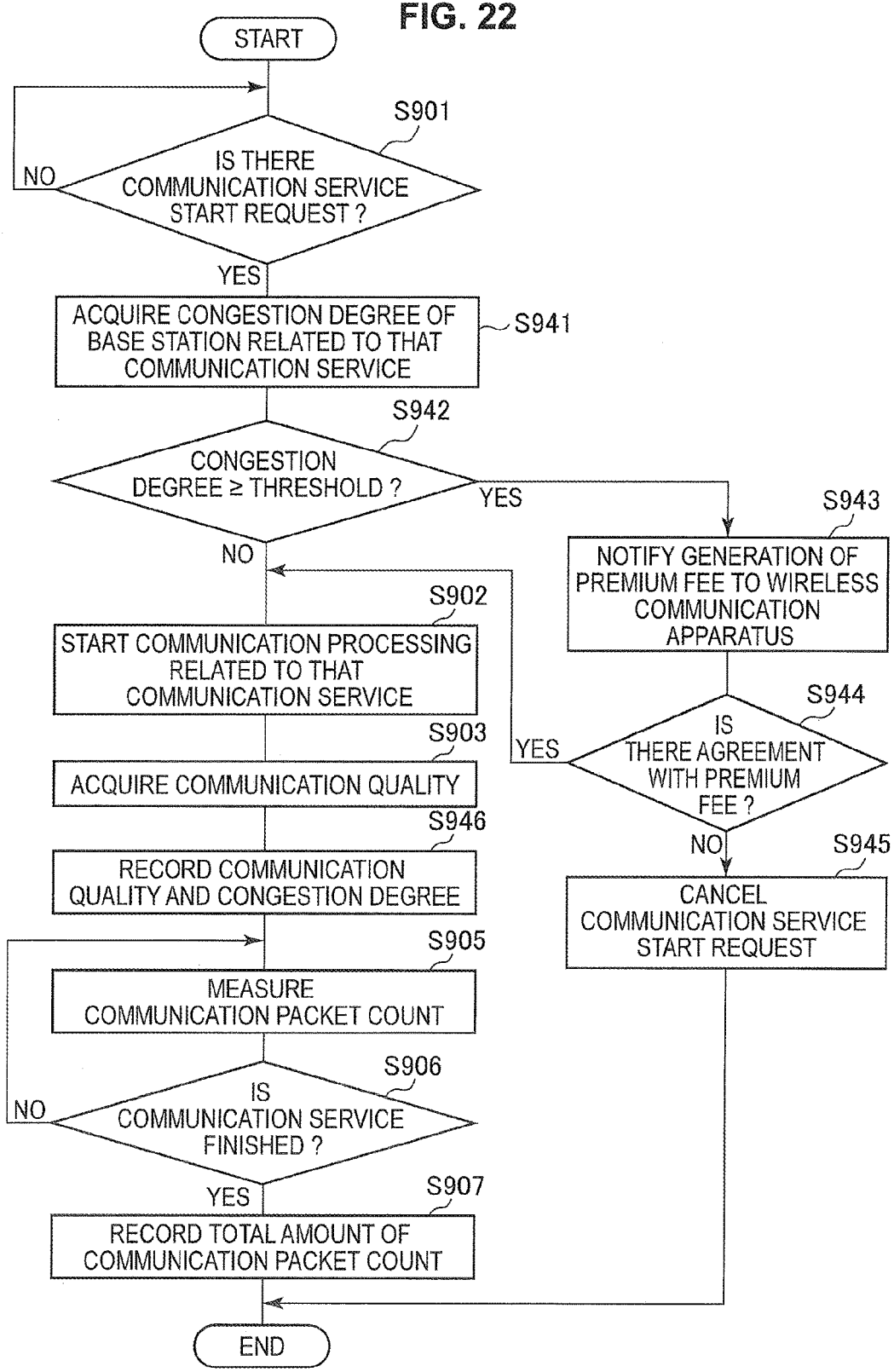
FIG. 22 is a flowchart illustrating one example of a processing procedure of communication history information record processing by the charging server 203 in the fourth embodiment of the present technology.

[Operation Example of Charging Server] FIG. 22 is a flowchart illustrating one example of a processing procedure of communication history information record processing by the charging server 203 in the fourth embodiment of the present technology. Since this processing procedure is a variation example of FIG. 8, the same reference numerals are assigned to the common parts with FIG. 8 and their explanation is partially omitted.

In a case where there is a communication service start request from a wireless communication apparatus (step S901), the premium information notification unit 345 acquires the congestion degree of a base station related to the communication service (step S941).

Subsequently, the premium information notification unit 345 determines whether the acquired congestion degree is equal to or greater than a threshold (step S942), and, in a case where the acquired congestion degree is less than the threshold, it proceeds to step S902. Here, the threshold is, for example, the congestion degree 371 of "0.1" corresponding to the extra unit price information 372 of "0.000" illustrated in FIG. 19(b).

Moreover, in a case where the acquired congestion degree is equal to or greater than the threshold (step S942), the premium information notification unit 345 transmits premium information to display the notification concerning a generation effect of an extra fee, to the wireless communication apparatus related to the communication service (step S943). For example, based on the premium information, the premium information notification screen 395 illustrated in FIG. 21(b) is displayed.

Subsequently, the control unit 341 determines whether the extra fee has been agreed by a user operation in the wireless communication apparatus (step S944). For example, in the premium information notification screen 395 illustrated in FIG. 21(b), whether the YES button 396 has been pressed is determined (step S944).

In a case where the extra fee has been agreed (for example, in a case where the YES button 396 has been pressed in the premium information notification screen 395 illustrated in FIG. 21(b)) (step S944), it proceeds to step S902. On the other hand, in a case where the extra fee has not been agreed (for example, in a case where the NO button 397 has been pressed in the premium information notification screen 395 illustrated in FIG. 21(b)) (step S944), cancellation processing of communication processing related to the communication service is performed (step S945). That is, the control unit 341 performs cancellation processing to cancel the start request of the communication processing related to the communication service (step S945).

Moreover, after the communication quality included in information from the communication control apparatus 110 is acquired (step S903), the control unit 220 records the acquired communication quality and the congestion degree in the communication history information storage unit 350 (step S946). That is, the acquired communication quality is recorded in the pilot signal level 236 of the communication history information storage unit 350 and the acquired congestion degree is recorded in the congestion degree 352 of the communication history information storage unit 350 (step S946).

Here, in this example, although an example of using one threshold as a threshold with respect to the congestion degree of the base station has been shown, a plurality of thresholds may be used. In this case, a different notification according to the threshold can be made to the wireless communication apparatus. For example, it is possible to set thresholds in units of an additional amount of the extra fee (for example, every ten yen).

Thus, in the fourth embodiment of the present technology, the charging information calculation unit 343 calculates the first communication fee with respect to the communication volume at the time of communication by the use of a fixed communication unit price. Moreover, regarding the communication volume at the time of communication in a case where the communication quality in the communication satisfies a predetermined condition (for example, in a case where the pilot signal level is equal to or greater than a threshold), the charging information calculation unit 343 calculates a discounted fee with respect to the first communication fee. Subsequently, the charging information calculation unit 343 calculates a communication fee with respect to the communication volume at the time of communication on the basis of the first communication fee and the discounted fee. In this case, a discount unit price that varies according to the communication quality is set and the discounted fee is calculated by the use of a discount unit price corresponding to the communication quality at the time of communication.

Moreover, regarding the communication volume at the time of communication in a case where the congestion degree of the base station satisfies a predetermined condition (for example, in a case where the congestion degree is equal to or greater than a threshold), the charging information calculation unit 343 calculates an extra fee with respect to a communication fee. Subsequently, the charging information calculation unit 343 calculates the final communication fee by adding the extra fee to the communication fee. Moreover, in a case where the congestion degree of the base station satisfies a predetermined condition, the premium information notification unit 345 notifies the generation effect of the extra fee to the wireless communication apparatus.

Here, regarding the discount unit price and the extra unit price, similar to the first embodiment of the present technology, a value that varies every time slot may be used. In this case, the charging information calculation unit 343 calculates each fee by the use of the discount unit price and extra unit price corresponding to the time slot at the time of communication. Moreover, the fourth embodiment of the present technology illustrates an example of adding the extra fee in a case where the congestion degree of the base station satisfies a predetermined condition. However, instead of the congestion degree, based on whether the downloaded size, the communication service type, the number of wireless communication apparatuses connected to the base station or the protocol type satisfies a predetermined condition, whether to add the extra fee may be determined. For example, in a case where the download size exceeds a threshold, a communication service is a specific type or a protocol is a specific type, it is determined that it satisfies the predetermined condition, and it is possible to add the extra fee.

Thus, in the fourth embodiment of the present technology, it is possible to notify a generation effect of an extra fee to the user at the time of congestion. By this notification, it is assumed that the user discontinues the communication or the user moves to other places. In this case, it is possible to suppress communication due to a high load. Moreover, by performing a notification in this way, it is possible to avoid a risk that a high communication fee is generated before the user notices. Moreover, it is possible to perform appropriate charging processing according to the load of a base station.

5. Fifth Embodiment

In the first to fourth embodiments of the present technology, an example of calculating a communication fee according to one telecommunications carrier has been shown. Here, for example, in a case where a plurality of telecommunications carriers exist, it is possible to use an appropriate telecommunications carrier according to the communication environment of a wireless communication apparatus.

Therefore, the fifth embodiment of the present technology illustrates an example of setting an appropriate telecommunications carrier according to the communication environment of the wireless communication apparatus and calculating a communication fee according to this set telecommunications carrier. Here, the configuration of a communication system in the fifth embodiment of the present technology is substantially the same as the example illustrated in FIG. 3 or the like. Therefore, regarding the common parts with the first embodiment of the present technology, their explanation is partially omitted.

[Configuration Example of Communication System]

FIG. 23 is a block diagram illustrating a system configuration example of a communication system 105 in the fifth embodiment of the present technology. Here, since the communication system 105 is made by transforming part of the communication system 100 illustrated in FIG. 1, the same reference numerals are assigned to the common parts with the communication system 100 and their explanation is partially omitted.

The communication system 105 includes the network 101, the communication control apparatus (first telecommunications carrier) 110, the base stations 120, a base station 160, a communication control apparatuses (second telecommunications carrier) 150, the wireless communication apparatuses 130 and 140, wireless communication apparatuses 171 and 173, and a charging server 204.

The communication control apparatus (first telecommunications carrier) 110 corresponds to the communication control apparatus 110 illustrated in FIG. 1 and is managed by the first telecommunications carrier.

The communication control apparatus (second telecommunications carrier) 150 denotes a communication control apparatus managed by a telecommunications carrier (second telecommunications carrier) different from the first telecommunications carrier, controls the base station 160 performs authentication control of the wireless communication apparatus 171 or the like connected via the base station 160. Subsequently, the communication control apparatus (second telecommunications carrier) 150 connects the authenticated wireless communication apparatus to the network 101 via a gateway (not illustrated). Here, the communication control apparatus (second telecommunications carrier) 150 is substantially the same as the communication control apparatus (first telecommunications carrier) 110 except for that managing telecommunications carriers are different, and therefore detailed explanation is omitted herein.

The charging server 204 is connected to the communication control apparatus (first telecommunications carrier) 110 and the communication control apparatus (second telecommunications carrier) 150, and performs charging processing related to the wireless communication apparatuses 130, 140 and 171 to 173 connected to the network 101 via those.

The base station 160 is a base station operated by the second telecommunications carrier, and denotes a mobile communication base station (NodeB) connected to a wireless communication apparatus that holds valid USIM information of the second telecommunications carrier and the communication control apparatus (second telecommunications carrier) 150 via a radio link. Moreover, FIG. 23 schematically illustrates a range in which radio waves of the base station 160 are available (a range in which wireless communication is possible), as a cell 161.

The wireless communication apparatuses 171 to 173 denote, for example, a mobile phone apparatus (for example, a mobile phone device or smartphone including a telephone call function and a data communication function) or a data communication apparatus (for example, personal computer) including a wireless communication function, and so on. In FIG. 23, it is assumed that only the wireless communication apparatus 171 holds valid USIM information of the second telecommunications carrier and each of the wireless communication apparatuses 130, 140, 172 and 173 holds valid USIM information of the first telecommunications carrier. Here, the wireless communication apparatuses 171 to 173 are substantially the same as the wireless communication apparatuses 130 and 140, detailed explanation is omitted herein.

Moreover, it is assumed that each of the wireless communication apparatuses 130, 140 and 171 to 173 can switch USIM information on the basis of the control by the charging server 204. That is, each of the wireless communication apparatuses 130, 140 and 171 to 173 can connect to any of the base stations 120 and 160 by switching held USIM information.

For example, as illustrated in FIG. 23, while a relatively large number of wireless communication apparatuses (130, 140 and 172 to 173) are connected to the base station 120, only a relatively small number of wireless communication apparatuses (171) is connected to the base station 160. In such a case, it is possible to reduce the load given to the base station 120 by connecting the wireless communication apparatus 140 existing in the cell 161 of the base station 160 in which the number of connected wireless communication apparatuses is relatively small, to the base station 160. In this case, it is considered that it is possible to use radio resources more efficiently.

However, in the case of changing a base station of the connection target in this way, when a telecommunications carrier who operates the changed base station is different from the telecommunications carrier before it is changed (that is, contracted telecommunications carrier), the charging processing corresponding to respective telecommunications carriers is requested.

Therefore, the fifth embodiment of the present technology illustrates an example of setting an appropriate telecommunications carrier to the communication environment of a wireless communication apparatus and appropriately calculating a communication fee according to this set telecommunications carrier.

Here, in the fifth embodiment of the present technology, although only one base station is shown as a base station managed and operated by each telecommunications carrier, the same applies to a case where each telecommunications carrier manages and operates a plurality of base stations.

[Configuration Example of Charging Server]

FIG. 24 is a block diagram illustrating a functional configuration example of the charging server 204 in the fifth embodiment of the present technology. Here, since the charging server 204 is made by transforming part of the charging server 200 illustrated in FIG. 2, the same reference numerals are assigned to the common parts with the charging server 200 and their explanation is partially omitted.

The charging server 204 includes a control unit 401, a USIM information switching unit 402, a charging information calculation unit 403, a communication history information storage unit 410, a communication unit price information storage unit 420 and a charging information storage unit 430.

The USIM information switching unit 402 performs switching processing to switch USIM information held in a wireless communication apparatus on the basis of the control of the control unit 401. This switching processing may be performed according to a user's manual operation or may be automatically performed by the charging server 204.

Here, a case is assumed where the switching processing of USIM information is performed according to a user's manual operation. For example, in a case where the switching operation of USIM information is performed by the user in a wireless communication apparatus, a switching request of the USIM information is transmitted from the wireless communication apparatus to the charging server 204. In a case where the charging server 204 receives the switching request of the USIM information, the USIM information switching unit 402 determines whether to give permission to the switching request. For example, it is possible to give permission only to a wireless communication apparatus that has made a contract beforehand.

In a case where the USIM information switching unit 402 gives permission to the switching request, it performs setting processing to set USIM information related to a telecommunications carrier after the switching according to the switching request, to the wireless communication apparatus that has transmitted the switching request. This setting processing is described in detail with reference to FIG. 27. By this means, the wireless communication apparatus that has transmitted the switching request can receive various communication services through a base station operated and managed by the telecommunications carrier after the switching.

Moreover, a case is assumed where the charging server 204 automatically switches USIM information. For example, the charging server 204 includes a management database to manage the USIM information held by each wireless communication apparatus, and a telecommunications carrier is decided on the basis of the content of this management database. For example, the USIM information switching unit 402 decides an optimal telecommunications carrier (for example, a base station with the least congestion degree) to a wireless communication apparatus on the basis of the congestion degree of a base station to which the wireless communication apparatus connects. In a case where the telecommunications carrier is decided in this way, the USIM information switching unit 402 performs setting processing to set USIM information related to the telecommunications carrier to the wireless communication apparatus. Here, it is possible to acquire the congestion degree of the base station by the method shown in the fourth embodiment of the present technology.

Thus, a base station that is the connection target of a wireless communication apparatus can be decided from a plurality of telecommunications carriers under the initiative of the charging server 204. Moreover, in a case where the switching of USIM information is performed in this way, information related to a telecommunications carrier after the switching is recorded in the communication history information storage unit 410. This record example is described in detail with reference to FIG. 25.

Thus, the USIM information switching unit 402 performs control to set the connection right (for example, connection right based on USIM information) to connect to one of a plurality of telecommunications carriers' base stations, to a wireless communication apparatus. Here, the USIM information switching unit 402 is an example of a setting unit described in the claims.

[Content Example of Communication History Information Storage Unit]

FIG. 25 is a diagram schematically illustrating one example of the storage content of the communication history information storage unit 410 in the fifth embodiment of the present technology. Here, since the communication history information storage unit 410 is made by transforming part of the communication history information storage unit 230 illustrated in FIG. 3, the same reference numerals are assigned to the common parts with the communication history information storage unit 230 and their explanation is partially omitted.

The communication history information storage unit 410 stores the date information 231, the terminal identification information 232 and communication history information 411 in association with each other. Moreover, the time 234, a packet count 412 and the pilot signal level 236 are recorded in association with each other, as the communication history information 411.

The packet count 412 denotes information on the number of packets at the time of communication performed by a wireless communication apparatus of the charging target. However, since a telecommunications carrier at the time of communication may vary according to the communication environment, a communication unit price that varies every telecommunications carrier is set as illustrated in FIG. 26(a). Therefore, in the packet count 412, the number of packets at the time of communication is classified and stored every telecommunications carrier.

[Content Example of Communication Unit Price Information Storage Unit and Charging Information Storage Unit]

FIG. 26 is a diagram schematically illustrating one example of the storage content of the communication unit price information storage unit 420 and the charging information storage unit 430 in the fifth embodiment of the present technology.

FIG. 26(a) illustrates the storage content of the communication unit price information storage unit 420. The communication unit price information storage unit 420 denotes a storage unit that stores information on a communication unit price corresponding to the communication quality at the time of communication by each wireless communication apparatus (communication unit price information) every telecommunications carrier. To be more specific, the communication unit price information storage unit 420 stores the pilot signal level 241 and communication unit price information 421 in association with each other. Here, the communication unit price information storage unit 420 may be caused to store information on the communication quality different from the pilot signal level (for example, information on a discount unit price corresponding to the above-mentioned CQI or SIR (discount unit price information)), and this information may be used.

The communication unit price information 421 denotes information on a communication unit price applied per one packet in a case where the wireless communication apparatus performs communication. Moreover, the communication unit price set for each telecommunications carrier is classified and stored in the communication unit price information 421. Thus, since it is possible to set a communication unit price that varies according to the telecommunications carrier, for example, it is possible to find application such as using a cheap telecommunications carrier positively on the basis of the communication quality.

FIG. 26(b) illustrates the storage content of the charging information storage unit 430. The charging information storage unit 430 denotes a storage unit that stores information (charging information) on a communication fee calculated by the charging information calculation unit 403 when each wireless communication apparatus performs communication. To be more specific, the charging information storage unit 430 stores the date information 261 and charging information 431 in association with each other.

The charging information 431 denotes the communication fee of each wireless communication apparatus calculated every date. Moreover, charging information calculated every telecommunications carrier by the charging information calculation unit 250 using each information stored in the communication history information storage unit 230 and the communication unit price information storage unit 240, is stored in the charging information 431 every telecommunications carrier.

[Connection Processing Example in Communication System]

Figure 27:
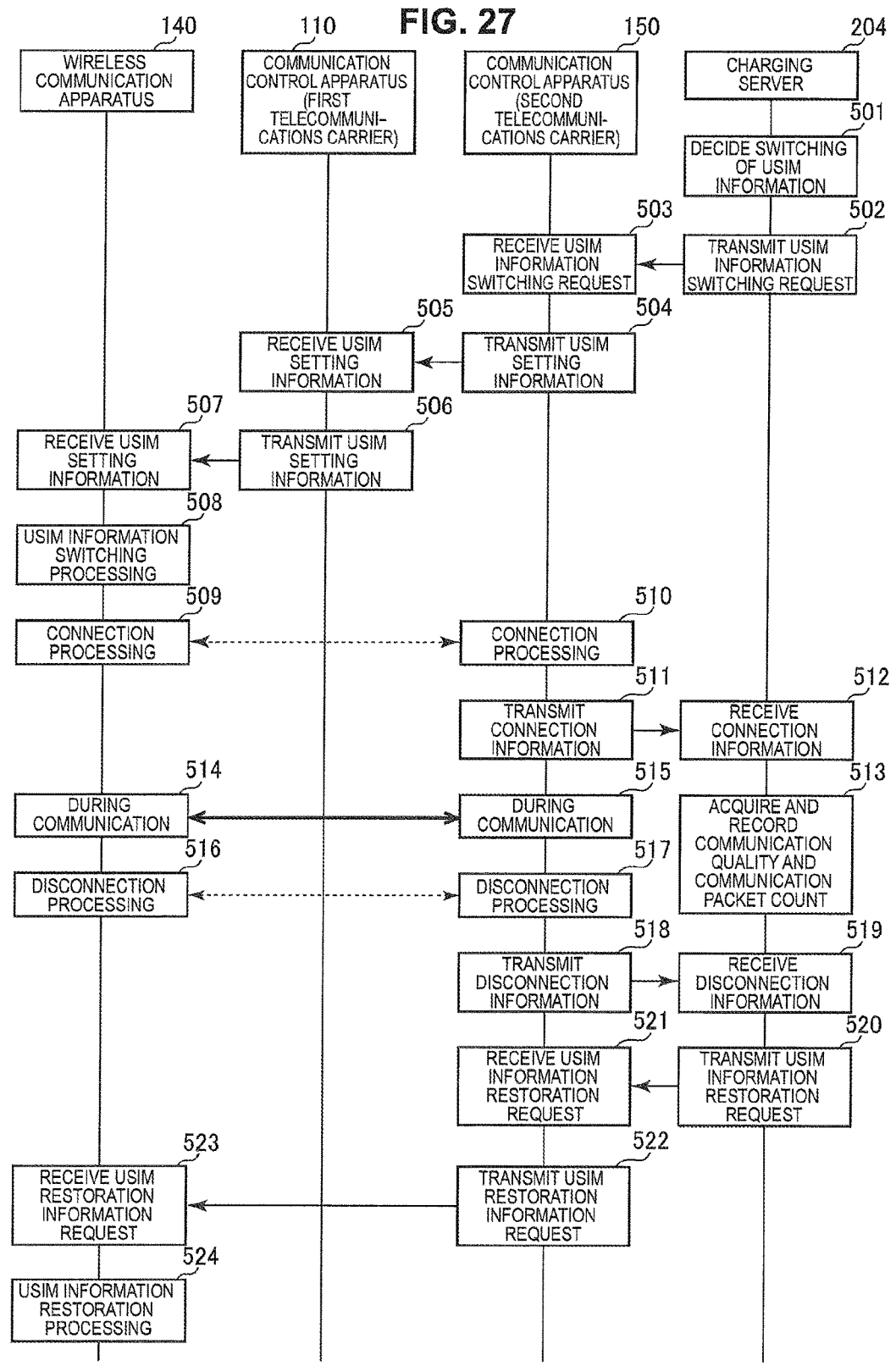
FIG. 27 is a sequence chart illustrating a communication processing example between apparatuses forming the communication system 105 in the fifth embodiment of the present technology.

FIG. 27 is a sequence chart illustrating a communication processing example between apparatuses forming the communication system 105 in the fifth embodiment of the present technology. FIG. 27 illustrates an example of automatically switching USIM information (contract authentication information) to connect to the second telecommunications carrier to the wireless communication apparatus 140.

First, the USIM information switching unit 402 decides a telecommunications carrier of USIM information that is newly set to the wireless communication apparatus 140 on the basis of the congestion degree of the base station 120 to which the wireless communication apparatus 140 connects (501). For example, the second telecommunications carrier related to the cell 161 in which the wireless communication apparatus 140 exists is decided (501).

When the second telecommunications carrier is decided in this way as the telecommunications carrier that is newly set to the wireless communication apparatus 140 (501), the USIM information switching unit 402 transmits a USIM information switching request to the communication control apparatus (second telecommunications carrier) 150 (502 and 503). This USIM information switching request denotes a request to set the USIM information related to the second telecommunications carrier to the wireless communication apparatus 140.

When the USIM information switching request is received (503), the communication control apparatus (second telecommunications carrier) 150 transmits USIM setting information to the wireless communication apparatus 140 (504 to 507). Here, the wireless communication apparatus 140 that holds USIM information related to the first telecommunications carrier is connected to the communication control apparatus (first telecommunications carrier) 110. Therefore, the communication control apparatus (second telecommunications carrier) 150 transmits the USIM setting information to the wireless communication apparatus 140 through the communication control apparatus (first telecommunications carrier) 110 (504 to 507).

Moreover, the USIM setting information denotes information to set the USIM information related to the second telecommunications carrier to the wireless communication apparatus 140, and, for example, includes information (for example, the USIM information related to the second telecommunications carrier) requested to connect to the base station 160 managed by the second telecommunications carrier. For example, in a case where the USIM information (of the second telecommunications carrier) is included in the USIM setting information, by writing this USIM information in the USIM information storage unit 137 of the wireless communication apparatus 140, valid USIM information is set. Moreover, valid USIM information may be set by making the wireless communication apparatus 140 hold the USIM information related to the second telecommunications carrier and validating the USIM information. In this case, the USIM setting information includes setting information to validate the USIM information related to the second telecommunications carrier, and, based on this setting information, validation processing of the USIM information related to the second telecommunications carrier is performed.

When the USIM setting information is received (507), the USIM information rewriting unit 136 of the wireless communication apparatus 140 performs switching processing of rewriting the USIM information related to the second telecommunications carrier in the USIM information storage unit 137 on the basis of the control of the control unit 133 of the wireless communication apparatus 140 (508). By this means, valid USIM information (of the second telecommunications carrier) is set to the wireless communication apparatus 140.

Subsequently, the control unit 133 of the wireless communication apparatus 140 performs connection processing with the communication control apparatus (second telecommunications carrier) 150 by the use of the USIM information related to the second telecommunications carrier (509 and 510). When this connection processing is completed, the communication control apparatus (second telecommunications carrier) 150 transmits connection information concerning the completion of the connection processing to the charging server 204 (511 and 512).

In a case where the connection information is received (512), the charging server 204 performs charging processing on the basis of the information from the communication control apparatus (second telecommunications carrier) 150 (513). That is, the communication quality and the number of packets at the time of communication between the wireless communication apparatus 140 and the communication control apparatus (second telecommunications carrier) 150 are acquired and recorded (513). Subsequently, charging information is calculated using these at a predetermined time.

Subsequently, in a case where the communication ends (514 and 515), the control unit 133 of the wireless communication apparatus 140 performs disconnection processing with the communication control apparatus (second telecommunications carrier) 150 (516 and 517). When this disconnection processing is completed, the communication control apparatus (second telecommunications carrier) 150 transmits disconnection information showing the completion of the disconnection processing to the charging server 204 (518 and 519).

In a case where the disconnection information is received (519), the charging server 204 transmits a USIM information restoration request to the communication control apparatus (second telecommunications carrier) 150 (520 and 521). This USIM information restoration request denotes a request to set the original USIM information (of the first telecommunications carrier) to the wireless communication apparatus 140 to which the USIM information related to the second telecommunications carrier is set.

When the USIM information restoration request is received (521), the communication control apparatus (second telecommunications carrier) 150 transmits USIM restoration information to the wireless communication apparatus 140 (522 and 523). Here, the wireless communication apparatus 140 to which the USIM information related to the second telecommunications carrier is set is connected to the communication control apparatus (second telecommunications carrier) 150. Therefore, the communication control apparatus (second telecommunications carrier) 150 directly transmits the USIM restoration information to the wireless communication apparatus 140 (522 and 523).

Moreover, the USIM restoration information denotes information to set the original USIM information (of the first telecommunications carrier) to the wireless communication apparatus 140 to which the USIM information related to the second telecommunications carrier is set. For example, the USIM restoration information includes setting information to validate the USIM information related to the first telecommunications carrier, and, based on this setting information, validation processing of the USIM information related to the first telecommunications carrier is performed.

When the USIM restoration information is received (523), the USIM information rewriting unit 136 of the wireless communication apparatus 140 performs restoration processing of restoring the USIM information related to the first telecommunications carrier in the USIM information storage unit 137 on the basis of the control of the control unit 133 (524). By this means, the original USIM information (of the first telecommunications carrier) is set to the wireless communication apparatus 140.

Thus, a communication unit price is set every telecommunications carrier in the fifth embodiment of the present technology. Moreover, the USIM information switching unit 402 performs control to set the connection right (the connection right based on the USIM information) to connect to one of a plurality of telecommunications carriers' base stations, to the wireless communication apparatus. Subsequently, the charging information calculation unit 403 calculates a communication fee by the use of a communication unit price corresponding to a telecommunications carrier related to the connection right set by the USIM information switching unit 402.

Thus, in the fifth embodiment of the present technology, it is possible to set USIM information related to a telecommunications carrier different from a telecommunications carrier related to held USIM information. By this means, since it is possible to use communication services of a plurality of telecommunications carriers, it is possible to use a wireless communication apparatus in the communication environment with good communication quality. That is, it is possible to use a plurality of carriers separately, distribute the load and further realize a cheaper communication service.

6. Sixth Embodiment

In the first to fifth embodiments of the present technology, an example of calculating a communication fee on the basis of the communication quality in an area in which a wireless communication apparatus exists has been shown. Here, in a case where a communication fee is calculated on the basis of the communication quality or the like in the area in which the wireless communication apparatus exists, a case is assumed where a user's house does not exist near a base station. In this case, it is assumed that the communication quality of a wireless communication apparatus owned by the user is in a relatively poor condition while the user is in the house, and a communication fee according to the wireless communication apparatus is relatively high. Thus, since there is a case where a high communication fee and a low communication fee are generated according to an area that cannot be decided only by user's intention, it is important to adequately set a communication fee in such a case.

Therefore, the sixth embodiment of the present technology illustrates an example of adequately setting a communication fee in an area that cannot be decided only by user's intention. Here, the configuration of a communication system in the sixth embodiment of the present technology is substantially the same as the example illustrated in FIG. 3 or the like. Therefore, regarding the common parts with the first embodiment of the present technology, their explanation is partially omitted.

[Configuration Example of Charging Server]

Figure 28:
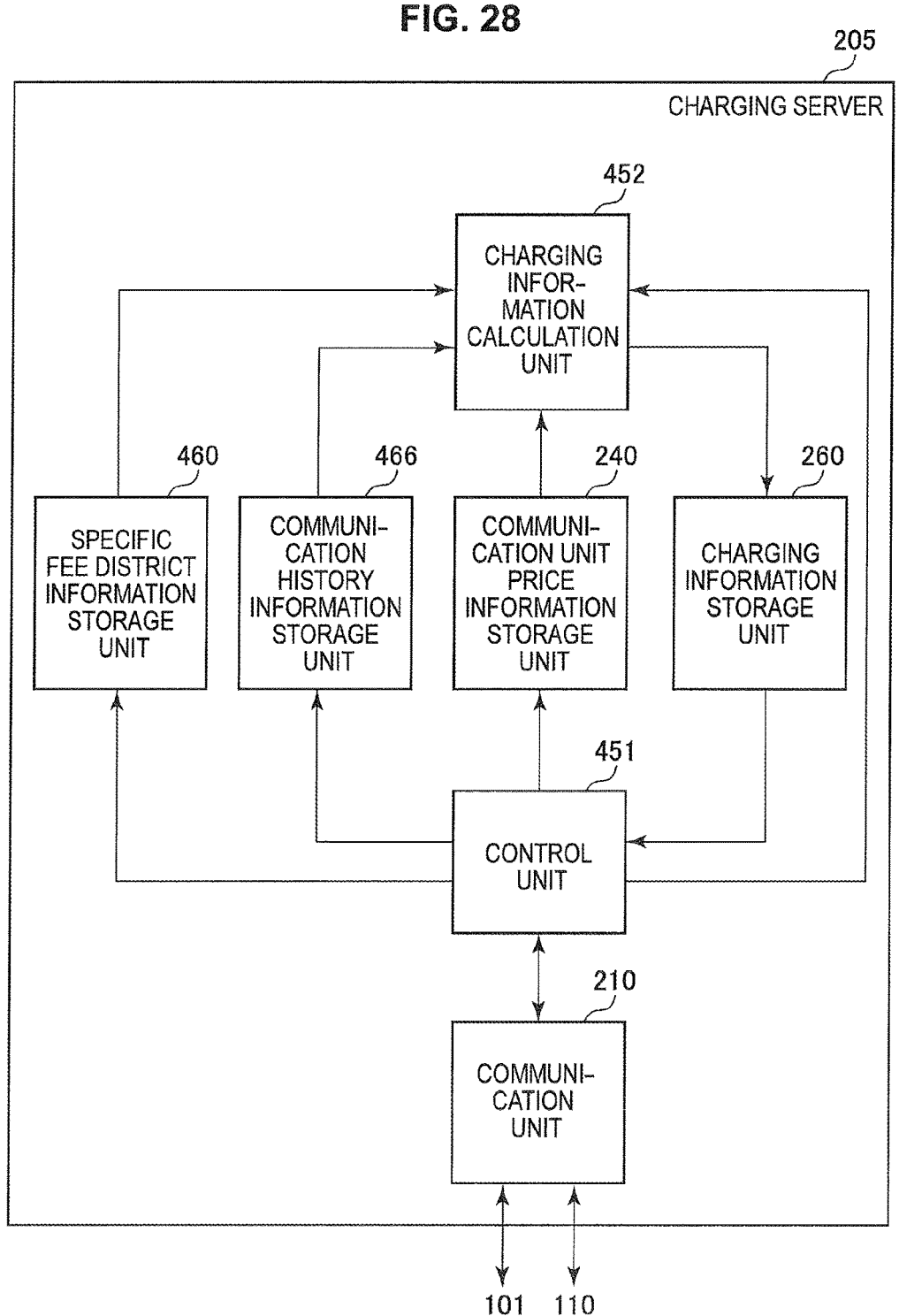
FIG. 28 is a block diagram illustrating a functional configuration example of a charging server 205 in the sixth embodiment of the present technology.

FIG. 28 is a block diagram illustrating a functional configuration example of a charging server 205 in the sixth embodiment of the present technology. Here, since the charging server 205 is made by transforming part of the charging server 200 illustrated in FIG. 2, the same reference numerals are assigned to the common parts with the charging server 200 and their explanation is partially omitted.

The charging server 205 includes a control unit 451, a charging information calculation unit 452, a specific fee district information storage unit 460 and a communication history information storage unit 466. Here, a cell ID is recorded in the communication history information storage unit 466 by the control unit 451 (a cell ID 468 illustrating in FIG. 29(*b*)).

In a case where a setting operation to set a specific fee district in the wireless communication apparatuses 130 and 140 is performed, the control unit 451 performs control to store information on the set specific fee district in the specific fee district information storage unit 460. Here, the specific fee district means a specific place in which specific fee setting is performed. For example, in a case where the wireless communication apparatus 130 exists in a specific fee district, it is possible to charge a uniform communication fee regardless of the communication environment of the wireless communication apparatus 130. Also, a setting method of the specific fee district is described in detail with reference to FIG. 30.

The specific fee district information storage unit 460 stores information (specific fee district information) on a specific fee district set by the user operation, and supplies the stored specific fee district information to the charging information calculation unit 452. Here, the specific fee district information storage unit 460 is described in detail with reference to FIG. 29(*a*). Moreover, the specific fee district information storage unit 460 is an example of a setting unit described in the claims.

The charging information calculation unit 452 performs charging processing to calculate the cost at the time of communication performed by the wireless communication apparatuses 130 and 140, on the basis of the control of the control unit 451. In this case, the charging information calculation unit 452 applies a specific district fee (for example, a fixed amount) and calculates a communication fee in a wireless communication apparatus connected to a base station specified by the specific fee district information stored in the specific fee district information storage unit 460.

[Content Example of Specific Fee District Information Storage Unit and Communication History Information Storage Unit]

FIG. 29 is a diagram schematically illustrating one example of the storage content of the specific fee district information storage unit 460 and the communication history information storage unit 466 in the sixth embodiment of the present technology.

FIG. 29(a) illustrates the specific fee district information storage unit 460. The specific fee district information storage unit 460 denotes a storage unit that stores information (specific fee district information) on the specific fee district set by each wireless communication apparatus (the wireless communication apparatuses 130 and 140, and so on). To be more specific, the specific fee district information storage unit 460 stores terminal identification information 461 and specific fee district information 462 in association with each other.

The terminal identification information 461 denotes identification information to identify a wireless communication apparatus of the charging target. Similar to FIG. 3, for ease of explanation, FIG. 29(a) illustrates the telephone number assigned to each wireless communication apparatus as the terminal identification information 461.

The specific fee district information 462 denotes information on a specific fee district set by a wireless communication apparatus. An item 463, an address 464 and a cell ID 465 are recorded in association with each other, as the specific fee district information 462. Here, the item 463 corresponds to an item in an item selection area 471 of an item selection screen 470 illustrated in FIG. 30(a), and the address 464 corresponds to the address in a specific fee district setting area 481 of a specific fee district setting screen 480 illustrated in FIG. 30(b).

The cell ID 465 denotes identification information to specify a base station existing in the address 464. By the cell ID 465, a base station operated by a telecommunications carrier is specified. That is, in a case where a wireless communication apparatus connects to a base station specified by the cell ID 465, a specific district fee is applied to the wireless communication apparatus. Here, in the cell ID 465, a plurality of cell IDs of different frequency channels may be specified for one address.

FIG. 29(b) illustrates the communication history information storage unit 466. Here, since the communication history information storage unit 466 is made by transforming part of the communication history information storage unit 230 illustrated in FIG. 3, the same reference numerals are assigned to the common parts with the communication history information storage unit 230 and their explanation is partially omitted.

The communication history information storage unit 466 stores the date information 231, the terminal identification information 232 and communication history information 467 in association with each other. Moreover, the time 234, the packet count 235, the pilot signal level 236 and the cell ID 468 are recorded in association with each other, as the communication history information 467.

The cell ID 468 denotes identification information to specify a base station to which a wireless communication apparatus connects at the time of communication.

Here in a case where the cell ID 465 stored in the specific fee district information storage unit 460 and the cell ID 468 stored in the communication history information storage unit 466 are matched, the charging information calculation unit 452 applies a specific district fee (for example, a fixed amount) and calculates a communication fee. For example, regarding communication of the wireless communication apparatus 130 (telephone number: 090-1234-5678) at 17:35 on Jun. 1, 2011 (the time 234), both cell IDs (0085) are matched. Thus, in a case where a wireless communication apparatus is connected to a base station related to a specific fee district, the charging information calculation unit 452 calculates s communication fee without using the communication quality.

[Display Example of Specific Fee District Setting Screen]

FIG. 30 is a diagram illustrating a display screen example displayed on the display unit 135 of the wireless communication apparatus 130 in the sixth embodiment of the present technology. Here, in this example, although only a display example in the wireless communication apparatus 130 is illustrated, the same applies to other wireless communication apparatuses.

FIG. 30(a) illustrates the item selection screen 470 to select an item that can be set by the user as a specific fee district.

The item selection area 471, a NEXT button 472 and a BACK button 473 are provided in the item selection screen 470.

The item selection area 471 is an area to select an item that can be set by the user as a specific fee district, and the radio button corresponding to each item is provided. In FIG. 30(a), an example case is illustrated where the user can set each of the user's home, the user's office (company) and the user's school as specific fee districts.

The NEXT button 472 denotes a button to be pressed when advancing to the specific fee district setting screen 480 illustrated in FIG. 30(b) after a selection operation of a radio button corresponding to a user's desired item is performed, in the item selection area 471. That is, when the NEXT button 472 is pressed in a case where the radio button in the item selection area 471 is in a selective state (a state where a black circle is fixed), the specific fee district setting screen 480 is displayed.

The BACK button 473 denotes a button to be pressed in the case of returning to a display screen previously displayed, for example.

FIG. 30(b) illustrates the specific fee district setting screen 480 to set a specific fee district. FIG. 30(b) illustrates an example of setting a specific fee district by inputting the address concerning an item selected on the item selection screen 470 illustrated in FIG. 30(a).

The specific fee district setting area 481, a REGISTER button 485 and a BACK button 486 are provided on the specific fee district setting screen 480.

The specific fee district setting area 481 denotes an area to input the address of a place that is set as a specific fee district, and a ZIP code input area 482, a find button 483 and an address input area 484 are provided.

The ZIP code input area 482 denotes an area to input the ZIP code of a place that is set as a specific fee district. For example, the ZIP code is input by the user's operation input in the operation reception unit 134.

The find button 483 denotes a button to be pressed when the ZIP code input in the ZIP code input area 482 is converted into the address corresponding to the input ZIP code. For example, in a case where a ZIP code is input in the ZIP code input area 482 and the find button 483 is pressed, the address corresponding to the input ZIP code is displayed on the address input area 484. Thus, by inputting the ZIP code of a place that is set as a specific fee district, it is possible to omit part of the address input of the place that is set as a specific fee district.

The address input area 484 denotes an area to directly input the address of a place that is set as a specific fee district by a user's manual operation. For example, the address is input by the user's operation input in the operation reception unit 134.

The REGISTER button 485 denotes a button to be pressed when a place input in the specific fee district setting area 481 is registered as a specific fee district. That is, in a case where the REGISTER button 485 is pressed, the place input in the specific fee district setting area 481 is registered as a specific fee district. That is, information on the place input in the specific fee district setting area 481 is stored in the specific fee district information storage unit 460 of the charging server 205 as specific fee district information.

The BACK button 486 denotes a button to be pressed in the case of returning to the previously displayed display screen, for example.

Here, in this example, an example has been shown where, at the time of calculating a communication fee, the charging information calculation unit 452 refers to the content of the specific fee district information storage unit 460 and calculates a communication fee at the time of communication performed in a specific fee district as a specific district fee. However, in a case where a wireless communication apparatus that performs communication exists in a specific fee district, this information may be recorded in the communication history information storage unit 230. For example, in a case where a wireless communication apparatus performs communication, the control unit 451 determines whether the wireless communication apparatus exists in a specific fee district, with reference to the content of the specific fee district information storage unit 460. Subsequently, in a case where the wireless communication apparatus exists in the specific fee district, this information is recorded in the communication history information storage unit 230 (for example, recorded as specific fee district information). In this case, the charging information calculation unit 452 can calculate a communication fee of the wireless communication apparatus existing in the specific fee district, as a specific district fee, with reference to the content of the communication history information storage unit 230.

Thus, in the sixth embodiment of the present technology, it is possible to overcome the inequality of a communication fee based on the communication quality, which is caused in houses and offices, and so on.

Here, in this example, an example has been shown where a communication fee at the time of communication performed in a specific fee district is calculated as a specific district fee. However, for example, regarding communication performed in a specific fee district, it may be possible to adopt a charging method in which an extra fee is not generated even in the case of high congestion degree or a communication unit price that is uniformly discounted (for example, 10%) is applied. Moreover, it may be possible to use a charging method in which charging is not performed in a case where a femtocell is installed in home and the traffic generated in home is evacuated to a fixed network. In this case, it leads to the positive introduction of the femtocell, and it is possible to expect an effect that radio resources are used by the mobile users.

7. Seventh Embodiment

In the first to fifth embodiments of the present technology, an example of calculating a communication fee on the basis of the communication quality or the like has been shown. Here, when the user existing in a place with relatively poor communication quality moves to a place with relatively good communication quality, it is possible to cheapen a communication fee. However, it is assumed that it is difficult for the user to search for a place with relatively good communication quality.

Therefore, the seventh embodiment of the present technology illustrates an example of displaying a guide related to a communication fee and enabling the user to easily search for a place with desired communication quality. Here, the configuration of a communication system in the seventh embodiment of the present technology is substantially the same as the example illustrated in FIG. 3 or the like. Therefore, regarding the common parts with the first embodiment of the present technology, their explanation is partially omitted. Here, the seventh embodiment of the present technology illustrates an example using a wireless communication apparatus 620 instead of the wireless communication apparatuses 130 and 140.

[Configuration Example of Charging Server]

FIG. 31 is a block diagram illustrating a functional configuration example of a charging server 206 in the seventh embodiment of the present technology. Here, since the charging server 206 is made by transforming part of the charging server 200 illustrated in FIG. 2, the same reference numerals are assigned to the common parts with the charging server 200 and their explanation is partially omitted.

The charging server 206 includes a control unit 601, an area information creation unit 602 and a communication quality information storage unit 610.

The communication quality information storage unit 610 stores position information and communication quality information (such as the pilot signal level and the CQI) in association with each other, and supplies the stored information to the area information creation unit 602. Also, the communication quality information storage unit 610 is described in detail with reference to FIG. 33(*a*).

The area information creation unit 602 creates area information around the wireless communication apparatus 620 illustrated in FIG. 32 on the basis of the control of the control unit 601. This area information denotes information to cause the wireless communication apparatus 620 to display a position in which the wireless communication apparatus 620 exists, its surrounding positions and information on a communication fee corresponding to the communication quality related to each of these positions. For example, area information denotes information to display a guide screen 660 illustrated in FIG. 34(*b*).

For example, position information acquired by the position information acquisition unit 132 of the wireless communication apparatus 620 is transmitted from the wireless communication apparatus 620 to the charging server 206 periodically or irregularly. Moreover, the area information creation unit 602 creates surrounding area information on the basis of the position information transmitted from the wireless communication apparatus 620. That is, the area information creation unit 602 acquires the communication quality information stored in the communication quality information storage unit 610 in association with the position information (the surrounding position information) transmitted from the wireless communication apparatus 620. Subsequently, the area information creation unit 602 acquires the communication unit price information stored in the communication unit price information storage unit 240 in association with the acquired communication quality information. Next, the area information creation unit 602 generates area information in which the acquired communication unit price and the position information transmitted from the wireless communication apparatus 620 are associated. Moreover, the control unit 601 transmits the area information generated in this way to the wireless communication apparatus 620 as a response to the position information from the wireless communication apparatus 620.

[Configuration Example of Wireless Communication Apparatus]

FIG. 32 is a block diagram illustrating a functional configuration example of the wireless communication apparatus 620 in the seventh embodiment of the present technology. Here, since the wireless communication apparatus 620 is made by transforming part of the wireless communication apparatus 130 illustrated in FIG. 5, the same reference numerals are assigned to the common parts with the wireless communication apparatus 130 and their explanation is partially omitted.

The wireless communication apparatus 620 includes a control unit 621, a display information creation unit 622 and an area information storage unit 630.

The area information storage unit 630 stores area information (information that associates position information and communication unit price information), and supplies the stored area information to the display information creation unit 622. Also, the area information storage unit 630 is described in detail with reference to FIG. 33(*b*).

Based on the control of the control unit 621, the display information creation unit 622 creates display information (for example, the guide screen 660 illustrated in FIG. 34(*b*)) to be displayed on the display unit 135 on the basis of the area information stored in the area information storage unit 630.

For example, the control unit 621 transmits the position information acquired by the position information acquisition unit 132 to the charging server 206 periodically or irregularly. Here, regarding the transmission timing of the position information, it is possible to apply suitable frequency in consideration of the battery consumption.

Moreover, in a case where the control unit 621 receives area information from the charging server 206, the received area information is recorded in the area information storage unit 630. That is, the content of the area information storage unit 630 is updated every time the area information is received from the charging server 206.

Moreover, the control unit 621 displays the display information created by the display information creation unit 622, on the display unit 135.

[Content Example of Communication Quality Information Storage Unit and Area Information Storage Unit]

FIG. 33 is a diagram schematically illustrating one example of the storage content of the communication quality information storage unit 610 and the area information storage unit 630 in the seventh embodiment of the present technology.

FIG. 33(*a*) illustrates the communication quality information storage unit 610. The communication quality information storage unit 610 denotes a storage unit that stores position information and communication quality information (such as the pilot signal level and the CQI) in association with each other. Here, FIG. 33(*a*) illustrates an example of assuming the communication quality information as a pilot signal level. To be more specific, the communication quality information storage unit 610 stores latitude 611, longitude 612 and the pilot signal level 613 in association with each other.

The latitude 611 and the longitude 612 are the latitude and longitude corresponding to the position information transmitted from the wireless communication apparatus 620.

The pilot signal level 613 denotes information on the communication quality at the time of communication performed by a wireless communication apparatus. Here, this information may be updated periodically or irregularly on the basis of information from the communication control apparatus 110.

FIG. 33(*b*) illustrates the area information storage unit 630. The area information storage unit 630 denotes a storage unit that stores position information and communication unit price information in association with each other. To be more specific, the area information storage unit 630 stores latitude 631, longitude 632 and communication unit price information 633 in association with each other.

The latitude 631 and the longitude 632 denote the latitude and longitude corresponding to position information transmitted from the wireless communication apparatus 620.

The communication unit price information 633 denotes information on a communication unit price applied per one packet in the communication performed by the wireless communication apparatus.

[Display Example of Fee Support Screen]

FIG. 34 is a diagram illustrating a display screen example displayed on the display unit 135 of the wireless communication apparatus 620 in the seventh embodiment of the present technology.

FIG. 34(*a*) illustrates a guide display setting screen 650 to perform setting related to the display of a guide screen related to a communication fee. A guide display selection area 651, an ENTER button 652 and a BACK button 653 are provided on the guide display setting screen 650.

The guide display selection area 651 denotes an area to select the display timing of a guide screen related to a communication fee, and the radio button corresponding to each timing is provided. FIG. 34(*a*) illustrates an example case where the user can set each of "always display it," "display it only when base station is congested" and "do not display it" as the display timing. Here, in a case where "always display it" is set, the guide screen 660 illustrated in FIG. 34(*b*) is always displayed on a partial area of the display screen of the display unit 135. Also, in a case where "display it only when base station is congested" is set, the guide screen 660 illustrated in FIG. 34(*b*) is displayed on the display unit 135 only when the base station is congested.

The ENTER button 652 denotes a button to be pressed when the display timing selected in the guide display selection area 651 is fixed. That is, in a case where the ENTER button 652 is pressed, the display timing selected in the guide display selection area 651 is fixed.

The BACK button 653 denotes a button to be pressed in the case of returning to the previously displayed display screen, for example.

FIG. 34(*b*) illustrates the guide screen 660 related to a communication fee. The guide screen 660 denotes a screen to guide a place in a case where the user searches for the place with relatively good communication quality (a place in which the communication fee is relatively cheap). That is, by looking at the guide screen 660, the user can easily understand in which place the communication fee becomes cheap.

A guide display area 661, a DELETE button 664 and an antenna icon display area 665 are provided on the guide screen 660.

The guide display area 661 denotes an area to display a map including a place in which the wireless communication apparatus 620 exists (or its surrounding place), and a current position icon 662 and a fee guide icon 663 are displayed on the map of the display target.

The current position icon 662 denotes an icon illustrating a position in which the wireless communication apparatus 620 exists.

The fee guide icon 663 denotes an icon illustrating information on the communication fee corresponding to each place on the map displayed on the guide display area 661.

Here, although FIG. 34(b) illustrates an example of displaying a discount rate related to a communication expense as the fee guide icon 663, another information on the communication expense (for example, communication unit price) may be displayed.

The DELETE button 664 denotes a button to be pressed in a case where the guide display area 661 is deleted.

The antenna icon display area 665 denotes an icon illustrating the incoming signal strength in a position in which the wireless communication apparatus 620 exists.

Here, although FIG. 34(b) illustrates an example of displaying the fee guide icon 663 on the map, a guide screen related to a communication fee may be displayed by other display modes. For example, it may be possible to display a communication unit price in the current position by text information and sequentially update the text information according to the movement of the current position.

Thus, in the seventh embodiment of the present technology, by displaying the guide screen 660 on the display unit 135 of the wireless communication apparatus 620, the user can easily understand in which place the communication fee becomes cheap, and so on.

8. Eighth Embodiment

In the first to four, sixth and seventh embodiments of the present technology, an example of calculating a communication fee related to one telecommunications carrier has been shown. Moreover, in the fifth embodiment of the present technology, an example of calculating communication fees related to a plurality of telecommunications carriers has been shown. Here, a case is assumed where the plurality of telecommunications carriers manage respective base stations in the identical place. In this case, for example, it is assumed that it is possible to apply a cheaper communication fee to the user by performing bidding in an auction format and setting a telecommunications carrier on the basis of the result of this bidding.

Therefore, the eighth embodiment of the present technology illustrates an example of appropriately setting radio resources on the basis of information from telecommunications carriers. Also, the configuration of communication a system in the eighth embodiment of the present technology is a transformation example of the example illustrated in FIG. 3 or the like. Therefore, regarding the common parts with the first embodiment of the present technology, their explanation is partially omitted.

[Configuration Example of Communication System]

Figure 35:
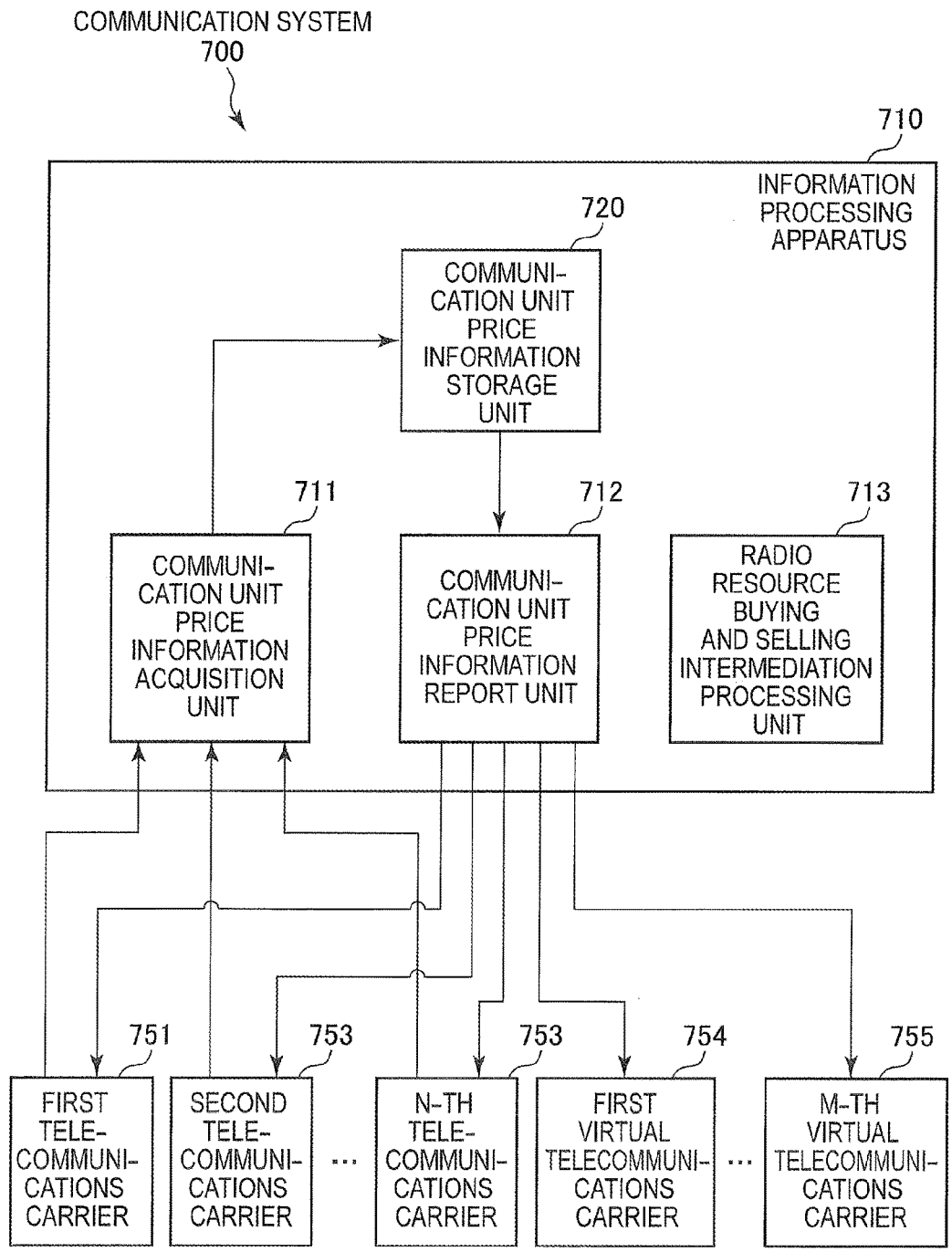
FIG. 35 is a block diagram illustrating a system configuration example of a communication system 700 in the eighth embodiment of the present technology.
Figure 36:
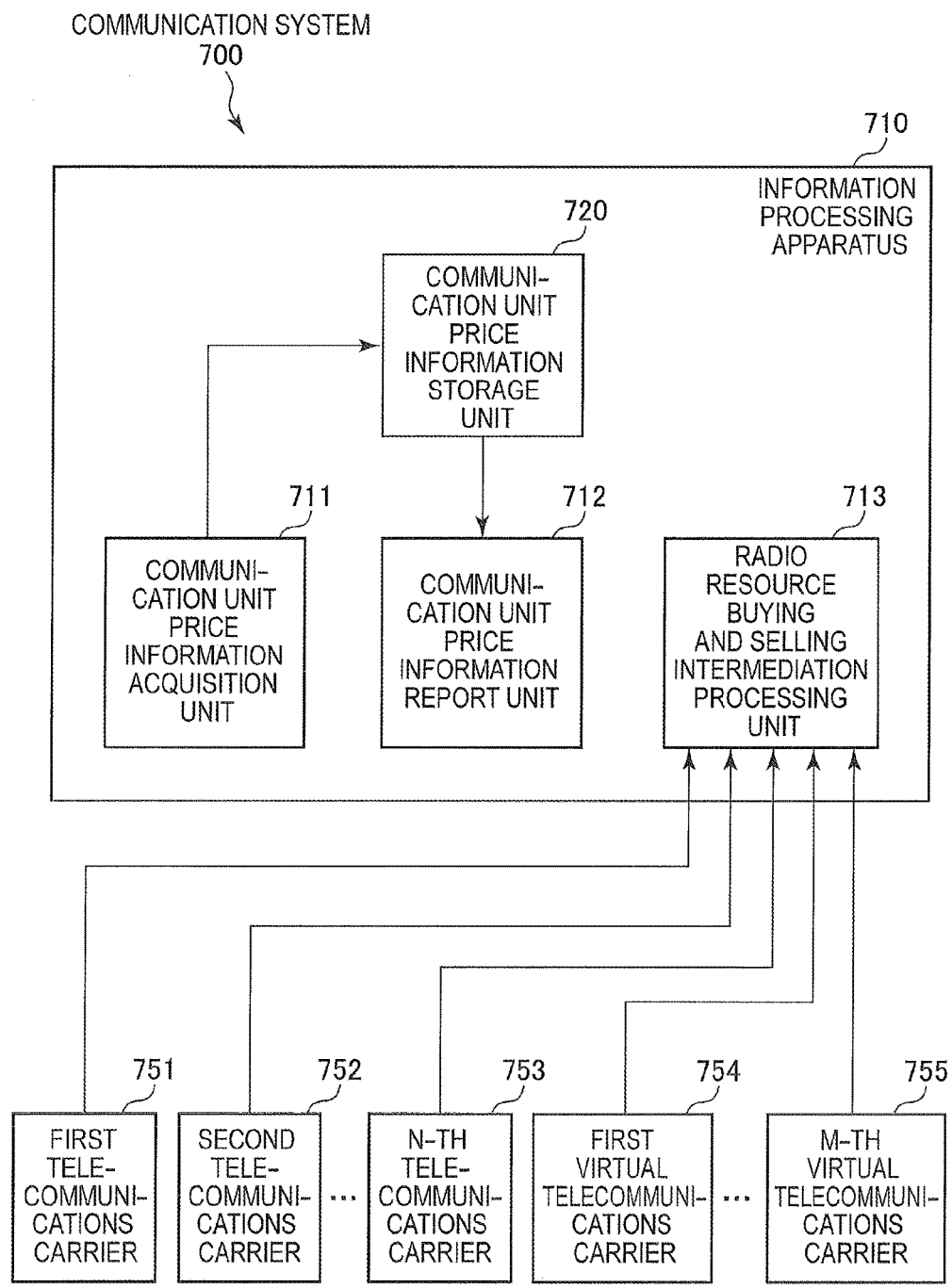
FIG. 36 is a block diagrams illustrating a system configuration example of a communication system 700 in the eighth embodiment of the present technology.

FIG. 35 and FIG. 36 are block diagrams illustrating system configuration examples of a communication system 700 in the eighth embodiment of the present technology.

The communication system 700 includes an information processing apparatus 710, first to N-th telecommunications carriers 751 to 753 and first to M-th virtual telecommunications carriers 754 and 755. Here, N and M mean an integer equal to or greater than 2. Moreover, for ease of explanation, the eighth embodiment of the present technology schematically illustrates various apparatuses (communication control apparatus and information processing apparatus) provided by each carrier as blocks to which the carrier's names are assigned (the first telecommunications carrier 751 and the first virtual telecommunications carrier 754, and so on).

Moreover, FIG. 35 schematically illustrates a flow of information in a case where communication unit price information acquired from the first to N-th telecommunications carriers 751 to 753 is reported to the first to N-th telecommunications carriers 751 to 753 and the first to M-th virtual telecommunications carriers 754 and 755.

Moreover, FIG. 36 schematically illustrates a flow of information in a case where radio resource request information is received from the first to N-th telecommunications carriers 751 to 753 and the first to M-th virtual telecommunications carriers 754 and 755.

Moreover, the information processing apparatus 710, the first to N-th telecommunications carriers 751 to 753 and the first to M-th virtual telecommunications carriers 754 and 755 are connected through a communication network such as a telephone network and the Internet (for example, public line network).

The first to N-th telecommunications carriers 751 to 753 are telecommunications carriers who provide wireless connection services, and correspond to the communication control apparatuses 110 and 150 mentioned above.

The virtual telecommunications carriers 754 and 755 denote carriers (for example, MVNO) who borrow wireless communication infrastructures from other telecommunications carriers and provide communication services.

The information processing apparatus 710 denotes an information processing apparatus (for example, server) managed and operated by a carrier different from a plurality of telecommunications carriers who manage and operate a base station. To be more specific, the information processing apparatus 710 includes a communication unit price information acquisition unit 711, a communication unit price information report unit 712, a radio resource buying and selling intermediation processing unit 713 and a communication unit price information storage unit 720.

The communication unit price information acquisition unit 711 acquires dynamic communication unit price information from the first to N-th telecommunications carriers 751 to 753 and records the acquired communication unit price information in the communication unit price information storage unit 720.

The communication unit price information storage unit 720 stores the communication unit price information acquired by the communication unit price information acquisition unit 711 and supplies the stored communication unit price information to the communication unit price information report unit 712. Also, the communication unit price information storage unit 720 is described in detail with reference to FIG. 37.

The communication unit price information report unit 712 transmits the communication unit price information stored in the communication unit price information storage unit 720 to the first to N-th telecommunications carriers 751 to 753 and the first to M-th virtual telecommunications carriers 754 and 755. That is, as illustrated in FIG. 35, communication unit price information acquired from the first to N-th telecommunications carriers 751 to 753 is reported to each telecommunications carrier by the communication unit price information report unit 712.

Thus, in the case of receiving communication unit price information from the information processing apparatus 710, each of the first to N-th telecommunications carriers 751 to 753 and the first to M-th virtual telecommunications carriers 754 and 755 calculates the current communication resource demand. Moreover, the future communication resource demand is predicted. Subsequently, each virtual telecommunications carrier and each telecommunications carrier transmits radio resource request information to buy a radio resource on the basis of the prediction of the current communication resource demand or the future communication resource demand, to the radio resource buying and selling intermediation processing unit 713. That is, as illustrated in FIG. 36, the radio resource request information is transmitted to the radio resource buying and selling intermediation processing unit 713.

The radio resource buying and selling intermediation processing unit 713 performs radio resource buying and selling intermediation processing according to the received radio resource request information, and sets the radio resource use rights corresponding to the received radio resource request information. Each virtual telecommunications carrier and each telecommunications carrier provide communication services to wireless communication apparatuses on the basis of the radio resource use right set in this way.

[Content Example of Communication Unit Price Information Storage Unit]

FIG. 37 is a diagram schematically illustrating one example of the storage content of the communication unit price information storage unit 720 in the eighth embodiment of the present technology.

The communication unit price information storage unit 720 denotes a storage unit that stores the communication unit price information acquired by the communication unit price information acquisition unit 711. To be more specific, the communication unit price information storage unit 720 stores a time 721, a pilot signal level 722 and communication unit price information 723 in association with each other.

Thus, the communication unit price information acquired by the communication unit price information acquisition unit 711 is classified every communication quality in a predetermined time (in 30 seconds or in 1 minute, and so on) and stored in the communication unit price information storage unit 720. Moreover, the communication unit price information 723 stores the communication unit price every CID (cell ID) in an LAC (Location Area Code).

[Operation Example of Information Processing Apparatus]

Figure 38:
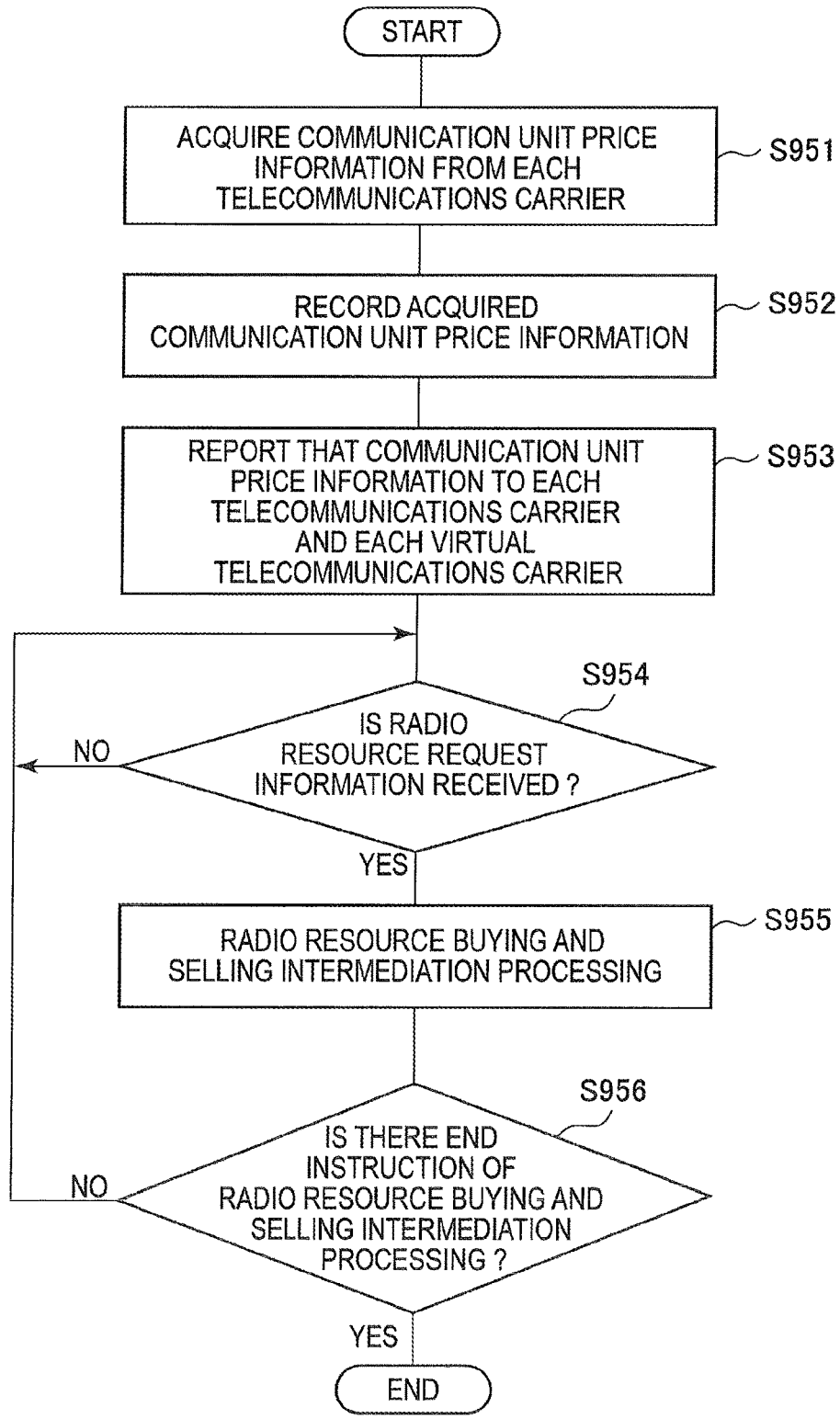
FIG. 38 is a flowchart illustrating one example of a processing procedure of radio resource buying and selling intermediation processing by the information processing apparatus 710 in the eighth embodiment of the present technology.

FIG. 38 is a flowchart illustrating one example of a processing procedure of radio resource buying and selling intermediation processing by the information processing apparatus 710 in the eighth embodiment of the present technology.

First, the communication unit price information acquisition unit 711 acquires dynamic communication unit price information from the first to N-th telecommunications carriers 751 to 753 (step S951). Subsequently, the communication unit price information acquisition unit 711 records the acquired communication unit price information in the communication unit price information storage unit 720 (step S952).

Next, the communication unit price information report unit 712 transmits the communication unit price information stored in the communication unit price information storage unit 720 of the first to N-th telecommunications carriers 751 to 753 and the first to M-th virtual telecommunications carriers 754 and 755 (step S953). That is, the communication unit price information acquired from each telecommunications carrier is reported to each telecommunications carrier and each virtual telecommunications carrier.

Subsequently, the radio resource buying and selling intermediation processing unit 713 determines whether to have received radio resource request information (step S954), and continuously performs monitoring in a case where the radio resource request information is not received. On the other hand, in a case where the radio resource request information is received (step S954), the radio resource buying and selling intermediation processing unit 713 performs radio resource buying and selling intermediation processing according to the received radio resource request information (step S955). For example, radio resource buying and selling intermediation processing of a predetermined format (for example, auction format) is performed with respect to each of multiple items of radio resource request information received within a constant time. For example, each telecommunications carrier and each virtual telecommunications carrier who presented the highest fee acquire the radio resource use right. By this radio resource buying and selling intermediation processing, the radio resource use right corresponding to the received radio resource request information is set.

Subsequently, it is determined whether there is an end instruction of the radio resource buying and selling intermediation processing (step S956), and, in a case where there is no end instruction of the radio resource buying and selling intermediation processing, it returns to step S954. On the other hand, in a case where there is the end instruction of the radio resource buying and selling intermediation processing (step S956), the operation of the radio resource buying and selling intermediation processing is finished.

Moreover, in a case where the radio resource use right is set in this way, regarding communication based on the use right, the communication fee of each telecommunications carrier is calculated on the basis of communication quality or the like in the same way as this first to seventh embodiments of the present technology.

[Operation Example of Telecommunications Carrier and Virtual Telecommunications Carrier]

Figure 39:
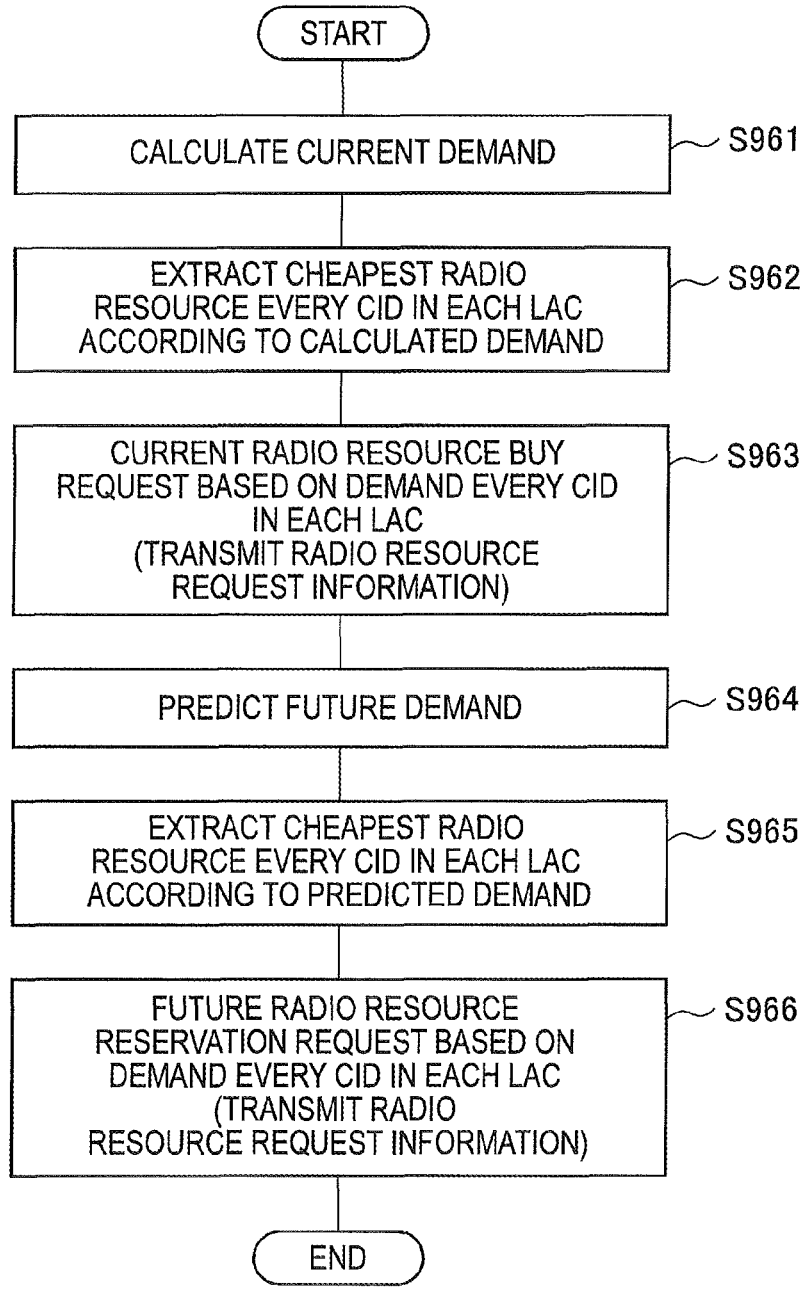
FIG. 39 is a flowchart illustrating one example of a processing procedure of radio resource purchase reservation processing by the first telecommunications carrier 751 in the eighth embodiment of the present technology.

FIG. 39 is a flowchart illustrating one example of a processing procedure of radio resource purchase reservation processing by the first telecommunications carrier 751 in the eighth embodiment of the present technology. Here, in this example, although an explanation is given using the first telecommunications carrier 751 (that is, a communication control apparatus of the first telecommunications carrier) as an example, the same applies to the second to N-th telecommunications carrier 752 and 753 and the first to M-th virtual telecommunications carriers 754 and 755.

First, in the case of receiving communication unit price information from the information processing apparatus 710, the first telecommunications carrier 751 calculates the current communication resource demand (step S961). Subsequently, the first telecommunications carrier 751 extracts the cheapest radio resource every CID in each LAC included in the received communication unit price information, on the basis of the calculated demand (the current communication resource demand) (step S962).

Next, the first telecommunications carrier 751 transmits radio resource request information to buy the extracted radio resource (the current radio resource corresponding to the demand of each CID in each LAC), to the radio resource buying and selling intermediation processing unit 713 (step S963). This radio resource request information includes various kinds of information (for example, a bid amount) based on a predetermined format (for example, auction format).

Moreover, the first telecommunications carrier 751 predicts the future communication resource demand (step S964). Subsequently, the first telecommunications carrier 751 continuously extracts the cheapest radio resource every CID in each LAC included in the received communication unit price information, on the basis of the predicted demand (the future communication resource demand) (step S965).

Next, the first telecommunications carrier 751 transmits radio resource request information to reserve and buy the extracted radio resource (the future radio resource corresponding to the demand of each CID in each LAC), to the radio resource buying and selling intermediation processing unit 713 (step S966).

Here, in this example, although an example has been shown where reservation purchase processing of the future radio resource is performed after purchase processing of the current radio resource is performed, the purchase processing may be performed after performing the reservation purchase processing, or these may be performed at the same time. Moreover, the first telecommunications carrier 751 may perform only the purchase processing of the current radio resource or only the reservation purchase processing of the future radio resource at an arbitrary timing.

Thus, in the eighth embodiment of the present technology, the communication unit price information storage unit 720 stores the communication unit price set for each telecommunications carrier. Moreover, the communication unit price stored in the communication unit price information storage unit 720 is acquired from each of a plurality of telecommunications carriers periodically or irregularly and sequentially updated. Subsequently, in a case where the radio resource use right is set, regarding communication based on the use right, the communication fee of each telecommunications carrier is calculated on the basis of the communication quality or the like.

Thus, in the eighth embodiment of the present technology, a carrier (the information processing apparatus 710) who performs an auction collects radio resources and communication unit prices of available base stations from each telecommunications carrier and reports this information to each telecommunications carrier and each virtual telecommunications carrier. Subsequently, each telecommunications carrier and each virtual telecommunications carrier apply the purchase of a radio resource to the report source (the information processing apparatus 710) on the basis of the reported information and secure (purchase) the radio resource use right. The communication resource secured (purchased) in this way is provided to the user. That is, it is possible to purchase the use right of a radio resource in the slight future on the basis of the user's action prediction. Thus, for example, in a case where a mechanism such as a dynamic frequency auction is introduced, it is possible to acquire the radio resource use right through banker who performs the auction.

The above-described embodiments are examples for embodying the present technology, and matters in the embodiments each have a corresponding relationship with invention-specific matters in the claims. Likewise, the matters in the embodiments and the invention-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording media storing the program. As the recording media, a CD (Compact Disc), an MD (MiniDisc), and a DVD (Digital Versatile Disk) can be used. In addition, a memory card, a Blu-ray disc (registered trademark), and a hard disk, for example, can be used.

Additionally, the present technology may also be configured as below.

(1)

An information processing apparatus including:

an acquisition unit configured to acquire communication quality at a time of communication between a base station and a wireless communication apparatus that connects to a predetermined network via the base station and performs the communication; and a charging processing unit configured to perform charging processing related to the communication based on the acquired communication quality.

(2)

The information processing apparatus according to (1), wherein a communication unit price that varies according to the communication quality is set, and wherein the charging processing unit uses the communication unit price corresponding to the acquired communication quality and calculates a communication fee with respect to a communication volume at the time of the communication.

(3)

The information processing apparatus according to (2), wherein the charging processing unit calculates the communication fee using, as the communication quality, a signal parameter acquired from the base station or the wireless communication apparatus.

(4)

The information processing apparatus according to (3), wherein the signal parameter is an index calculated from one or combination of a channel quality indicator (CQI), a modulation scheme, an information bit count per one symbol, a coding rate and an information bit count excluding a redundancy bit.

(5)

The information processing apparatus according to (2), wherein the charging processing unit calculates the communication fee using, as the communication quality, information specified by a relationship between a position of the wireless communication apparatus and a position of the base station.

(6)

The information processing apparatus according to (5), wherein the information specified by the relationship between the position of the wireless communication apparatus and the position of the base station is a distance between the wireless communication apparatus and the base station.

(7)

The information processing apparatus according to any one of (2) to (6)

wherein a value that varies according to each time slot is set to the communication unit price, and wherein the charging processing unit calculates the communication fee using the communication unit price corresponding to a time slot at the time of the communication.

(8)

The information processing apparatus according to any one of (2) to (7), wherein a value that varies according to each communication scheme is set to the communication unit price, and wherein the charging processing unit calculates the communication fee using the communication unit price corresponding to a communication scheme at the time of the communication.

(9)

The information processing apparatuses according to (1), wherein the charging processing unit calculates a first communication fee with respect to a communication volume at the time of the communication using a fixed communication unit price, calculates a discounted fee with respect to the first communication fee for the communication volume at the time of the communication in a case where the acquired communication quality satisfies a predetermined condition, and calculates the communication fee with respect to the communication volume at the time of the communication based on the first communication fee and the discounted fee.

(10)

The information processing apparatus according to (9), wherein a discount unit price that varies according to the communication quality is set, and wherein the charging processing unit calculates the discounted fee using the discount unit price corresponding to the acquired communication quality, for the communication volume at the time of the communication in a case where the acquired communication quality satisfies the predetermined condition.

(11)

The information processing apparatus according to (9) or (10), wherein a value that varies according to a time slot is set to the discount unit price, and wherein the charging processing unit calculates the discounted fee using the discount unit price corresponding to a time slot at the time of the communication.

(12)

The information processing apparatus according to any one of (1) to (11), wherein the charging processing unit calculates an extra fee with respect to the communication fee for a communication volume at the time of the communication in a case where a congestion degree of the base station satisfies a predetermined condition, and calculates the communication fee by adding the extra fee to the communication fee.

(13)

The information processing apparatus according to (12), further including a notification unit configured to notify the wireless communication apparatus of a generation of the extra fee in a case where the congestion degree of the base station satisfies the predetermined condition.

(14)

The information processing apparatus according to any one of (2) to (8), wherein the communication unit price is set for each telecommunications carrier, wherein the information processing apparatus further includes a setting unit configured to perform control to set a connection right to connect with one of base stations of a plurality of telecommunications carriers to the wireless communication apparatus, and wherein the charging processing unit calculates the communication fee using the communication unit price corresponding to the set telecommunications carrier.

(15)

The information processing apparatus according to any one of (2) to (8), wherein the communication unit price in a storage unit configured to store the communication unit price set for each telecommunications carrier is periodically or irregularly acquired from each of a plurality of telecommunications carriers and sequentially updated.

(16)

The information processing apparatus according to (1) or (2), wherein the communication quality at the time of the communication between the wireless communication apparatus and the base station is an index calculated from one or combination of a CQI, a Signal to Interference Ratio (SIR), average power of a pilot signal, average power of a reference signal, a relationship between reception power and total reception power of a pilot signal from the base station, a relationship between reception power and total reception power of a reference signal from the base station, a relationship between the reception power of the pilot signal from the base station and a total sum of reception power of pilot signals from surrounding base stations existing around the base station, and a relationship between the average power of the reference signal from the base station and a total sum of reception power of reference signals from the surrounding base stations.

(17)

The information processing apparatus according to any one of (1) to (16), wherein the charging processing unit performs the charging processing without using the acquired communication quality in a case where the wireless communication apparatus is connected to a base station in a specific area.

(18)

The information processing apparatus according to any one of (1) to (17), further including a control unit configured to transmit, to the wireless communication apparatus, information to cause the wireless communication apparatus to display a position in which the wireless communication apparatus exists, surrounding positions of the position and information on a communication fee corresponding to the communication quality of each of the positions in association with each other.

(19)

A communication system including:

a wireless communication apparatus configured to connect to a predetermined network via a base station and perform communication; and an information processing apparatus configured to acquire communication quality at a time of the communication between the wireless communication apparatus and the base station and perform charging processing related to the communication based on the acquired communication quality (20)

An information processing method including:

an acquisition step of acquiring communication quality at a time of communication between a base station and a wireless communication apparatus that connects to a predetermined network via the base station and performs the communication; and a charging processing step of performing charging processing related to the communication based on the acquired communication quality.

REFERENCE SIGNS LIST 100, 105, 700 communication system
101 network
110 communication control apparatus
120, 160 base station
130, 140, 171 to 173, 620 wireless communication apparatus
131, 210 communication unit
132 position information acquisition unit
133, 220, 301, 311, 341, 401, 451, 601, 621 control unit
134 operation reception unit
135 display unit
136 USIM information rewriting unit
137 USIM information storage unit
138 memory
200 to 206 charging server
230, 270, 290, 320, 350, 410, 466 communication history information storage unit
240, 273, 280, 295, 325, 342, 420 communication unit price information storage unit
250, 305, 313, 343, 403, 452 charging information calculation unit
260, 380, 430 charging information storage unit
302 base station position information storage unit
303 position history information storage unit
304 distance information calculation unit
312 communication scheme determination unit
345 premium information notification unit
360 discount unit price information storage unit
370 extra unit price information storage unit
402 USIM information switching unit
460 specific fee district information storage unit
602 area information creation unit
622 display information creation unit
630 area information storage unit
710 information processing apparatuses
711 communication unit price information acquisition unit
712 communication unit price information report unit
713 radio resource buying and selling intermediation processing unit
720 communication unit price information storage unit

The invention claimed is:

1. An information processing apparatus, comprising:
at least one processor configured to:
acquire congestion degree of a base station at a time of communication between the base station and a wireless communication apparatus,
wherein the wireless communication apparatus is connected, for a time period, to a network via the base station for the communication;
record a first level of a pilot signal transmitted from the base station to the wireless communication apparatus in association with the time of the communication,
wherein the recorded first level is an average value of a plurality of levels of the pilot signal in the time period;
calculate, based on the recorded first level, a first value of communication quality for the time period of the communication; and
calculate a first communication fee related to the communication, based on the calculated first value of communication quality and the acquired congestion degree of the base station,
wherein an amount of the calculated first communication fee varies based on a plurality of thresholds of the congestion degree of the base station, and
wherein a second value of a communication unit price varies based on the time period of the communication which is based on a plurality of time slots in a day.

2. The information processing apparatus according to claim 1,
wherein the second value of the communication unit price varies according to the calculated first value of the communication quality, and
wherein the at least one processor is further configured calculate, based on the second value of the communication unit price corresponding to the first value of the communication quality, the first communication fee with respect to a communication volume at the time of the communication.

3. The information processing apparatus according to claim 1, wherein the at least one processor is further configured to calculate the first communication fee, based on a signal parameter acquired from one of the base station or the wireless communication apparatus as the communication quality.

4. The information processing apparatus according to claim 3, wherein the signal parameter is an index calculated from at least one of a channel quality indicator (CQI), a modulation scheme, first information bit count per one symbol, a coding rate, or second information bit count that excludes a redundancy bit.

5. The information processing apparatus according to claim 1, wherein the at least one processor is further configured to calculate the first communication fee, based on information specified by a relationship between a first position of the wireless communication apparatus and a second position of the base station as the communication quality.

6. The information processing apparatus according to claim 5, wherein the information specified by the relationship between the first position of the wireless communication apparatus and the second position of the base station is a distance between the wireless communication apparatus and the base station.

7. The information processing apparatus according to claim 1,
wherein the at least one processor is further configured to calculate the first communication fee based on the communication unit price corresponding to values of the plurality of time slots of the day at the time period of the communication.

8. The information processing apparatus according to claim 1,
wherein the second value of the communication unit price varies according to a third value of a communication scheme, and
wherein the at least one processor is further configured to calculate the first communication fee based on the communication unit price corresponding to the third value of the communication scheme at the time of the communication.

9. The information processing apparatus according to claim 1, wherein the at least one processor is further configured to:
calculate a second communication fee with respect to a communication volume at the time of the communication based on a fixed communication unit price,
calculate a discounted fee with respect to the second communication fee for the communication volume at the time of the communication based on the communication quality which satisfies a condition, and calculate the first communication fee with respect to the communication volume at the time of the communication, based on the second communication fee and the discounted fee.

10. The information processing apparatus according to claim 9,
wherein a value of a discount unit price varies based on a value of the communication quality, and
wherein the at least one processor is further configured to calculate the discounted fee, based on the discount unit price corresponding to the calculated first value of the communication quality, for the communication volume at the time period of the communication based on the communication quality which satisfies the condition.

11. The information processing apparatus according to claim 9,
wherein a third value of a discount unit price varies according to values of the plurality of time slots of the day, and
wherein the at least one processor is further configured to calculate the discounted fee based on the discount unit price corresponding to the values of the plurality time slots of the day at the time period of the communication.

12. The information processing apparatus according to claim 1, wherein the at least one processor is further configured to:
calculate an extra fee with respect to the first communication fee for a communication volume at the time of the communication, based on the congestion degree that is greater than or equal to one of the plurality of thresholds of congestion degree of the base station, and
calculate a second communication fee by addition of the calculated extra fee to the first communication fee.

13. The information processing apparatus according to claim 12, wherein
the at least one processor is further configured to notify, based on the congestion degree that is greater than or equal to one of the plurality of thresholds of the congestion degree of the base station, the wireless communication apparatus of a generation of the calculated extra fee.

14. The information processing apparatus according to claim 1,
wherein the second value of the communication unit price varies according to a third value of a telecommunications carrier,
wherein the at least one processor is further configured to:
set a connection right to connect one of a plurality of base stations of a plurality of telecommunications carriers to the wireless communication apparatus; and
calculate the first communication fee based on the communication unit price corresponding to the third value of the telecommunications carrier.

15. The information processing apparatus according to claim 1, wherein the at least one processor is further configured to:
acquire, the communication unit price from each of a plurality of telecommunications carriers; and
sequentially update the acquired communication unit price.

16. The information processing apparatus according to claim 1,
wherein the first value of the communication quality at the time of the communication between the wireless communication apparatus and the base station is calculated from at least one of a CQI, a Signal to Interference Ratio (SIR), average power of a reference signal, a first relationship between reception power and total reception power of the pilot signal from the base station, a second relationship between reception power and total reception power of a reference signal from the base station, a third relationship between the reception power of the pilot signal and a total sum of reception power of pilot signals from surrounding base stations existing around the base station, or a fourth relationship between the average power of the reference signal from the base station and a total sum of reception power of reference signals from the surrounding base stations.

17. The information processing apparatus according to claim 1, wherein the at least one processor is further configured to calculate the first communication fee, based on absence of the acquired communication quality and the wireless communication apparatus that is connected to the base station in a specific area.

18. The information processing apparatus according to claim 1, wherein
the at least one processor is further configured to transmit, to the wireless communication apparatus, first information to cause the wireless communication apparatus to display a position in which the wireless communication apparatus exists, surrounding positions of the position, and second information on a second communication fee corresponding to the communication quality of each of the positions in association with each other.

19. The information processing apparatus according to claim 1, wherein the congestion degree of the base station is based on a number of wireless communication apparatuses connected to the base station.

20. A communication system, comprising:
a wireless communication apparatus comprising at least one wireless communication component configured to connect to a network via a base station and at least one first processor configured for communication; and
an information processing apparatus comprising at least one second processor configured to:
acquire congestion degree of the base station at a time of the communication between the wireless communication apparatus and the base station,
wherein the wireless communication apparatus is in connected with the base station for a time period;
record a first level of a pilot signal transmitted from the base station to the wireless communication apparatus in association with the time of the communication,
wherein the recorded first level is an average value of a plurality of levels of the pilot signal in the time period;
calculate, based on the recorded first level, a first value of communication quality at the time of the communication; and
calculate a communication fee related to the communication, based on the calculated first value of communication quality, and the acquired congestion degree of the base station,
wherein an amount of the calculated communication fee varies based on a plurality of thresholds of the congestion degree of the base station, and
wherein a second value of a communication unit price varies based on the time period of the communication which is based on a plurality of time slots in a day.

21. An information processing method, comprising:
acquiring, by at least one processor, congestion degree of the base station at a time of communication between a base station and a wireless communication apparatus,
wherein the wireless communication apparatus is connected, for a time period, to a network via the base station for the communication;
recording a first level of a pilot signal transmitted from the base station to the wireless communication apparatus in association with the time of the communication,
wherein the recorded first level is an average value of a plurality of levels of the pilot signal in the time period;
calculating, based on the recorded first level, a first value of communication quality for the time period of the communication; and
calculating, by the at least one processor, a communication fee, related to the communication, based on the calculated first value of communication quality, and the acquired congestion degree of the base station,
wherein an amount of the calculated communication fee varies based on a plurality of thresholds of the congestion degree of the base station, and
wherein a second value of a communication unit price varies based on the time period of the communication which is based on a plurality of time slots in a day.

* * * * *